United States Patent
Melnikov et al.

(10) Patent No.: US 12,534,359 B2
(45) Date of Patent: Jan. 27, 2026

(54) MEMS FOR HIGHLY EFFICIENT INTERACTION WITH A VOLUME FLOW

(71) Applicant: Fraunhofer-Gesellschaft zur Förderung der angewandten Forschung e.V., Munich (DE)

(72) Inventors: Anton Melnikov, Dresden (DE); Franziska Wall, Dresden (DE); Jorge Mario Monsalve Guaracao, Dresden (DE); Bert Kaiser, Dresden (DE); Sergiu Langa, Dresden (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 562 days.

(21) Appl. No.: 18/052,289

(22) Filed: Nov. 3, 2022

(65) Prior Publication Data

US 2023/0091340 A1    Mar. 23, 2023

Related U.S. Application Data

(63) Continuation of application No. PCT/EP2020/062901, filed on May 8, 2020.

(51) Int. Cl.
   *B81B 3/00*    (2006.01)

(52) U.S. Cl.
   CPC ...... *B81B 3/007* (2013.01); *B81B 2201/0257* (2013.01); *B81B 2201/0271* (2013.01);
   (Continued)

(58) Field of Classification Search
   CPC .......... B81B 3/0059; B81B 2201/0257; B81B 2201/036; B81B 7/0061; H04R 19/005; H04R 19/02; H04R 2201/003
   See application file for complete search history.

(56) References Cited

U.S. PATENT DOCUMENTS

| 6,906,905 B1 * | 6/2005 | Chinthakindi ........... H01G 5/18 361/290 |
| 9,164,277 B2 | 10/2015 | Conrad et al. |

(Continued)

FOREIGN PATENT DOCUMENTS

| DE | 10 2015 206 774 A1 | 10/2016 |
| DE | 102017206766 A1 | 10/2018 |

(Continued)

OTHER PUBLICATIONS

International Search Report and Written Opinion issued in application No. WO PCT/EP2020/062901.

(Continued)

*Primary Examiner* — Moazzam Hossain
(74) *Attorney, Agent, or Firm* — McClure, Qualey & Rodack, LLP

(57) ABSTRACT

An MEMS having a layered structure includes a cavity disposed in the layered structure and fluidically coupled to an external environment of the layered structure through at least one opening in the layered structure. The MEMS includes an interaction structure movably disposed in a first MEMS plane and in the cavity along a plane direction and configured to interact with a fluid in the cavity, wherein movement of the interaction structure is causally related to movement of the fluid through the at least one opening. The MEMS further includes an active structure disposed in a second MEMS perpendicular to the plane direction, the active structure mechanically coupled to the insulation structure and configured such that an electrical signal at an electrical contact of the active structure is causally related to a deformation of the active structure, wherein the deformation of the active structure is causally related to movement of the fluid.

19 Claims, 37 Drawing Sheets

(52) U.S. Cl.
CPC ... *B81B 2201/033* (2013.01); *B81B 2201/036* (2013.01); *B81B 2203/0136* (2013.01); *B81B 2203/0315* (2013.01); *B81B 2203/04* (2013.01)

(56) References Cited

U.S. PATENT DOCUMENTS

| | | | |
|---|---|---|---|
| 10,457,544 | B2 | 10/2019 | Schenk et al. |
| 2014/0117475 | A1* | 5/2014 | Classen ............... B81C 1/00246 257/418 |
| 2014/0270271 | A1 | 9/2014 | Dehe |
| 2014/0300249 | A1 | 10/2014 | Van Kampen |
| 2016/0090300 | A1 | 3/2016 | Tsai |
| 2016/0152202 | A1 | 6/2016 | Rytkonen |
| 2016/0304333 | A1 | 10/2016 | Gaudet et al. |
| 2018/0139543 | A1 | 5/2018 | Clerici |
| 2019/0116429 | A1 | 4/2019 | Meisel et al. |
| 2020/0087138 | A1* | 3/2020 | Schenk ................ H04R 19/005 |
| 2021/0229979 | A1 | 7/2021 | Schenk et al. |
| 2022/0002143 | A1 | 1/2022 | Langa et al. |
| 2022/0286785 | A1 | 9/2022 | Kaiser et al. |
| 2023/0345185 | A1* | 10/2023 | Lee ........................ H04R 7/18 |

FOREIGN PATENT DOCUMENTS

| | | | |
|---|---|---|---|
| DE | 10 2019 203 914 | B3 | 7/2020 |
| EP | 3 778 469 | A1 | 2/2021 |
| JP | H05-252760 | A | 9/1993 |
| TW | 201902812 | A | 1/2019 |
| WO | 2012/095185 | A1 | 7/2012 |
| WO | 2016/202790 | A2 | 12/2016 |
| WO | WO-2018193109 | A1 * | 10/2018 ............ H04R 19/02 |
| WO | 2020/078541 | A1 | 4/2020 |

OTHER PUBLICATIONS

Chinese language Notice of Allowance dated Jul. 3, 2025, issued in application No. CN 202080102945.8 (English language translation, pp. 1 of attachment).

Chinese language office action dated Nov. 18, 2024, issued in application No. CN 202080102945.8.

European language office action dated Jun. 5, 2025, issued in application No. EP 20727165.1.

* cited by examiner

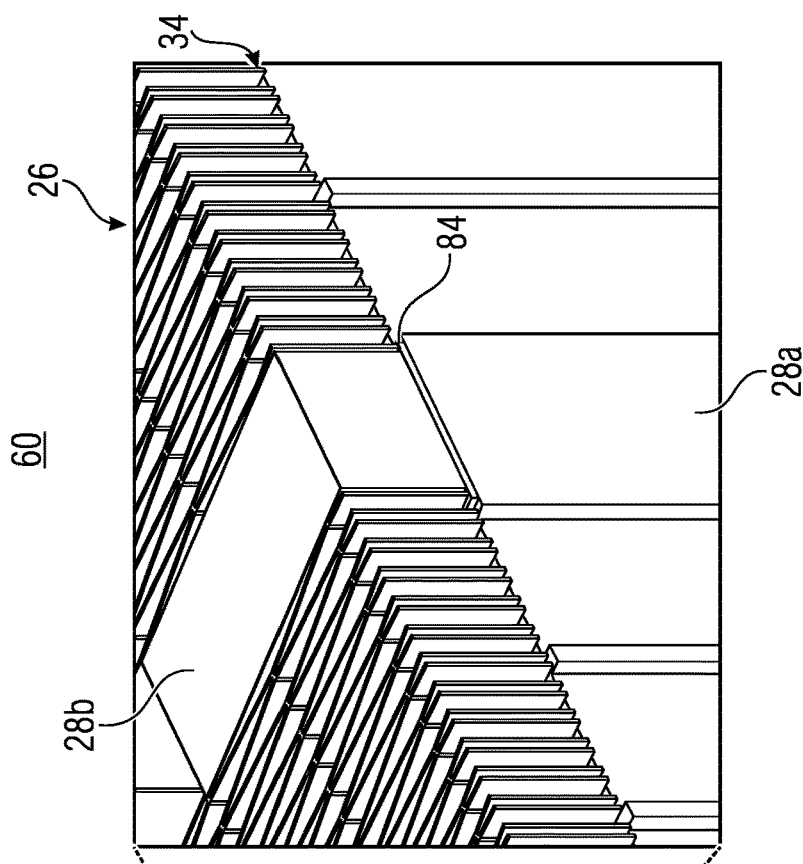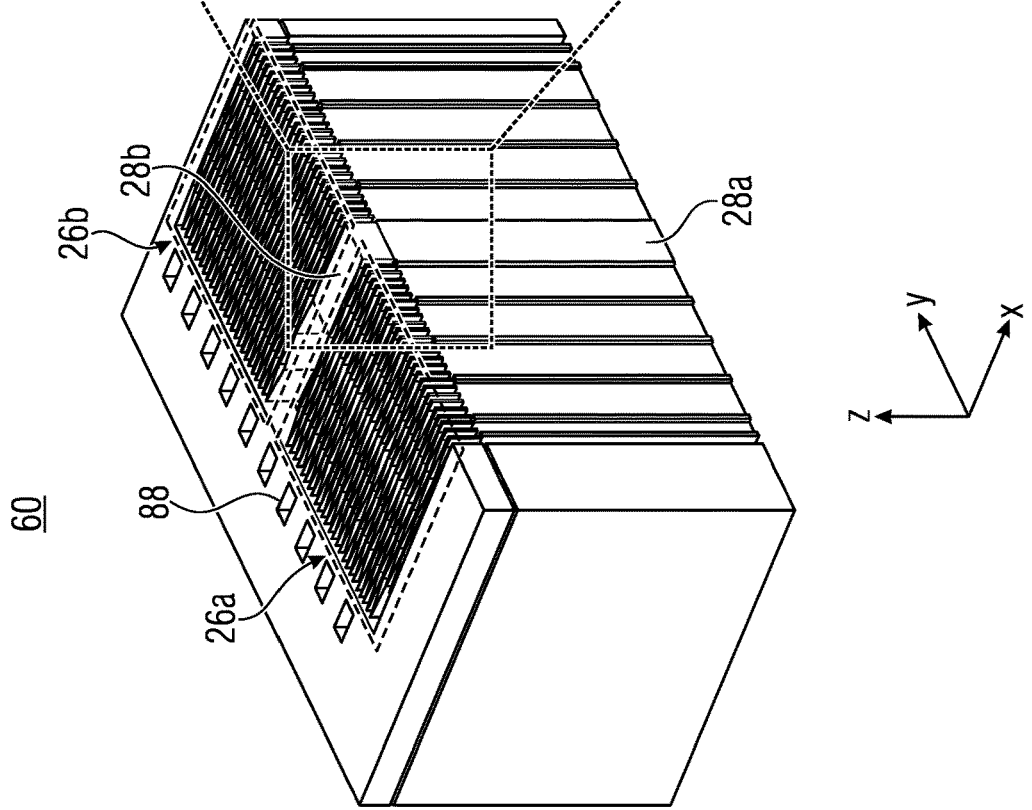
Fig. 6b
Fig. 6a

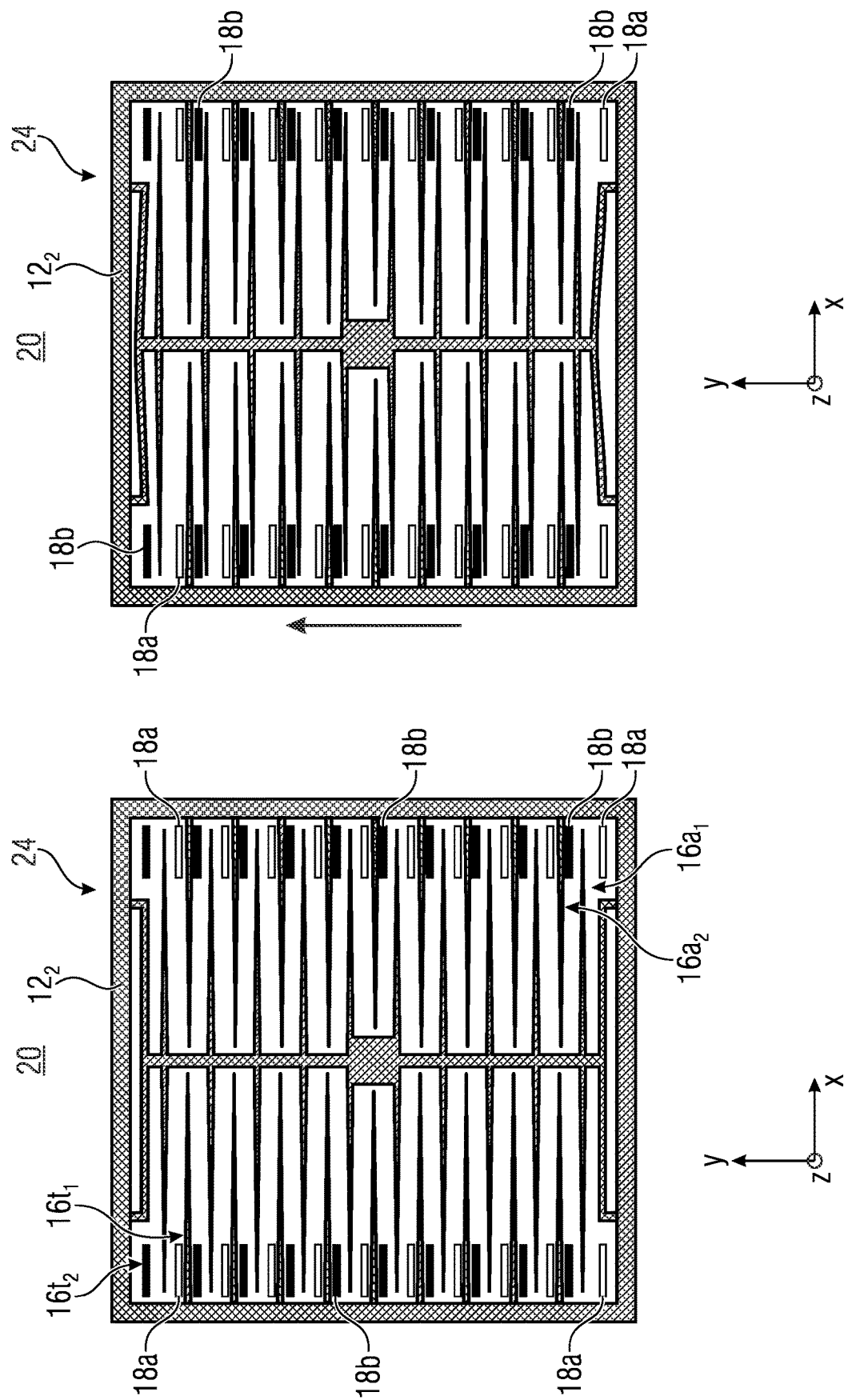

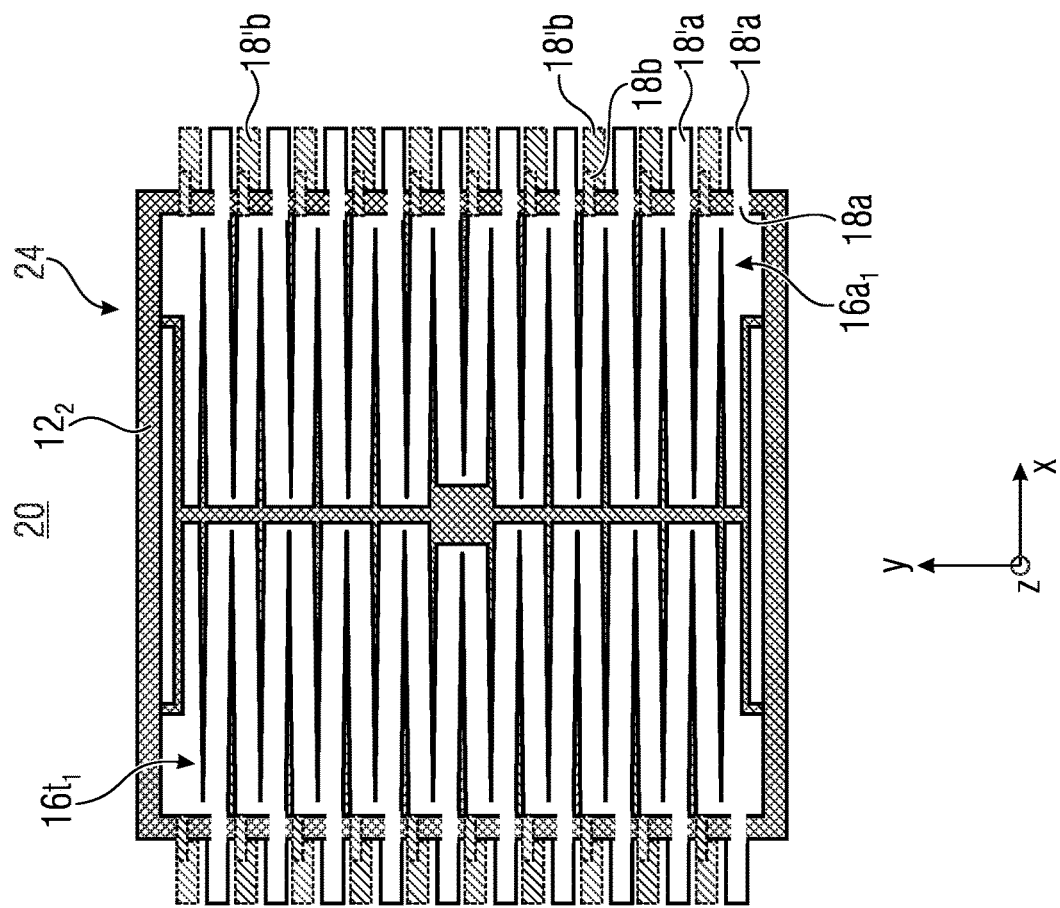
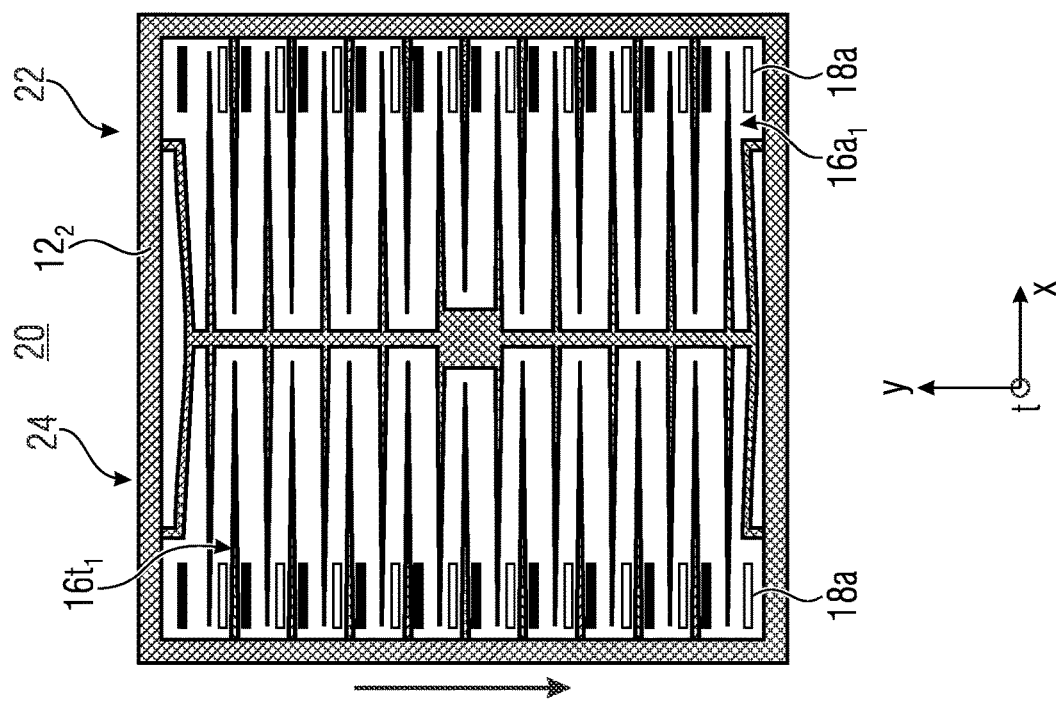
Fig. 7g
Fig. 7f

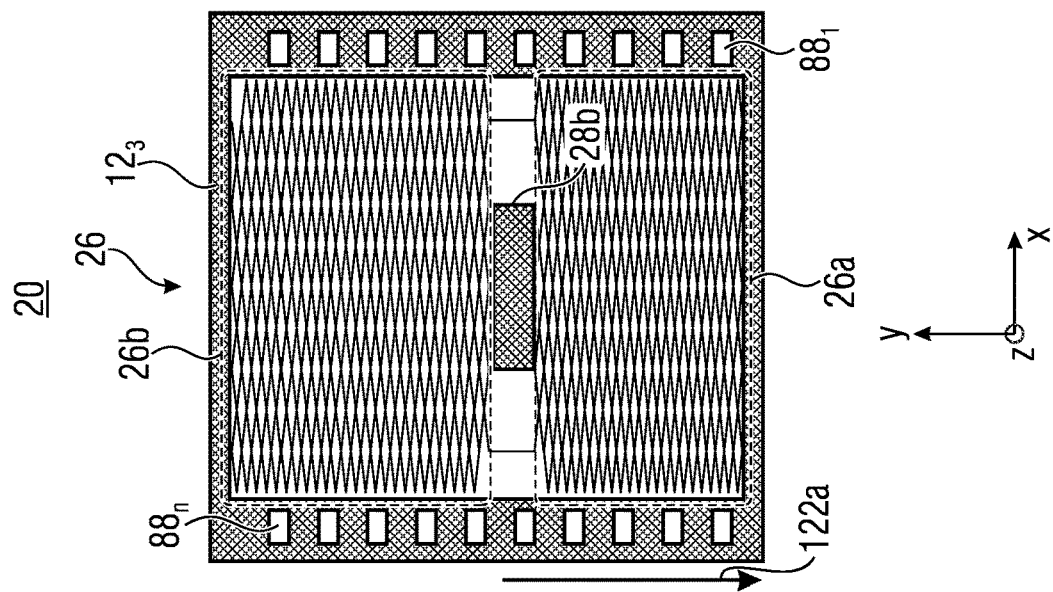
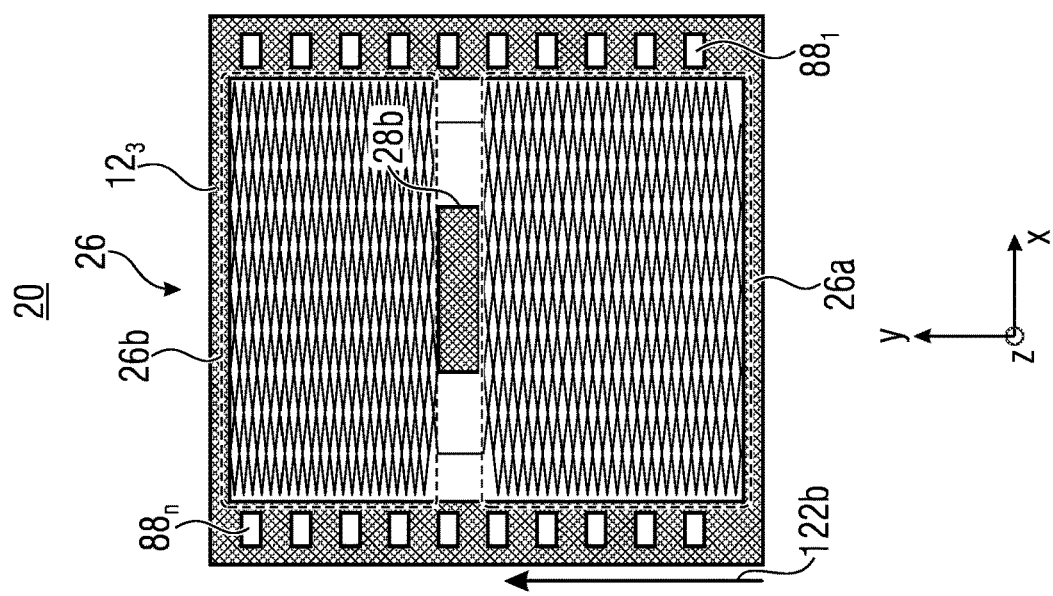
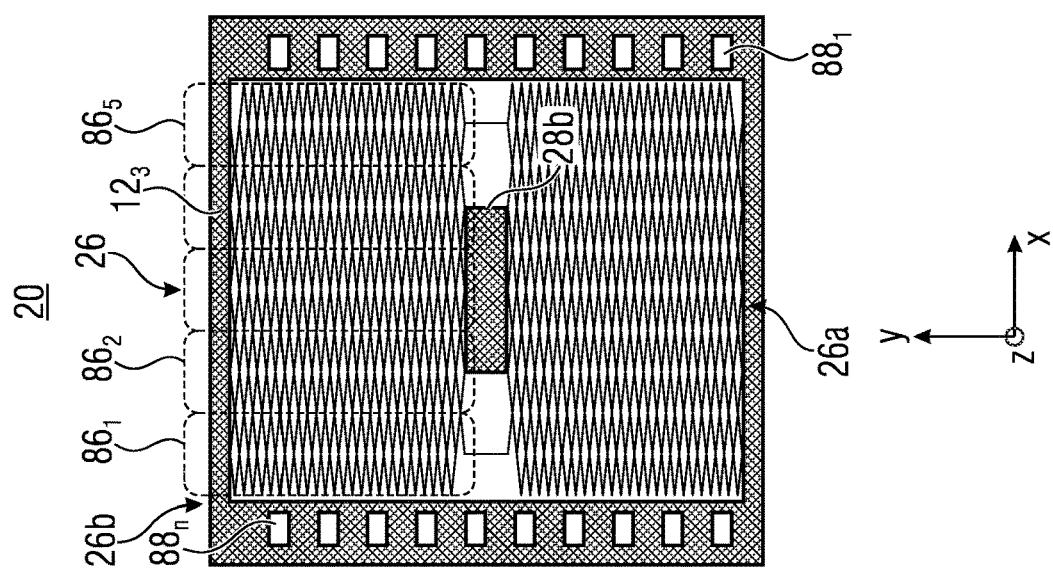
Fig. 8c
Fig. 8b
Fig. 8a

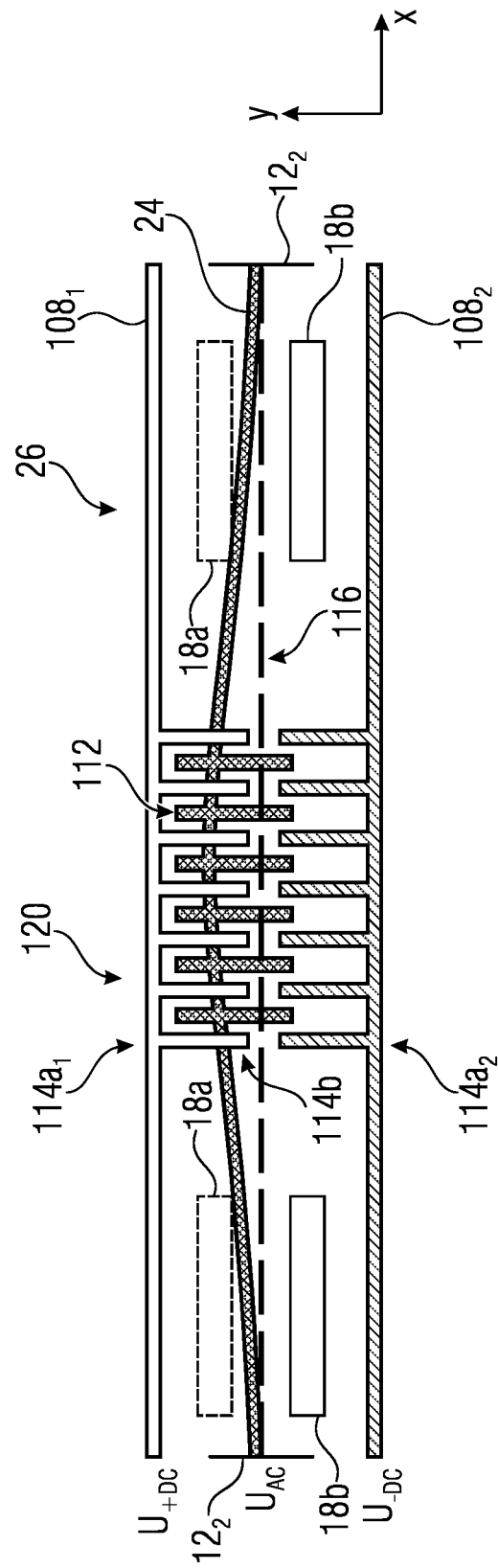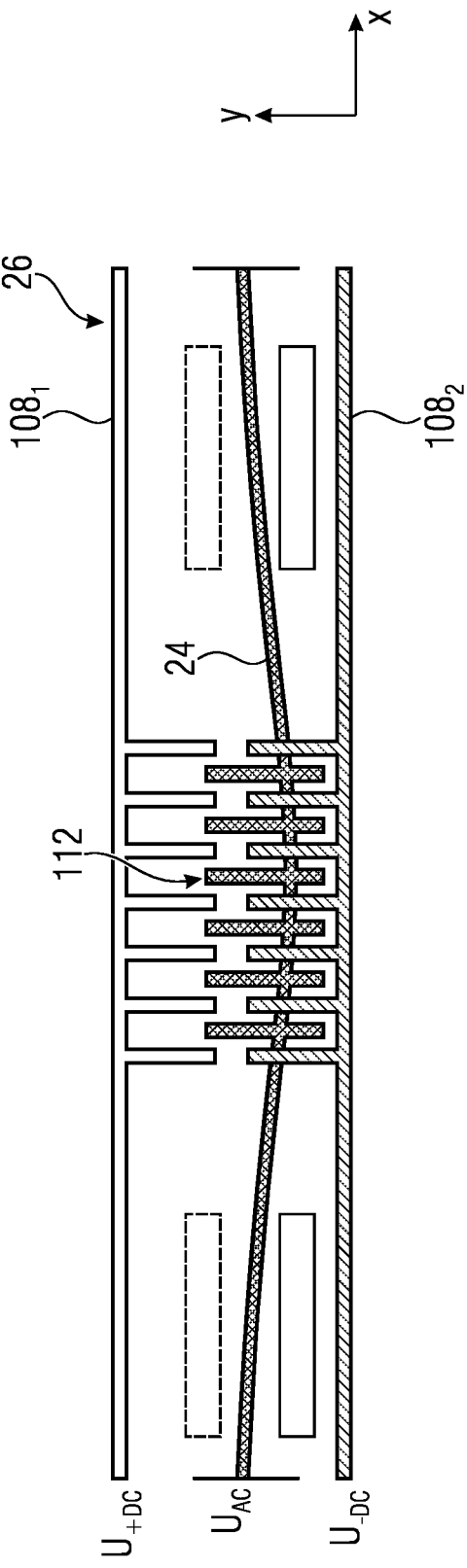
Fig. 12a
Fig. 12b

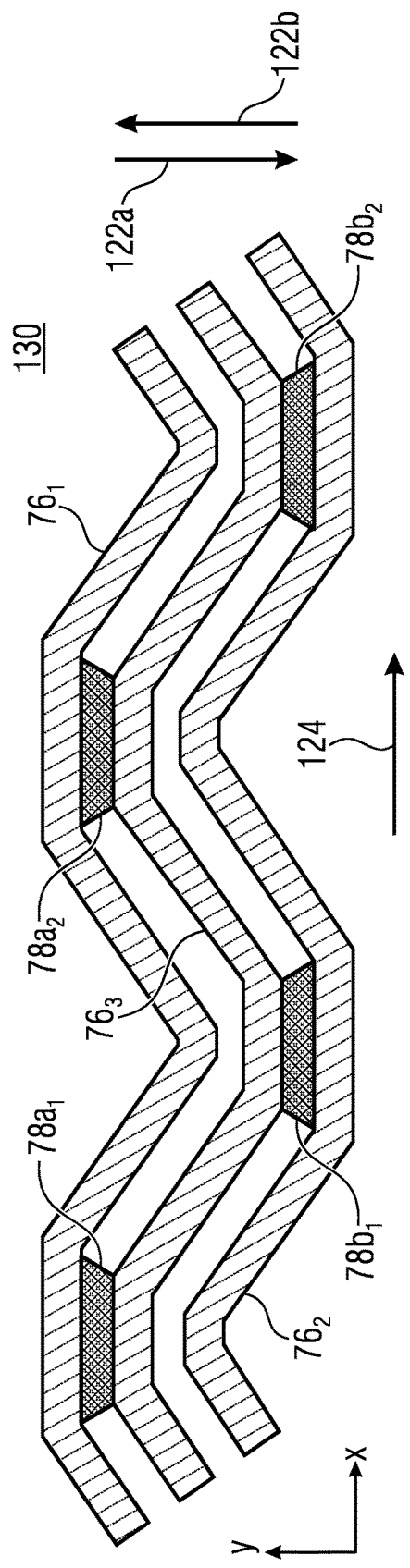
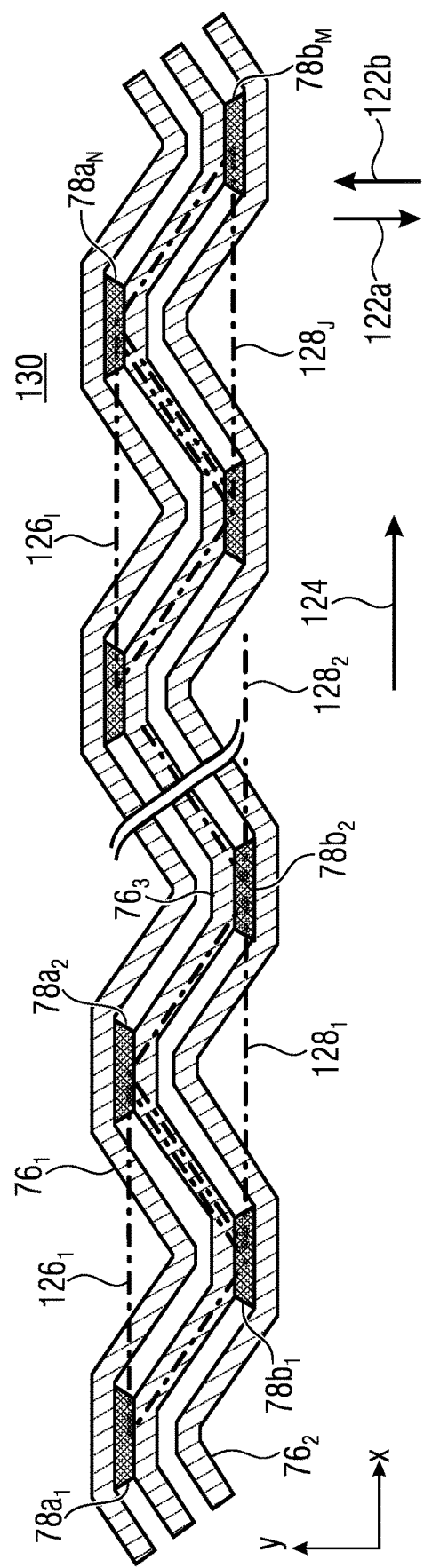
Fig. 13a
Fig. 13b

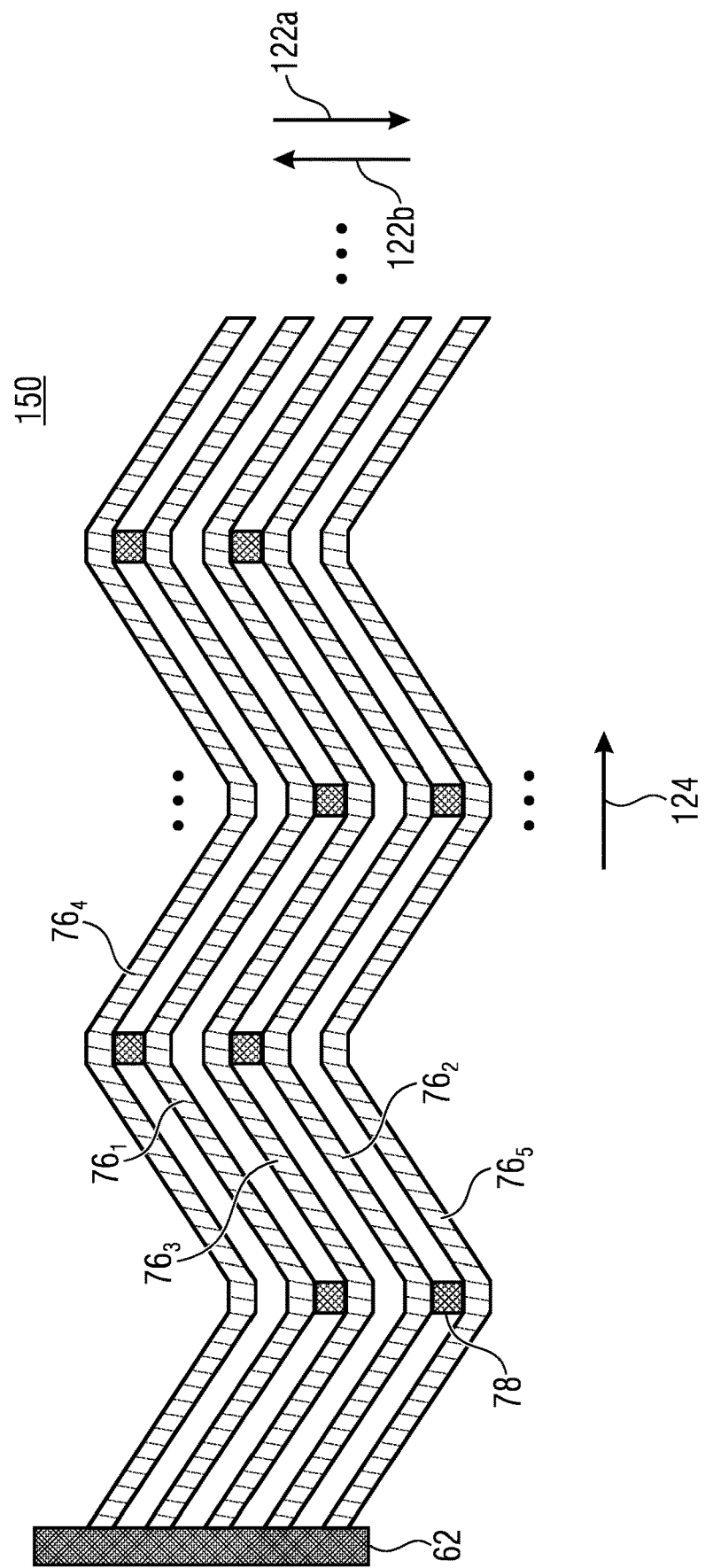

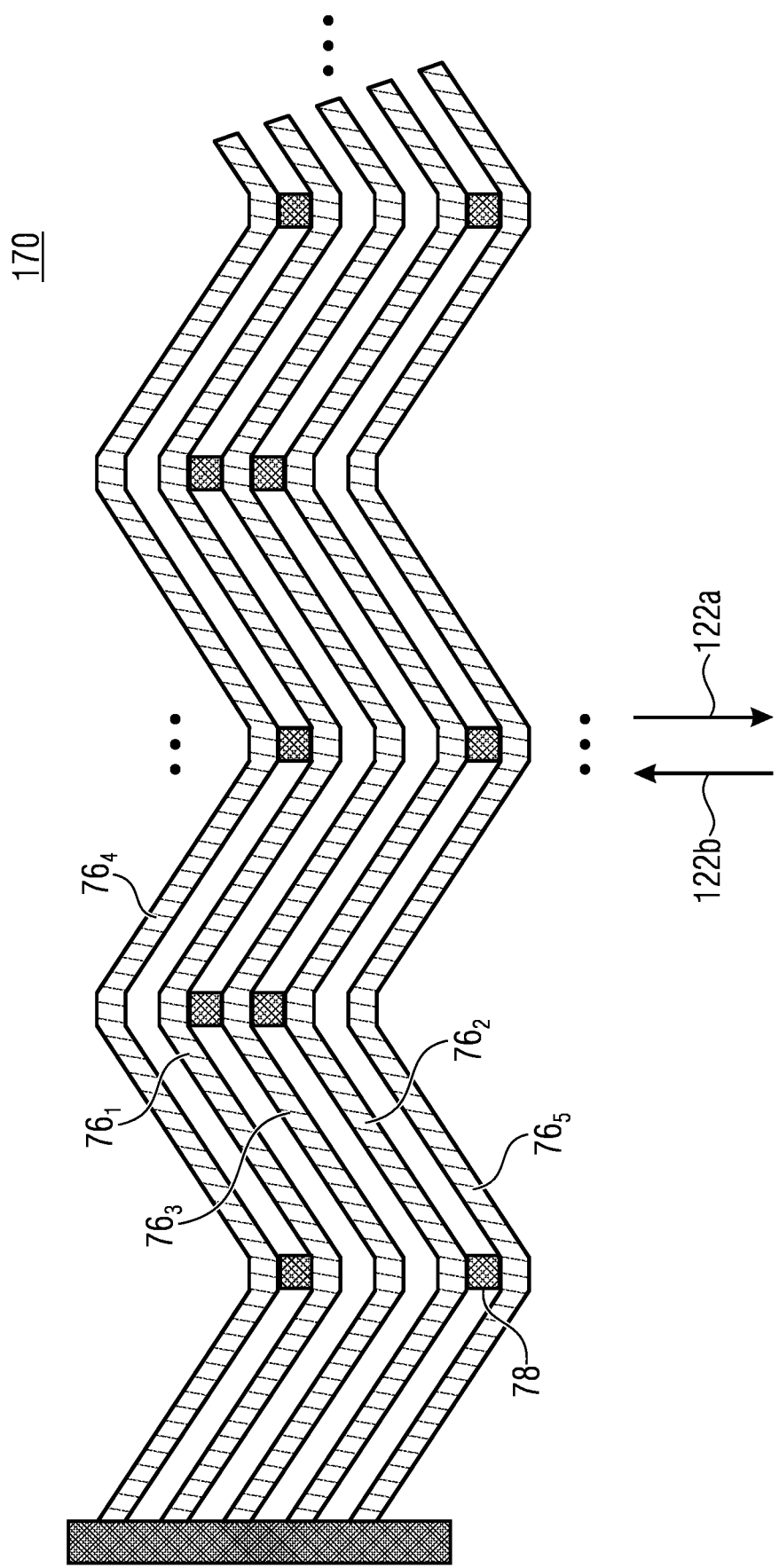

ly arranged interaction 15
MEMS FOR HIGHLY EFFICIENT INTERACTION WITH A VOLUME FLOW

CROSS-REFERENCE TO RELATED APPLICATION

This application is a continuation of copending International Application No. PCT/EP2020/062901, filed May 8, 2020, which is incorporated herein by reference in its entirety

BACKGROUND OF THE INVENTION

The present invention relates to microelectromechanical systems (MEMS) in which a movably arranged interaction structure for interacting with a fluid and an active structure in which an electrical signal is causally related to a deformation of the active structure, which in turn is causally related to the movement of the fluid, are arranged in different MEMS layers. The present invention also relates to MEMS having a movably arranged layer arrangement comprising first, second and third bars fixed at discrete regions in an electrically insulated manner, the discrete regions being arranged between the bars in an offset manner. The present invention further relates to an MEMS transducer for interacting with a volumetric flow of a fluid, such as an MEMS speaker, an MEMS microphone or an MEMS pump.

The principle of NED (Nanoscopic Electrostatic Drive) is described in WO 2012/095185 A1. NED is a novel MEMS actuator principle (MEMS=microelectromechanical system). Here, a movable element is formed from a silicon material, said element having at least two spaced electrodes. The length of the electrodes is much greater than the thickness of the electrodes and also the height of the electrodes, i.e. the dimension along the depth direction of the silicon material. These bar-shaped electrodes are spaced apart from each other and are locally electrically insulated and fixed with respect to each other. By applying an electrical potential, an electrical field is generated between these electrodes, resulting in attractive or repulsive forces between the electrodes and thus stresses in the material of the electrodes. The material strives to homogenize these stresses by trying to adopt a possible low-stress state, resulting in movement. Through a certain geometry and topography of the electrodes, this movement can be influenced in such a way that the electrodes change in length and thus a lateral movement of the deflectable element takes place.

JP-H5252760 A shows an actuator which consists of many small cylindrical or wave-like drive units consisting of two electrodes that are wave-like shaped and insulated. Both ends of the insulated electrodes are connected to each other, and the drive unit has a narrow gap for deformation by electrostatic forces. However, the movement of such actuators is subject to geometric constraints. For example, the deformation of the actuator stops when the electrostatic force is in equilibrium with the stiffness of the structure. Another disadvantage is that the resulting actuators are a composite of metal electrode materials and polymer insulators. This makes low-cost production in CMOS technology (CMOS=Complementary Metal Oxide Semiconductor) impossible, which is a significant competitive disadvantage.

For the integration of MEMS devices into devices and systems, it is desirable to design MEMS configured for interaction with a fluid in a way that is space-efficient, which means that a high sensitivity in case of fluid movement is obtained and/or that high amounts of fluid can be moved, e.g., resulting in high acoustic pressures.

Thus, the object of the present invention is to provide an MEMS that is efficient in terms of installation space.

SUMMARY

An embodiment may have an MEMS with a layered structure, comprising: a cavity disposed in the layered structure and fluidically coupled to an external environment of the layered structure through at least one opening in the layered structure; an interaction structure movably disposed in a first MEMS plane and in the cavity along a plane direction and configured to interact with a fluid in the cavity, wherein movement of the interaction structure is causally related to movement of the fluid through the at least one opening; an active structure disposed in a second MEMS plane perpendicular to the plane direction and mechanically coupled to the interaction structure; and configured such that an electrical signal at an electrical contact of the active structure is causally related to a deformation of the active structure; wherein the deformation of the active structure is causally related to the movement of the fluid.

Another embodiment may have an MEMS with a layered structure, comprising: a cavity arranged in the layered structure; a movable layer arrangement disposed in the cavity, comprising a first bar, a second bar and a third bar disposed between the first bar and second bar and fixed to be electrically insulated therefrom at discrete regions thereof; wherein the movable layer arrangement is configured to move along a direction of movement in a substrate plane in response to an electrical potential between the first bar and the third bar or in response to an electrical potential between the second bar and the third bar; wherein the discrete regions for fixing the first bar and the third bar on the one hand and the second bar and the third bar on the other hand are arranged offset to each other along an axial path of the movable layer arrangement.

According to a first aspect, it has been found that by arranging in a first MEMS plane an interaction structure for interacting with a fluid and by arranging in a second MEMS plane an active structure mechanically coupled to the interaction structure, high efficiency of an MEMS can be obtained, since a respective subtask, interacting with the fluid and generating/processing an electrical signal, can be primarily performed in the respective MEMS plane, so that the focus can be on respective subtask there.

According to a second aspect, it has been found that by offsetting discrete regions where a sequence of at least three bar electrodes are electrically insulated from each other such that a first outer electrode is fixed in electrically insulated manner with a central electrode at different locations than a second outer electrode with the central electrode, a highly efficient deflection of the movable layered structure can be obtained through an electrical signal applied thereto or a fluid acting thereon.

Both concepts can be combined with each other; however, they can also be implemented independently.

According to an embodiment of the first aspect, an MEMS comprises a layered structure. A cavity is arranged in the layered structure and is fluidically coupled to an external environment of the layered structure through at least one opening in the layered structure. An interaction structure that is movable along a plane direction, i.e. in-plane, is arranged in a first MEMS plane and in the cavity. The interaction structure is configured to interact with a fluid in the cavity, wherein a movement of the interaction structure is causally related to a movement of the fluid through the at least one opening. An active structure that is mechanically coupled to the interaction structure and that is configured such that an electrical signal at an electrical contact of the active structure is causally related to a deformation of the active structure, is arranged in a second MEMS plane arranged perpendicular to the plane direction. The deformation of the active structure is in turn causally related to the movement of the fluid.

According to an embodiment of the second aspect, an MEMS comprises a layered structure and a cavity disposed in the layered structure. A movable layer arrangement comprising a first bar, a second bar, and a third bar disposed between the first bar and the second bar and arranged electrically insulated therefrom in a fixed manner at discrete regions is provided in the cavity. The movable layer arrangement is adapted to carry out a movement along a moving direction in a substrate plane, that is in a plane direction, in response to an electrical potential between the first bar and the third bar or in response to an electrical potential between the second bar and the third bar. The discrete regions for fixing the first bar and the third bar on the one hand and the second bar and the third bar on the other hand are arranged offset from each other along an axial path of the movable layer arrangement.

BRIEF DESCRIPTION OF THE DRAWINGS

Embodiments of the present invention will be detailed subsequently referring to the appended drawings, in which:

FIG. 3c shows a schematic top view of a part of an active structure according to a further embodiment, which further develops the implementation of FIG. 3a;

FIG. 4b shows a schematic perspective view of the interaction structure from FIG. 4a;

FIG. 6a shows a schematic perspective view of a part of a further MEMS according to an embodiment of the first aspect;

FIG. 6b shows a schematic perspective illustration of a section of FIG. 6a;

FIG. 7d-7f show schematic views of the interaction structure of FIG. 7a, additionally showing groups of openings of the cavity according to an embodiment of the first aspect;

FIG. 7g shows a schematic view of an alternative embodiment of openings according to an embodiment of the first aspect;

FIGS. 8a-c show schematic perspective views of the MEMS of FIG. 2 in a plane of the active structure and according to an embodiment of the first aspect;

FIG. 9b shows a schematic perspective view of the interaction structure of FIG. 9a;

FIG. 9d shows a more detailed schematic view of part of the interaction structure of FIG. 9a;

FIG. 10b shows a top view of a section of FIG. 10a;

FIG. 12a shows a schematic top view of a part of an active structure in a first state according to an embodiment of the first aspect;

FIG. 12b shows a complementary state of the active structure to FIG. 12a;

FIG. 13a shows an exemplary top view of a movable layer arrangement according to an embodiment of the second aspect;

FIG. 13b shows a schematic top view of a movable layer arrangement according to an embodiment of the second aspect, wherein a plurality of N discrete regions are arranged between bars of the movable layer arrangement along the axial path parallel to a direction;

FIG. 15 shows a schematic view of a movable layer arrangement according to an embodiment of the second aspect, comprising at least a fourth bar;

FIG. 17 shows a schematic view of a movable layer arrangement according to a further embodiment of the second aspect.

DETAILED DESCRIPTION OF THE INVENTION

Figure 1:
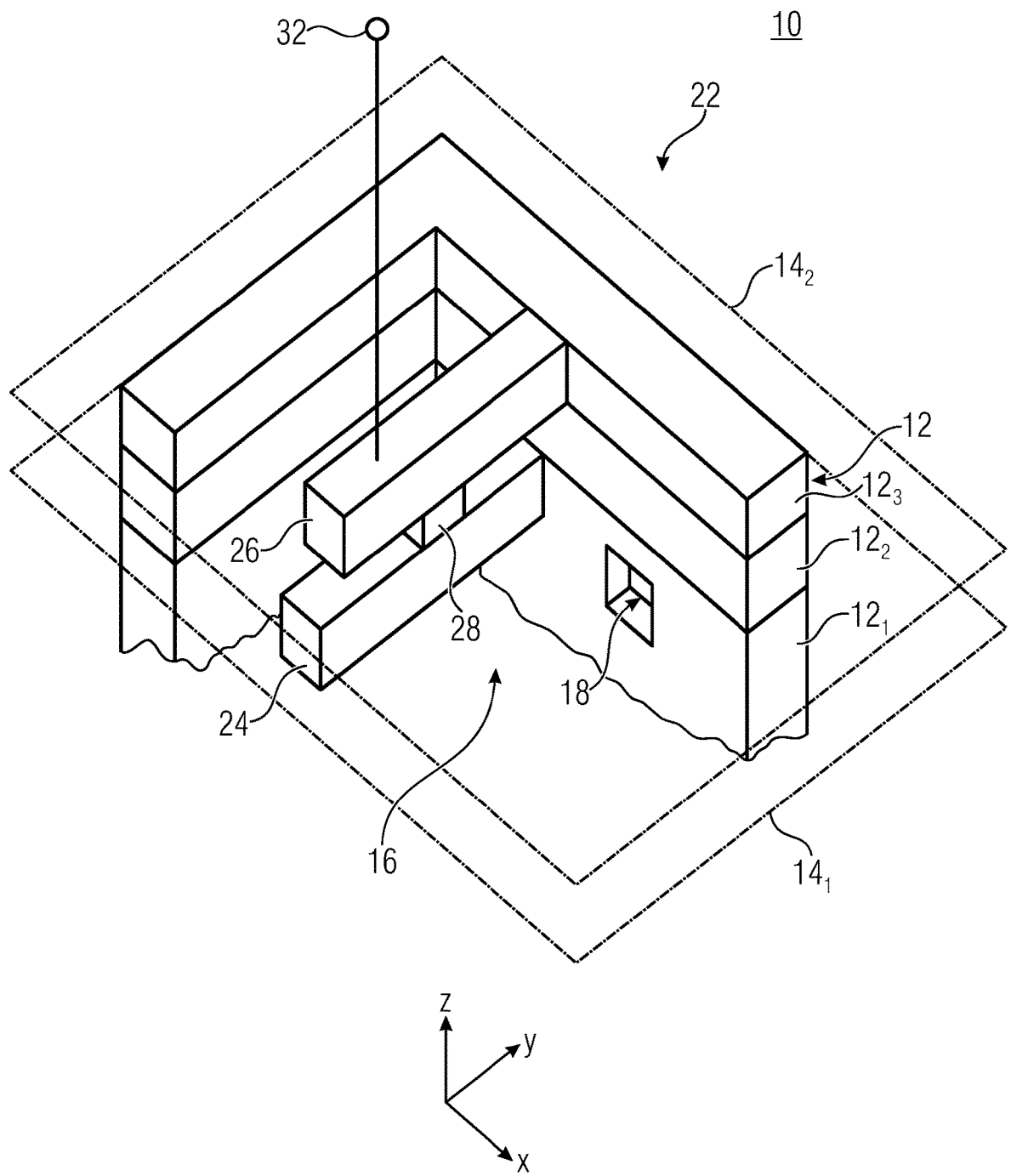
FIG. 1 shows a schematic perspective view of an MEMS according to an embodiment of the first aspect.

Before embodiments of the present invention are explained in detail below with reference to the drawings, it shall be pointed out that elements, objects and/or structures that are identical, have the same function, or have the same effect are provided with the same reference numerals in the different figures, so that the description of these elements shown in different embodiments is interchangeable or can be applied to each other.

Embodiments described below are described in the context of a multitude of details. However, embodiments can also be implemented without these detailed features. Furthermore, for the sake of comprehensibility, embodiments are described using block circuit diagrams as a substitute for a detailed representation. Furthermore, details and/or features of individual embodiments can be combined with each other as long as it this is not explicitly described to the contrary.

The following embodiments relate to microelectromechanical systems (MEMS). Some of the MEMS described herein may be multilayered layer structures. Such MEMS may be made, for example, by processing semiconductor materials on the wafer-level, which may also include a combination of multiple wafers or the deposition of layers on the wafer-level. Some of the embodiments described herein address MEMS planes. An MEMS plane is understood to be a not necessarily two-dimensional or non-curved plane extending substantially parallel to a processed wafer, such as parallel to a main side of the wafer, or the later MEMS. A plane direction can be understood as a direction within this plane, which is also referred to by the term "in-plane". A direction perpendicular thereto, i.e. perpendicular to a plane direction, can be simply referred to as a thickness direction, wherein the term "thickness" does not have any limitation in the sense of an orientation of this direction in space. It is understood that terms used herein, such as length, width, height, top, bottom, left, right and the like, are used only to illustrate embodiments described herein, as their position in space can be changed at will.

FIG. 1 shows a schematic perspective view of an MEMS 10 according to an embodiment of the first aspect. The MEMS 10 comprises a layered structure 12 with two or more layers $12_1$, $12_2$ and/or $12_3$, wherein a number of layers may be any number and is at least 1. Accordingly, an exemplary number of layers is 1, 2, 3, at least 4, at least 5, at least 8, or more. The layers of the layered structure may include different materials and/or material combinations, in particular layers that are compatible with semiconductor processes, such as silicon, gallium arsenide or the like, wherein dopants may be implemented at least locally and/or additional materials may be arranged, such as conductive materials like metals. Alternatively or additionally, electrically insulating materials can also form at least parts of a layer, such as nitride and/or oxide materials.

Embodiments relate to providing different elements in different MEMS planes $14_1$ and $14_2$, arranged parallel to an x/y plane, for example. The planes $14_1$ and $14_2$ and the x/y plane may be arranged parallel to a wafer main side and thus define or describe in-plane planes. The x-direction, the y-direction, and combinations thereof may be understood as the plane direction. A direction perpendicular to this, for example z, can be referred to as the thickness direction.

The planes $14_1$ and $14_2$ may be arranged offset from each other along the z-direction, wherein, to this end, it is irrelevant whether the planes $14_1$ and $14_2$ are arranged in regions where the layered structure 12 has a common layer $12_1$, $12_2$ or $12_3$, or in different layers $12_1$ and $12_3$. Arranging different elements through different layers $12_1$ and $12_3$ with possibly different materials allows for simple manufacturing processes; however, it is also possible to form different structures in different planes $14_1$ and $14_2$ that consist of the same material, or a same layer.

Bottom layers and lid layers which can also delimit a cavity 16 arranged in the layered structure 12 are not shown in FIG. 1. Instead, an opening 18 that fluidically couples an external environment 22 of the layered structure 12 with the cavity 16, i.e. a fluid flow is possible from the external environment 22 into the cavity 16 and/or from the cavity 16 to the external environment 22, is depicted in the layered structure 12. Additional structures, such as valves or filters, can be provided in the opening 18.

The fluidic coupling through the opening 18 may also be implemented, for example, fully or partially by omitting and/or opening the non-depicted lid wafer/lid layer and/or bottom wafer/bottom layer, i.e. the opening 18 may be located in a sidewall structure; however, it may also be located elsewhere. Embodiments further provide multiple openings that may be located at different locations of the layered structure 12, particularly in sidewall structures and/or top or bottom layers. A sidewall structure can be understood as a lateral boundary of the cavity in-plane.

An interaction structure 24 is arranged in the MEMS plane $14_1$. The interaction structure 24 is configured to interact with a fluid disposed in the cavity 16, such as a gas or a liquid, in particular air. A movement of the interaction structure 24 is causally related to a movement of the fluid through the opening 18. That is, a movement of the interaction structure 24 may cause a fluid flow through the opening 18 and/or a fluid flow through the opening 18 may cause a movement of the interaction structure 24, such as by the fluid and the interaction structure 24 contacting each other or interacting with each other. Some embodiments enable operation or implementation of the MEMS as a sensor by movement of the fluid resulting in movement of the interaction structure 24. Some embodiments enable operation or implementation of the MEMS as an actuator by transmitting an actively generated movement of the interaction structure 24 to the fluid, such as can be used for loudspeakers.

An active structure 26 is arranged in the MEMS plane $14_2$. The active structure 26 is mechanically coupled to the interaction structure 24, i.e. they are fixed to each other with a mechanical connection. For this purpose, a mechanical coupling element 28 that at least partially provides the mechanical connection between the interaction structure 24 and the active structure 26 may be provided. The mechanical coupling element 28 may provide a mechanically rigid connection, wherein this is to be understood such that a certain elasticity in the sense of mechanical breaking strength may certainly be desirable. However, excessive elasticity that could lead to an unwanted relative deflection between the interaction structure 24 and the active structure 26, which could mean a loss of force in the active operation of the MEMS 10 and/or a loss of sensitivity in the sensory operation of the MEMS 10, can be avoided by means of the mechanical coupling element 28.

The active structure 26 is configured such that an electrical signal or potential 32 at an electrical contact of the active structure 26 is causally related to a deformation of the active structure 26. The deformation of the active structure 26 is in turn causally related to the movement of the fluid, e.g. by the interaction structure 24 being driven by the active structure 24 to move the fluid, or by the fluid moving the interaction structure 24, which can be detected by the active structure 26. For example, application of the electrical signal 32 can lead to the active structure 26 and thus the interaction structure 24 being driven. Tapping or measuring the electrical signal 32 (which can include applying a reference potential) can be used to detect the movement of the interaction structure.

For example, in a sensory operation of the MEMS 10, the fluid can deflect the interaction structure 24. By means of the mechanical coupling element 28, this deflection can be transmitted to the active structure 26 so that the same is also deflected. For example, the deflection of the active structure 26 can be detectable and/or evaluable by means of the signal 32, for example by means of an Application Specific Integrated Circuit (ASIC), a processor, or a microcontroller, or other suitable devices.

For example, in an actuator mode of the MEMS 10, the signal 32 may cause the active structure 26 to deflect, wherein this deflection is forwarded to the interaction structure 24 by means of the mechanical coupling element 28 so as to cause the fluid to move.

The interaction structure 24 and the active structure 26 are located in different MEMS planes $14_1$ and $14_2$, in particular in respectively different planes. Embodiments provide that an extension of the interaction structure 24 into the plane $14_2$ of the active structure 26 and vice versa is avoided, so that, with respect to their function, a separation is provided between the functional plane of the interaction structure 24 and the active structure 26. This enables a spatial separation of both functionalities, namely the interaction with the fluid on the one hand and the arrangement of the active structure on the other hand. This spatial separation makes it possible to design both structures in a very space-efficient manner and thus to create an MEMS that is very space-efficient overall.

For example, but not necessarily, the active structure 26, the mechanical coupling element 28 and/or the interaction structure 24 are formed fully or partially from a material of surrounding structures of the same respective layer $12_1$, $12_2$ and/or $12_3$. For example, to electrically insulate the interaction structure 24 from the active structure 26, an intermediate layer $12_2$ that includes electrically insulating materials, for example silicon oxide and/or silicon nitride, may be provided. This makes it possible to also form the mechanical coupling element 28 from corresponding materials. However, it should be noted that the mechanical coupling element 28 may comprise any materials as well as any geometric shape implemented to mechanically couple the interaction structure 24 and the active structure 26.

By means of the mechanical coupling element 28, the interaction structure 24 can be suspended and/or fixed, or coupled to the active structure 26, in the MEMS 10. Optionally, further support elements, such as spring elements or the like, that support a movement of the interaction structure 24 can be provided. While the mechanical coupling element 28 may enable mechanical coupling between the interaction structure 24 and the active structure 26, optional additional support elements may enable support of the interaction structure 24 with respect to a surrounding substrate.

Although the MEMS 10 is shown such that the active structure 26 and the interaction structure 24 have approximately the same dimension along the z-direction, the fundamental concept enables to design the interaction structure 24 to be unequally larger along the z-direction than the active structure 26. This can achieve that the interaction with the fluid is predominantly, i.e. at least 90%, at least 95%, or at least 98%, or even completely done by the interaction structure 24, while, with respect to its function, the active structure 26 is designed to generate and/or to sense the movement of the interaction structure 24, and participates in the interaction with the fluid to a small extent or possibly not at all. The layer thicknesses of the interaction structure 24 and the active structure 26 may be adapted to each other and/or to an intended use in any way. For example, but not necessarily, the layer thickness of the interaction structure 24 may be greater than a layer thickness of the active structure 26. In exemplary implementations, the layer thickness of the interaction structure 24 perpendicular to the plane direction x or y is at least 1.1 times, at least 1.5 times, at least 2 times, at least 5 times, at least 10 times, at least 15 times, or at least 20 times a layer thickness of the active structure 26. These are advantageous examples. Other MEMS in accordance with these aspects may have other ratios of the layer thicknesses.

The following embodiments are described in connection with an active implementation of MEMS, such that an actuator operation of the MEMS is implemented, for example as a loudspeaker. However, embodiments are not limited to this, but also refer to using the respective MEMS as a sensor, which is possible in combination with or as an alternative to an implementation as an actuator.

In a corresponding actuator operation, the active structure is formed to include an actuator structure configured to cause deformation of the active structure 26 upon application of the electrical signal 32 to the terminal, causing movement of the interaction structure 24 and movement of the fluid.

Figure 2:
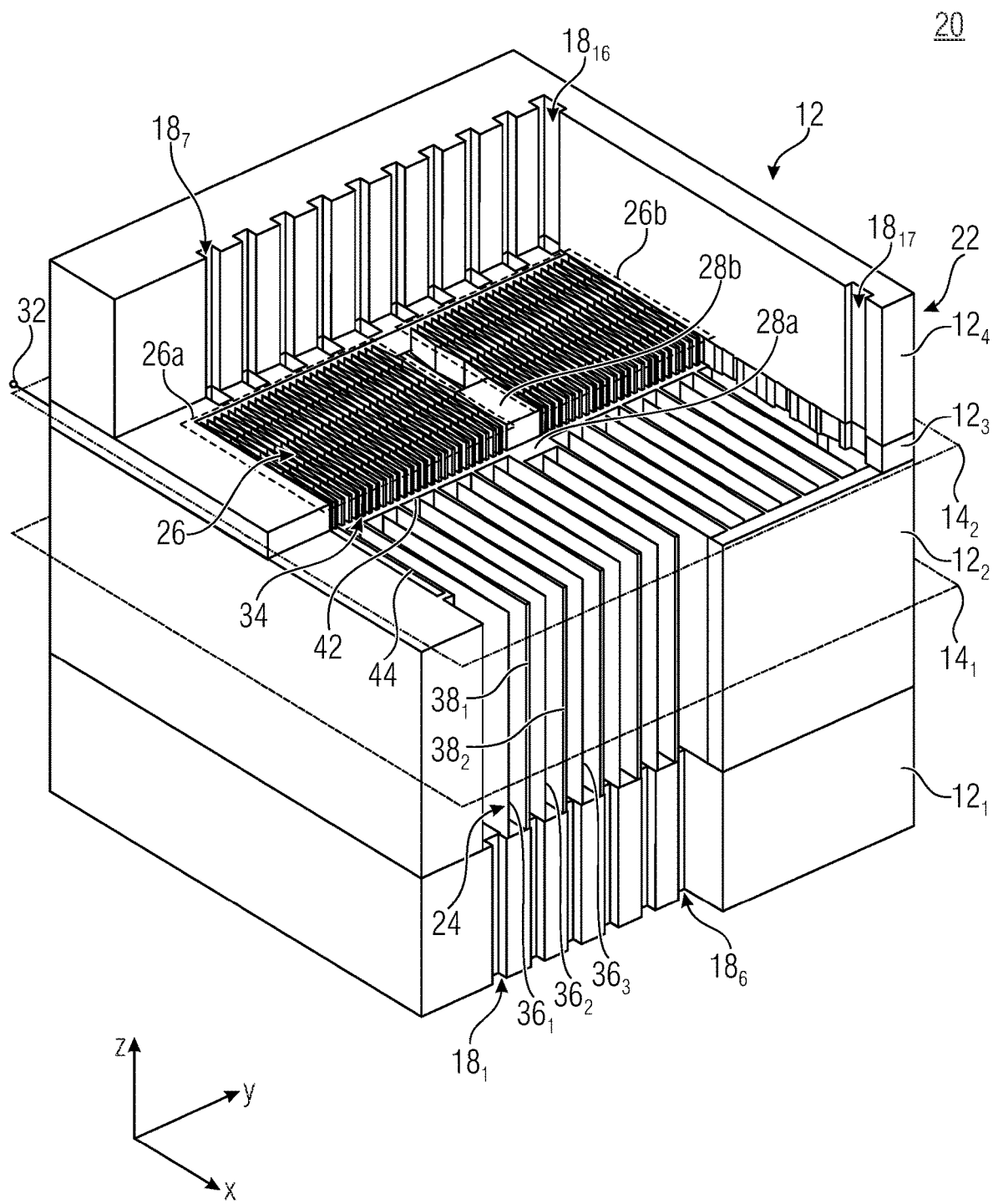
FIG. 2 shows a schematic perspective view of an MEMS according to an embodiment of the first aspect.

FIG. 2 shows a schematic perspective view of an MEMS 20 according to an embodiment, wherein the active structure 26 is arranged in a layer $12_3$ and the interaction structure 24 is arranged in an adjacent layer $12_2$ of a layer stack of the layered structure 12, which further comprises a bottom layer $12_1$ and a lid layer $12_4$. Openings $18_1$ to $18_6$ may be disposed in the bottom layer $12_1$. Alternatively or additionally, one or more openings $18_7$ to $18_{17}$ may be disposed in the lid layer $12_4$.

The mechanical coupling between the active structure 26 and the interaction structure 24 can be carried out by means of coupling sub-elements 28a and 28b, such as comparatively rigid local regions in the interaction structure 24 and/or the active structure 26 that are firmly mechanically connected to each other. Parts of the interaction structure 24 can be set back in the negative z-direction relative to a surface of the coupling sub-element 28a facing the active structure 26, and/or parts of the active structure 26 can be set back along the positive z-direction relative to the coupling sub-element 28b or a surface thereof facing the interaction structure 24, so that a distance or a gap 34 that allows individual parts of the interaction structure 24 and the active structure 26 to move relative to one another can be created between the corresponding regions of the interaction structure 24 and the active structure 26. Alternatively or additionally, additional elements can also be arranged between the coupling component elements 28a and 28b to obtain the gap 34. For example, while parts of the active structure 26 may be movable or deformable, the interaction structure 24 may be formed to be comparatively rigid or immovable. The corresponding relative movement between deformable parts of the active structure 26 and the elements of the interaction structure 24 upon deflection or deformation of the active structure 26 may be improved by providing the gap 34. The gap 34 may be a cavity, but it may also be filled, for example, by a mechanical structure, such as a separation layer, a sliding layer, or the like. This layer can be fluidically sealed at least partially, wherein, for example, movement spaces for a movement of the coupling component elements 28a and/or 28b can be provided.

That is, the coupling element 28 can mechanically connect the active structure 26 firmly to the interaction structure 24 and adjust a distance between the active structure and the interaction structure. Along z, the distance, or the gap, is at least 0.05 μm and at most 20 μm, at least 0.3 μm and at most 10 μm, or at least 0.8 μm and at most 1.5 μm, advantageously 1 μm. An electrically insulating material may be arranged in a region of the gap, i.e. the coupling element 28 may comprise electrically insulating material at least in a region thereof. A mechanical stiffness of the coupling element may correspond to a mechanical stiffness of the active structure 26 and/or the resistance structure 24 along the planar direction, or it may be or less than the mechanical stiffness of the active structure and/or the resistance structure.

For example, while the MEMS 20 may provide fluid flow through from the bottom layer $12_1$ to the lid layer $12_4$ or vice versa, in case of an implementation of the MEMS 20 without openings in the lid layer $12_4$, a fluid flow through the gap 34 may also be omitted. Further embodiments provide for the connection of openings in the lid layer $12_4$, for example, with fluidic channels that extend past the active structure 26.

The interaction structure 24 may be moved along one or more directions by the active structure 26. For example, actuation by the signal 32 may be used to expand or contract a part 26a or 26b of the active structure 26. When removing the signal 32 or returning to to a reference potential, a mechanical stiffness of a material of the active structure 26 and/or of additional elements can be used to move the active structure 26, and thus the interaction structure 24, back again. Furthermore, it is also possible to support or generate this opposite movement by means of a second electrical signal, so that, for example, a compression of one of the parts 26a and part 26b and an expansion of the other part 26b or 26a, respectively, along the positive or negative y-direction, respectively, occurs alternately. For example, in a first time interval, movement of the mechanical coupling element 28b in the negative y-direction may occur through compression of the part 26a, and in a subsequent time interval, movement of the coupling sub-element 28b in the positive y-direction may occur through compression of the part 26b of the active structure.

In FIG. 2, the MEMS 20 comprises the active structure 26 such that two oppositely disposed actuation means 26a and 26b that are configured to provide movement along an actuation direction (for example −y) based on a first actuation signal and to provide complementary movement (for example +y) opposite to the first actuation direction based on a further actuation signal are provided. This can be used to create a kind of back-and-forth movement along an axis. Further embodiments provide multi-axis movement of the interaction structure 24, wherein, for example, different or additional parts of the active structure 26 may be rotated relative to each other at an angle other than 0° and/or other than 180°. The parts 26a and 26b can be formed as respective sub-actuators or actuation means and can be controlled, for example, via an associated actuator signal similar to or equal to the signal 32.

The interaction structure 24 may comprise one or more surfaces or structures provided for interaction with the fluid. In an advantageous configuration, the interaction structure 24 comprises several substantially parallel plate structures or fin structures 36.

Optionally, elements that divide the cavity 16 into sub-cavities may be provided between adjacent moving fin structures 36. These advantageously rigid elements or fins 38 may define respective sub-cavities of the cavity of the layered structure 12 in pairs or in combination with a surrounding substrate. At least one of the structural parts of the interaction structure, hereinafter referred to as fins, which comprise any geometry, but advantageously a low-mass rigid implementation, is arranged in at least one of the sub-cavities. The respective movable fin 36 may thus be arranged to be movable back and forth in a sub-cavity. A joint movement of several or all of the moving fins 36 can be made possible by mechanically coupling the moving fins 36 to one another, for example by means of a connection element 42 that mechanically connects the moving fins 36 to one another and that can be connected to the coupling sub-element 28a, so that the movement of the active structure 26 is forwarded to the moving fins 36 therethrough.

One or more suspensions 44 may connect the connection element 42 and/or the moving fins 36 or the interaction structure 24 to the surrounding substrate, such as the layer $11_2$. The rigid fins 38 may also be connected to the substrate in this or in another layer.

In other words, the plane having the passive elements of the interaction structure 24 can be used to generate the mechanical effect with a high effectiveness. The effectiveness can be improved by the increased packing density and the plane height or layer thickness of the layer $12_2$, which is independent of the active layer. The omission of the active elements in the structural plane $12_2$ reduces the space requirement, at least with respect to the chip surface needed, and allows different and adapted manufacturing methods of the different planes. It is possible to implement the passive elements of the structural plane $12_2$ as an elastically suspended or alternatively unsuspended free resistive element 42. Alternatively, several elastic bars or other structures, for example for sound wave generation, can be located in the structural plane $12_2$.

The described division of the functional planes is particularly advantageous because, for example, a large active area together with a small distance between electrodes or any other active elements of the active structure 26 may be desirable, e.g. a large aspect ratio, to generate high forces or high sensitivities. In the manufacturing processes, such an aspect ratio, i.e. a thickness along the z-direction with a desired distance in x/y may be limited. At the same time, a large interaction area may be desirable for interaction with the fluid; however, which does not necessarily have to be as densely packed as is desired for the active structure. In other words, there are limitations in manufacturing processes. For example, one possible limitation arises due to the manufacturing process. In order to enable sufficiently high actuating forces, the aim is to realize small electrode distances of the classic NED. With large actuator thicknesses (which displace a sufficient amount of fluid), small electrode distances are no longer feasible, or only with great and possibly unjustified effort. This results in a contradiction between the necessary height of the electrodes and the necessary electrode distance.

Decoupling the active structure from the interaction structure 24 and the requirement of the small distances in the interaction structure 24 being possibly absent or less critical make it possible to maintain the aspect ratios in the active structure 26, since a small extension along z is sufficient for the desired forces. For the fluidic effect, a higher extension along z can be chosen for the interaction structure 24, which may be unproblematic or less problematic, as the distances between the individual structures may be greater here.

Figure 3A:
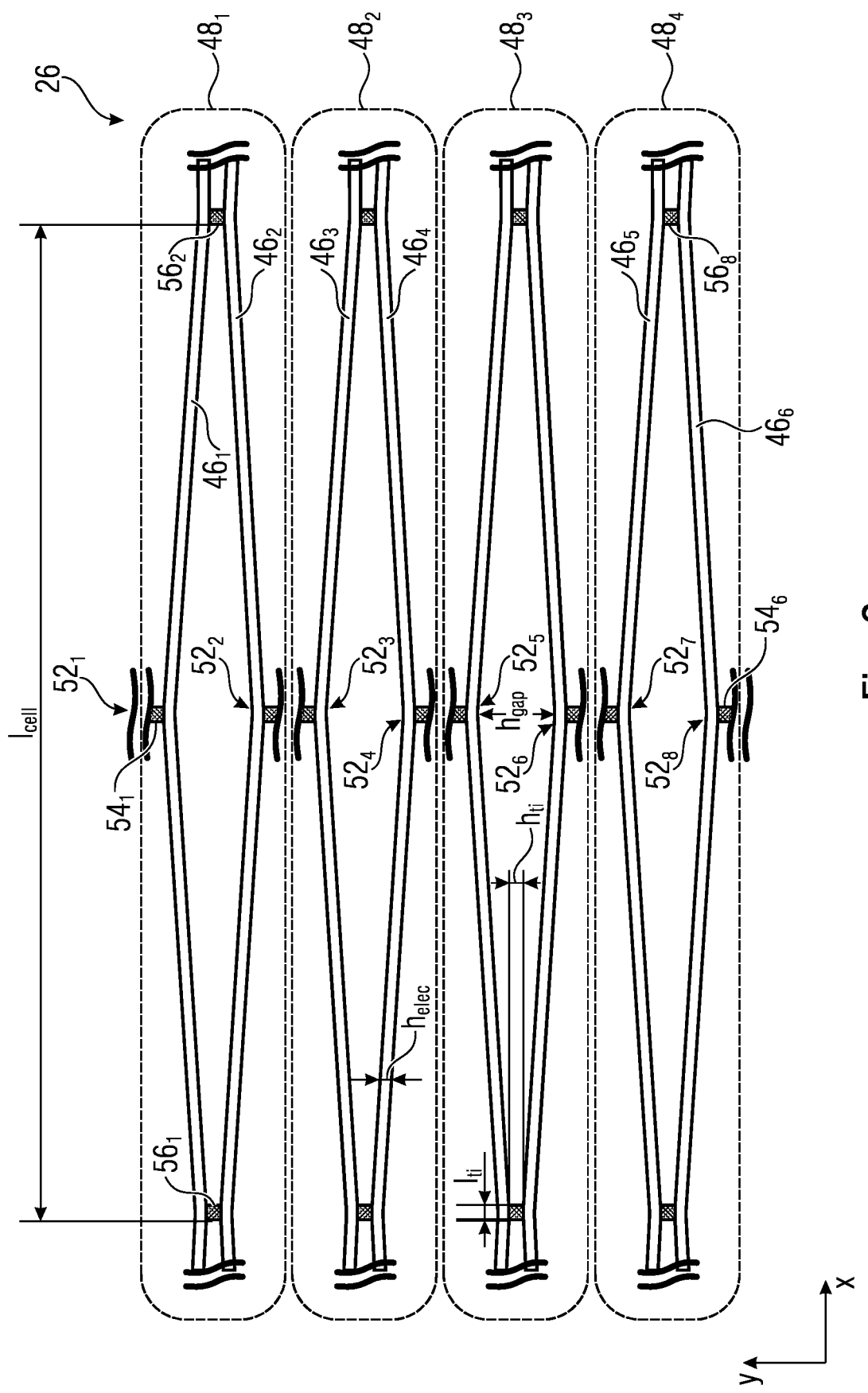
FIG. 3a shows a schematic top view of a part of an active structure of an MEMS according to an embodiment of the first aspect.

FIG. 3a shows a schematic top view of a part of the active structure 26. The active structure 26 may comprise a plurality of electrode elements $46_1$ to $46_6$ arranged side by side, wherein a total number of the electrode elements may be greater than 2, greater than 4, greater than 6, greater than 8, greater than 10, or greater than 20, greater than 30, greater than 50, or higher. The electrodes may be formed as plate-like structures which are approximately parallel to each other in a, possibly theoretical, reference state such that the main sides of the electrodes face each other. A main side is understood to be a side that has a comparatively large surface area compared to secondary sides connecting the two main sides. In some embodiments, the electrodes can be pre-deflected from this reference state, as shown in FIG. 3a, for example.

Main sides of adjacent electrode pairs, such as $48_1$ and $48_2$, $48_2$ and $48_3$, or $48_3$ and $48_4$ can also be arranged facing each other. A respective electrode pair $48_1$ to $48_4$ may be configured such that upon application of an electrical potential, for example by means of the signal 32, a distance $h_{gap}$ between the electrodes is at least locally reduced to provide at least part of an actuator stroke. By serially connecting multiple pairs one after another, a high total stroke of the active structure 26 can be obtained.

In central regions $52_1$ to $52_8$ of the electrodes, a respective electrode pair can be connected to an adjacent electrode pair or to the surrounding substrate or a supporting structure. To this end, spacer elements $54_1$ to $54_6$ can be arranged, which can optionally also be formed in an electrically insulating manner in order to provide electrical insulation of adjacent electrodes. Alternatively, electrical insulation may also be provided as a coating on the electrode elements and/or by electrically insulating electrodes of the same electrode pair 48 from each other, such as by spacer elements $56_1$ to $56_8$. However, the spacer elements $56_1$ to $56_8$ may alternatively or additionally be realized by means of the surrounding substrate, such as the layer $12_3$. Thus, instead of the spacer elements $56_1$ to $56_8$, electrical insulation can also be provided via the surrounding medium (or vacuum) in interaction with the substrate. It is also possible to apply the same potential to adjacent electrodes of different pairs, which allows for omitting electrical insulation at this location for these electrodes, if necessary.

That is, the electrode elements of an electrode pair may both be mechanically fixed by discrete outer spacer elements 56 in an edge region of the electrode elements and/or the electrode elements may be mechanically fixed in an edge region thereof with the layered structure in order to set a distance $h_{ti}$ between the electrode elements, which is otherwise adjustable via the spacer elements 56.

In the edge region, the distance $h_{ti}$ can be kept small, for example in a range from 0.01 µm to 200 µm, advantageously from 0.3 µm to 3 µm, and especially advantageously in a range of 1.3 µm.

By means of the inner spacer elements $52_1$ to $52_6$, a comparable or equal distance can be set between the electrode pairs as between individual electrodes obtained by means of the outer spacer elements 56.

Application of an electrical potential between electrode elements of an electrode pair 48 can cause a change in length of the electrode pair along a direction within the MEMS plane $14_2$, for example along y, and thus a stroke of the active structure 26 which can be transmitted to the interaction structure 24.

Due to the arrangement of the spacer elements 54, which are optional at least in parts, in central regions 52, these can be referred to as inner spacer elements. The optional spacer elements 56 in the outer region or edge regions can be referred to as spacer elements.

The active structure 26 may have a multitude of electrode pairs 48, each of which is connected in a central region in a mechanically firm manner at discrete locations to electrode elements of adjacent electrode pairs, such as by the inner spacer elements 54.

In other words, FIG. 3a shows a part of a deflectable element of the active structure 26, which may also be referred to as a micromuscle, and which may comprise a multitude of conductive bars/electrodes 46 arranged in a discrete distance. In an advantageous embodiment, these bars are a doped semiconductor material and each represent at least one electrode, for example of metal or silicon, but advantageously silicon. Opposing bars are connected to each other via an electrically non-conductive medium. The non-conductive medium may also be an insulating spacer layer segmented in a first and a second extension direction of the deflectable element. That is, the bars may be connected to each other by an insulating spacer 54 and/or 56. Further embodiments include gaseous, liquid, or solid non-conductive media. In the case of gaseous and liquid spacer layers, the deflectable elements may additionally be fixed to the substrate. In the case of a solid non-conductive medium, the elasticity is advantageously less than the elasticity of the solid conductive medium. An electrical voltage is supplied to the bars such that there is a potential difference between two adjacent deflectable elements of an electrode pair, such as $46_1$ and $46_2$. This potential difference generates an electrostatic force and the bars are attracted to each other. The elasticity of the non-conductive medium or segmented insulating spacer layers 54 and/or 56 may provide a restoring force. A restoring force may also be obtained from the elasticity of the conductive bars 46. For this purpose, insulating solid bodies corresponding to the insulating spacers 56 may be arranged between the conductive solid bodies, such as by implementing the spacers 54. One possible arrangement of the spacer elements 54 and 56 is, for example, a so-called "brick pattern", wherein the support points between the conductive media alternate from row to row, so that the next support point is between two support points of the adjacent row. The corresponding structure is a periodic structure of repeating single cells 48, but this is not necessarily required. When generating a potential difference between the adjacent conductive solid bodies, the overall structure can be deformed.

In FIG. 3a, $I_{cell}$ denotes a dimension of a muscle cell along the x-direction, $I_{ti}$ denotes a dimensioning of a support point along the x-direction, $h_{ti}$ denotes a dimensioning of a support point along the y-direction, $h_{elec}$ denotes a dimensioning of an electrode along the y-direction and $h_{gap}$ denotes a distance between two electrodes along the y-direction. The mentioned parameters can be implemented individually and independently, but can also be adapted to each other. Each of these parameters can be within a range of at least 0.01 μm and at most 200 μm, e.g, $L_{cell}$ may even be up to 1500 μm. For example, the following is particularly advantageous for a special implementation: $I_{cell}$=124 μm, $I_{ti}$=4 μm, $h_{gap}$ (in a reference state of minimum or maximum actuator deflection)=1.3 μm, $h_{elec}$=1 μm and/or $h_{ti}$=1 μm, each being modifiable and/or within certain tolerances.

During an actuation, a change of the value $h_{gap}$ (for example a shortening) can take place along the y-direction and, depending on the geometric design, a change of the value $I_{cell}$ can take place along the x-direction. Depending on how the coupling to the resistive element or coupling sub-element 28a in FIG. 2 is realized, one of the deformation directions x or y is transferred to the coupling sub-element 28b in FIG. 2. By arranging the further cells in a row next to each other along the y-direction and/or the x-direction, the displacement of the direction, or the force of the individual cell, can be satisfied with or multiplied by the number of cells.

The geometry of the deflectable element 26 (in other words, the muscle cell or micromuscle) can be used to specifically adjust the stiffness in the x-direction and/or y-direction. In addition, the force of each deflection can be adapted or optimized, for example with respect to a "stress-strain curve". In sound generation, initially a lot of deflection with relatively little force is needed for the initial situation. When the displaced volume increases, the restoring force of the fluid (for example air) onto the muscle increases. It is then necessary to generate more force for deflection. The choice of cell geometry allows to adjust the change in force during the deflection process. Furthermore, the ratio of length change in the y-direction to the x-direction (effective Poisson's ratio of the structure) can be adapted via the cell geometry. By choosing the right cell geometry, muscles having an effective Poisson's ratio of less than 0 can be designed. Such structures, called auxetic structures, can show very special properties during curvature. These properties offer potential for improvements to the muscle in terms of the vertical pull-in.

Figure 3B:
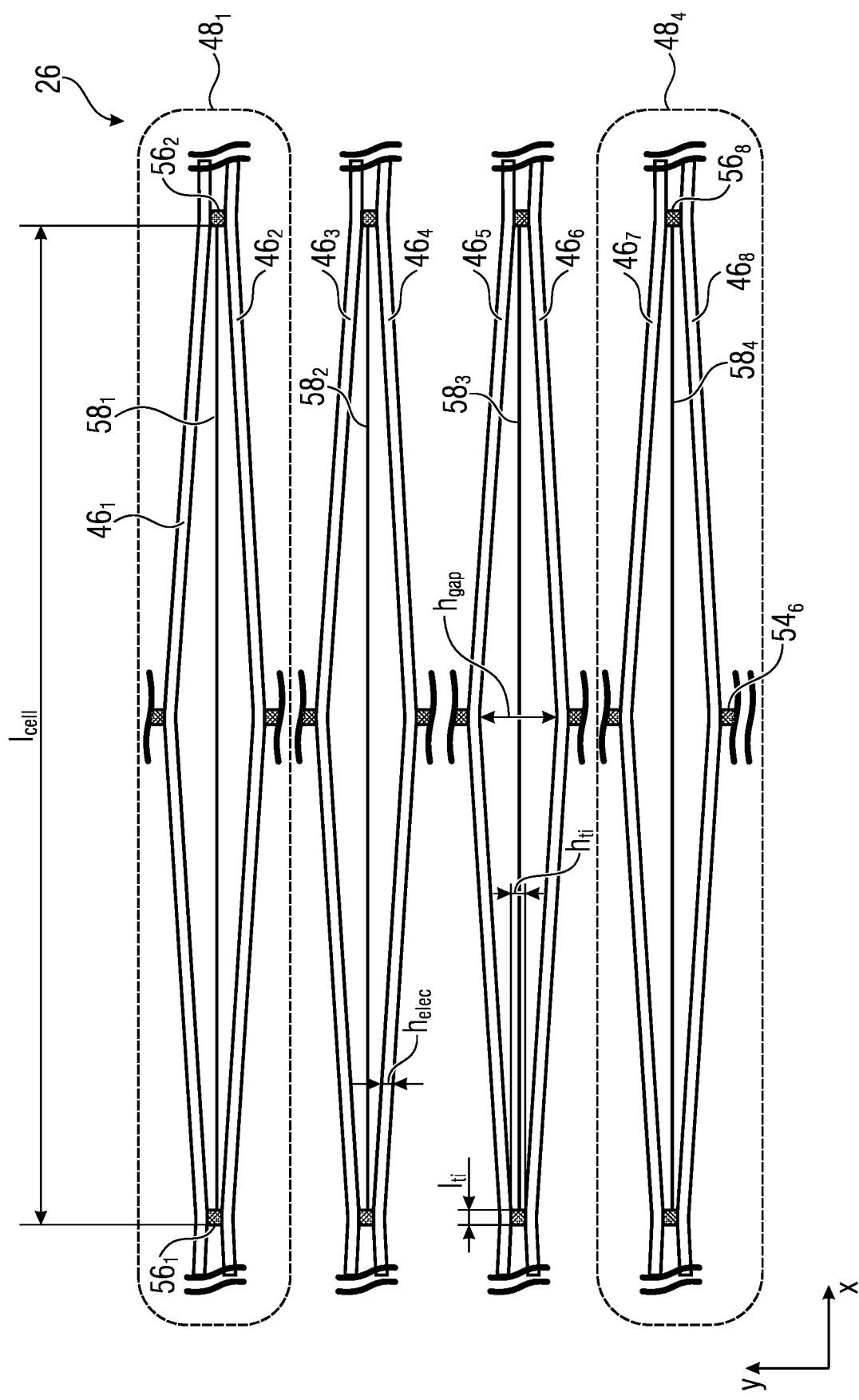
FIG. 3b shows a schematic view of a part of an active structure according to an embodiment of the first aspect, in which insulation layers are additionally provided.

FIG. 3b shows a schematic top view of a part of the active structure 26 according to an embodiment. Compared to FIG. 3a, the same elements may be provided and, in addition, an electrically insulating layer $58_1$, $58_2$, $58_3$, and $58_4$, respectively, may be provided between adjacent electrodes $46_1$ and $46_2$, $46_3$ and $46_4$, $46_5$ and $46_6$ and/or $46_7$ and $46_8$. The insulating layers 58 may comprise electrically insulating materials, such as silicon oxide, silicon nitride, or other insulating materials, in particular $Al_2O_3$.

Although the electrically insulating layers $58_1$ to $58_4$ are depicted such that they have a dimension along the y-direction that is thinner than the outer spacers 56, they may alternatively have an equal or greater thickness/expansion, e.g. which makes it possible to adjust or influence an end position during actuation. The thickness can be uniform or it may be variable along the x-direction.

The electrically insulating layers $58_1$ to $58_4$ may be suspended between the outer spacer elements arranged in an edge region of the electrodes of the electrode pair $48_1$ to $48_4$ so as to mechanically fix the electrodes. Alternatively, an arrangement of the insulating layers $58_1$ to $58_4$ may be done on the substrate or on other fixed structures. Alternatively or additionally, a corresponding configuration can also be obtained by arranging the outer spacer elements 56 as a continuous, possibly locally thinned-out layer between the electrodes.

In other words, FIG. 3b shows another embodiment with an insulating spacer layer. The illustrated alternative spacer 58 provides a connection between the spacers 56 and is, for example, connected in a substance-to-substance manner thereto. In an advantageous embodiment, the spacers 56 and 58 are made of the same material. Advantageously, this increases the dielectric constant in the gap. In addition, there is also an improvement with respect to the stiffness of the deflectable elements in their thickness direction. Likewise, short circuits between the electrodes can be avoided, for example during lateral pull-in. Furthermore, the reliability of the active structure 26 can be improved because the so-called cold anodization can be reduced or avoided.

Figure 3C:
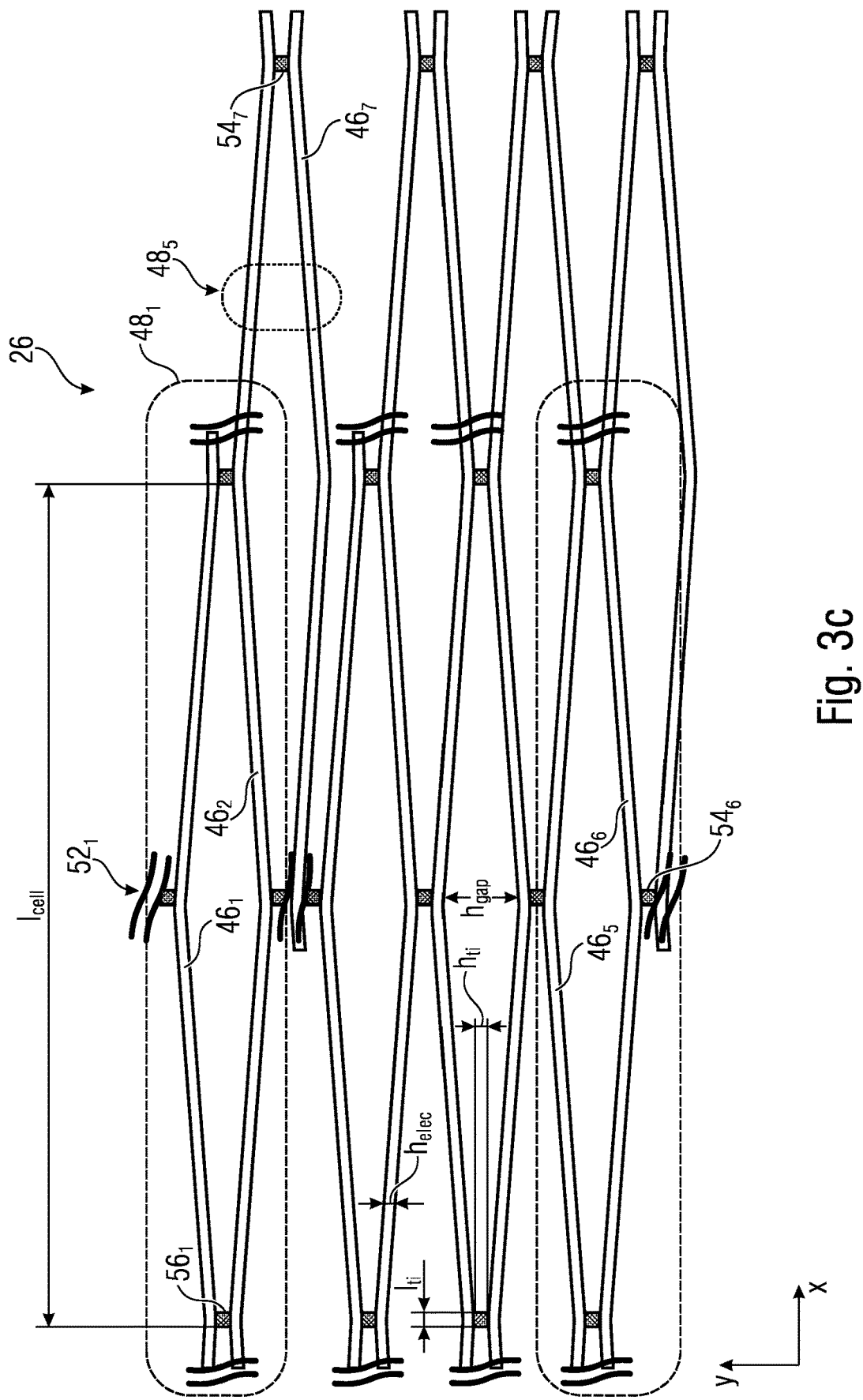

FIG. 3c shows a schematic top view of a part of the active structure 26 according to a further embodiment, which further develops the implementation of FIG. 3a. In a region of the elements referred to as inner spacers 52 in connection with FIG. 3a, further electrodes, such as the electrode $46_7$, can be arranged to form a further electrode pair $48_5$ with one or more electrodes or portions thereof, for example by applying different potentials. In other words, a further electrode pair can be defined by appropriate spacing and fixing by means of electrodes of different electrode pairs. A kind of honeycomb pattern can be obtained, which offers high forces with high stability at the same time.

Figure 3D:
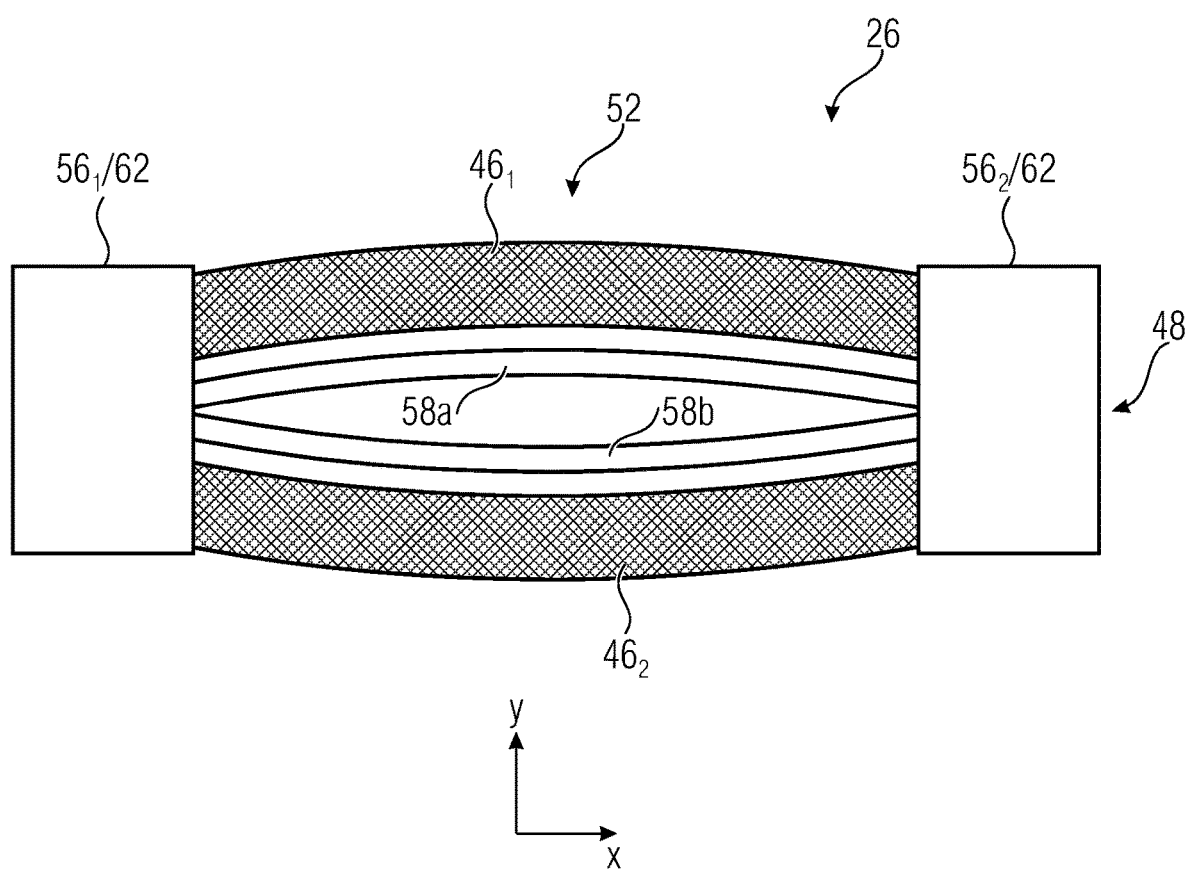
FIG. 3d shows a schematic top view of a part of an active structure according to an embodiment of the first aspect, in which a shape of the insulation layer is adapted to an electrode shape.

FIG. 3d shows a schematic top view of a part of the active structure 26, or an electrode pair 48 thereof. In contrast to previously described explanations, the electrodes $46_1$ and $46_2$ are held, fixed and spaced apart from each other opposing each other by means of a substrate material 62, for example in the material of the layer $12_3$ of the MEMS 20. The electrodes $46_1$ and $46_2$ can have an increasing distance from each other towards the central region 52, for example by a curvature facing away from each other and/or by corresponding fixations in the central region 52, which can also include straight electrode shapes in portions, such as those shown in FIGS. 3a and 3b. This enables adaptation to active generation of attractive forces.

Instead of a single insulation layer shown in FIG. 3b, two insulation layers 58a and 58b can also be arranged between the electrodes $46_1$ and $46_2$, wherein it can be seen that, instead of fixing the insulation layers 58a and 58b and/or the electrodes $46_1$ and $46_2$ to the substrate material 62, they can also be fixed to each other by means of the outer spacer elements 56. Alternatively, only one of the insulating layers 58a or 58b may be arranged. A shape of the insulating layer 58a and/or 58b may be adapted to a shape of the electrodes $46_1$ and $46_2$, respectively, of the electrode pair 48, said shape being is pre-deflected in a passive state of the MEMS. For example, the insulating layer 58a is curved at least within a tolerance range according to a curvature of the electrode $46_1$. Likewise, the insulating layer 58b is curved at least similarly to the electrode $46_2$.

In this respect, the layers 58a and 58b can be understood as sub-layers of the insulation layer 58, wherein each sub-layer follows a pre-deflected shape of the electrode $46_1$ and $46_2$, respectively. A distance between opposing main surfaces of the sub-layers 58a and 58b (for example, the main surfaces facing the respective electrode $46_1$ and $46_2$) along an electrode path, such as along the x-direction in the MEMS plane of the active structure between the attachment regions to the substrate material 62 may be variable in this respect. An advantage of such an implementation is that the insulating layer 58a and/or 58b can comparatively easily elongate or expand along the x-direction in accordance with to the electrodes $46_1$ and $46_2$ as the electrodes move towards each other. This can reduce or avoid material stress in the insulating layer 58a and/or 58b, which is beneficial both for the deflection behavior of the actuator and for the material stress of the insulating layer.

In other words, FIG. 3d shows how the insulating layer 58a/58b between the electrodes $46_1$ and $46_2$ follows the shape of the electrodes. This has the advantage that the stiffness of the deflectable elements in the x-direction is significantly increased because a higher proportion of the insulating spacer layer, for example comprising $Al_2O_3$, is used.

Figure 3E:
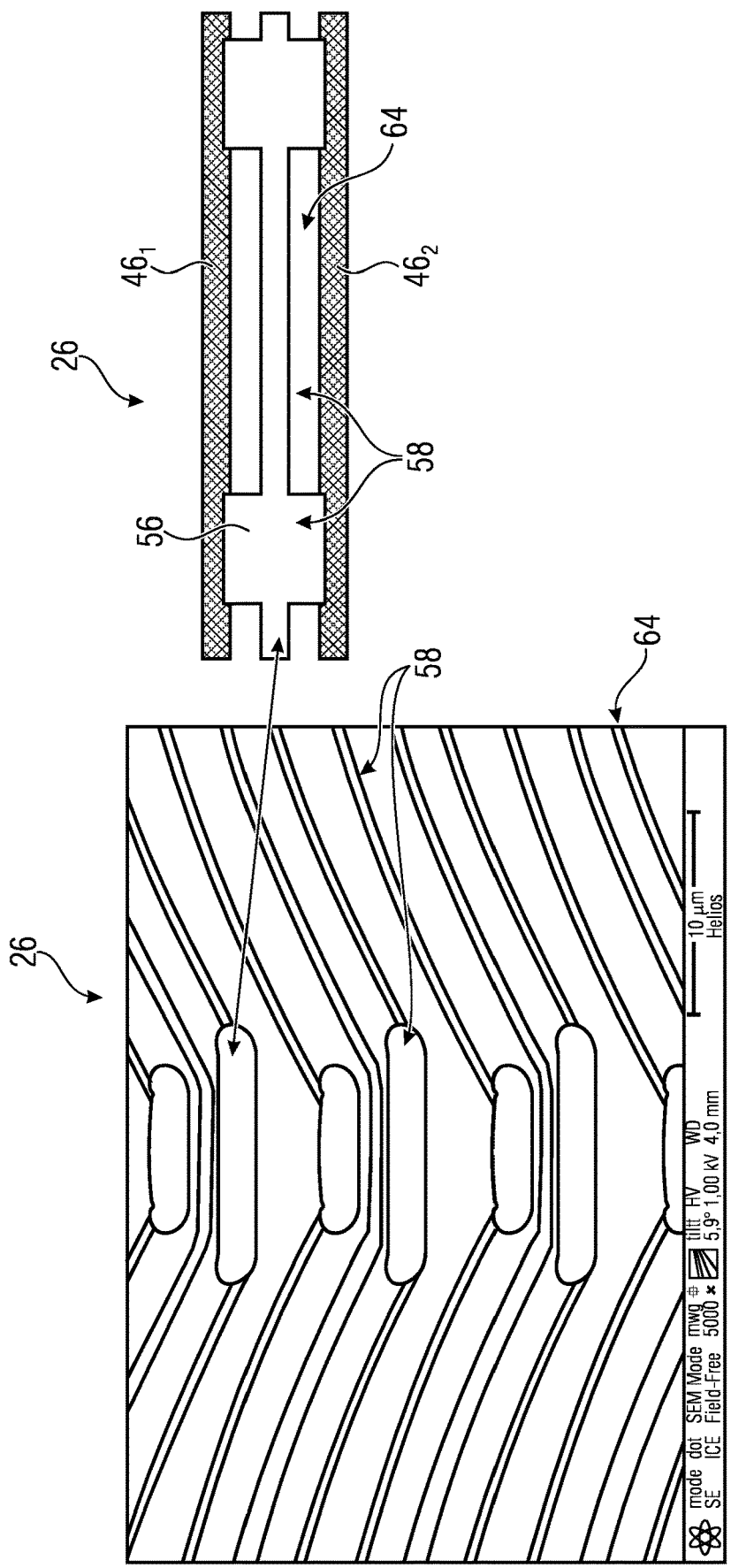
FIG. 3e shows a scanning electron micrograph and a schematic top view of a part of the active structure according to an embodiment of the first aspect.

FIG. 3e shows a scanning electron micrograph and a schematic top view of a part of the active structure 26. What is illustrated is the location of a fluid, or cavity, 64 between insulation structures and insulating layers.

In other words, FIG. 3e shows, in a scanning electron micrograph, mushroom-shaped spacers 56, consisting of $Al_2O_3$, which are used when short circuits are to be prevented during a vertical pull-in. Through this, e.g., these mushrooms no longer allow that the active structure 26 comes into contact with the interaction structure 24 and that an electrical short-circuit occurs. The spacers 56, which are referred to as mushrooms because of their basically arbitrarily adjustable shape, can protrude from the depicted image plane and prevent an electrical short circuit between the active structure 26 and the interaction structure 24. Thus, spacers can be created between the interaction structure 24 and the active structure 26 distributed over the entire component extension.

Figure 4A:
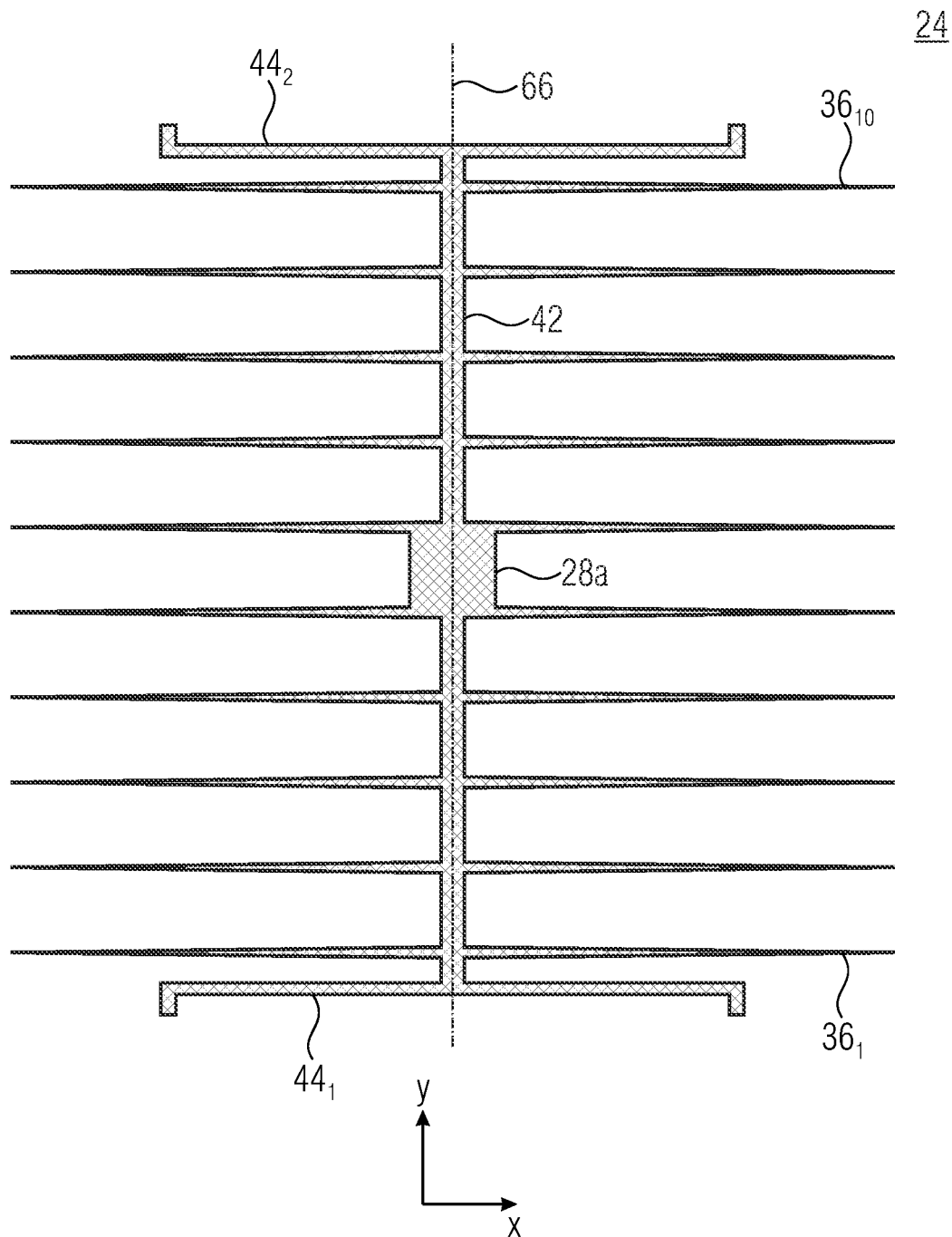
FIG. 4a shows a schematic top view of an interaction structure according to an embodiment of the first aspect.

FIG. 4a shows a schematic top view of an interaction structure according to an embodiment, for example, which can be used in the MEMS 10 and/or 20.

For example, the interaction structure 24 may be formed symmetrically with respect to an axis of symmetry 66, e.g., which may be arranged parallel to a y-direction in the MEMS 10 or 20, although this is not required.

Several resistive elements or fins $36_1$ to $36_{10}$ can be arranged along the y-direction on the connection element 42, a number, a size, and/or a geometry being adaptable to the respective requirement. At opposite ends, the interaction structure 24 may be connected to a surrounding substrate via advantageously elastic suspensions $44_1$ and $44_2$. While the suspensions $44_1$ and $44_2$ are advantageous in terms of guiding the movement of the interaction structure 24, it may already be sufficient to provide a suspension by means of the coupling sub-element 28a. Alternatively or additionally, other types of motion guidance and/or suspension may be provided. Embodiments provide fins $36_i$ that have deviating cross-sections. For example, the fins $36_i$ may be tapered starting from a center. In the connection region with 42, the widths or material expansions or material thicknesses of the fins $36_i$ are, for example, large, and they are small at the freely vibrating end. This has the advantage that possible stresses in the connection region can be minimized in accordance with the material. Alternatively or additionally, it is possible to implement the fins $36_i$ so as to be hollow on the inside. This offers a high potential for lightweight construction, especially in the connection region with 42, where there is a high potential for weight savings.

Figure 4B:
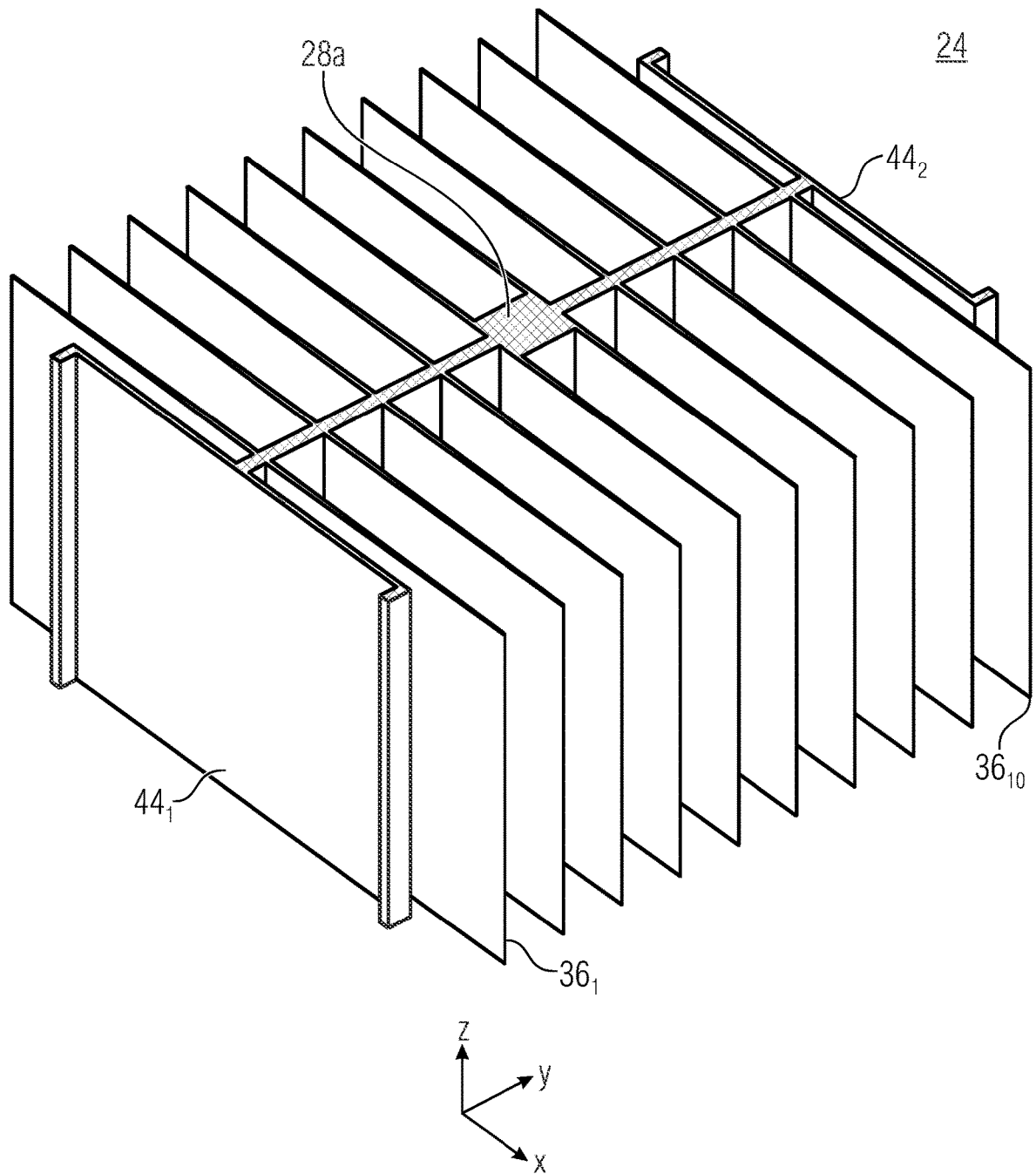

FIG. 4b shows a schematic perspective view of the interaction structure 24 of FIG. 4a. The resistive structure 24 can be moved back and forth as described in connection with FIG. 2, which is why the interaction structure 24 can also be referred to as a shuttle. The interaction structure 24 may be considered to be a passive element, as is the case for other moving structures in the structural plane $14_1$. Elastic suspensions $44_1$ and $44_2$ may be done via elements that have a lower stiffness than the passive or active elements and/or are formed as a springy element. The elastic suspension $44_1$ and/or $44_2$ allows the natural frequencies of the shuttle to be adjusted without having to change the active layer. For this purpose, geometries deviating from FIGS. 4a and 4b can be used. In addition, an elastic guidance of the resistive element or the interaction structure 24 can be realized by a suitable choice of the stiffness distribution. Such a guidance can be implemented in such a way that the resistive element only has mobility, or at least advantageous mobility, in the intended direction.

Compared to the mechanical coupling by the coupling element 28 and the coupling sub-elements 28a and 28b, respectively, the stiffness of the suspension $44_1$ and $44_2$ may be lower, so that, for example, the mechanical coupling of the coupling element 28 has a mechanical stiffness that is greater by a factor of at least 3 than a mechanical coupling of the interaction structure 24 to the layered structure by means of the suspensions $44_1$ and $44_2$ or other connections.

Further embodiments have MEMS with a resistive element, or an interaction structure, that is implemented without additional suspensions $44_1$ and $44_2$. This means that, apart from the mechanical coupling 28a/28b to the active structure, the interaction structure 24 can be arranged without suspensions. In the embodiment according to FIGS. 4a and 4b, the resistive structure 24 is on the one hand connected on at least one side to the surrounding substrate (not depicted), and on the other hand it is connected to the actuators, i.e. the micromuscles or deflectable elements 26 of the drive plane $14_2$. This connection is advantageously rigid. Here, for example, form-fitting, force-fitting, and/or material-fitting connections can be considered. In an advantageous embodiment, the connection element/coupling element 28 is connected to the interaction structure 24 (passive element) and the active structure 26 (active element) in a substance-to-substance manner and has a stiffness corresponding to the active and passive elements. Other embodiments include a connection element 28 having a lower stiffness than the active and passive elements. In other words, in alternative embodiments, it is implemented as a spring element. One of the two connection elements 28a or 28b protrude from the respective plane by at least 1 μm, so that it can be ensured that the connection is actually done only via the connection element 28a and the connection element 28b. This means that the gap 34 shown in FIG. 2 can have an extension of 1 μm, for example.

Figure 5A:
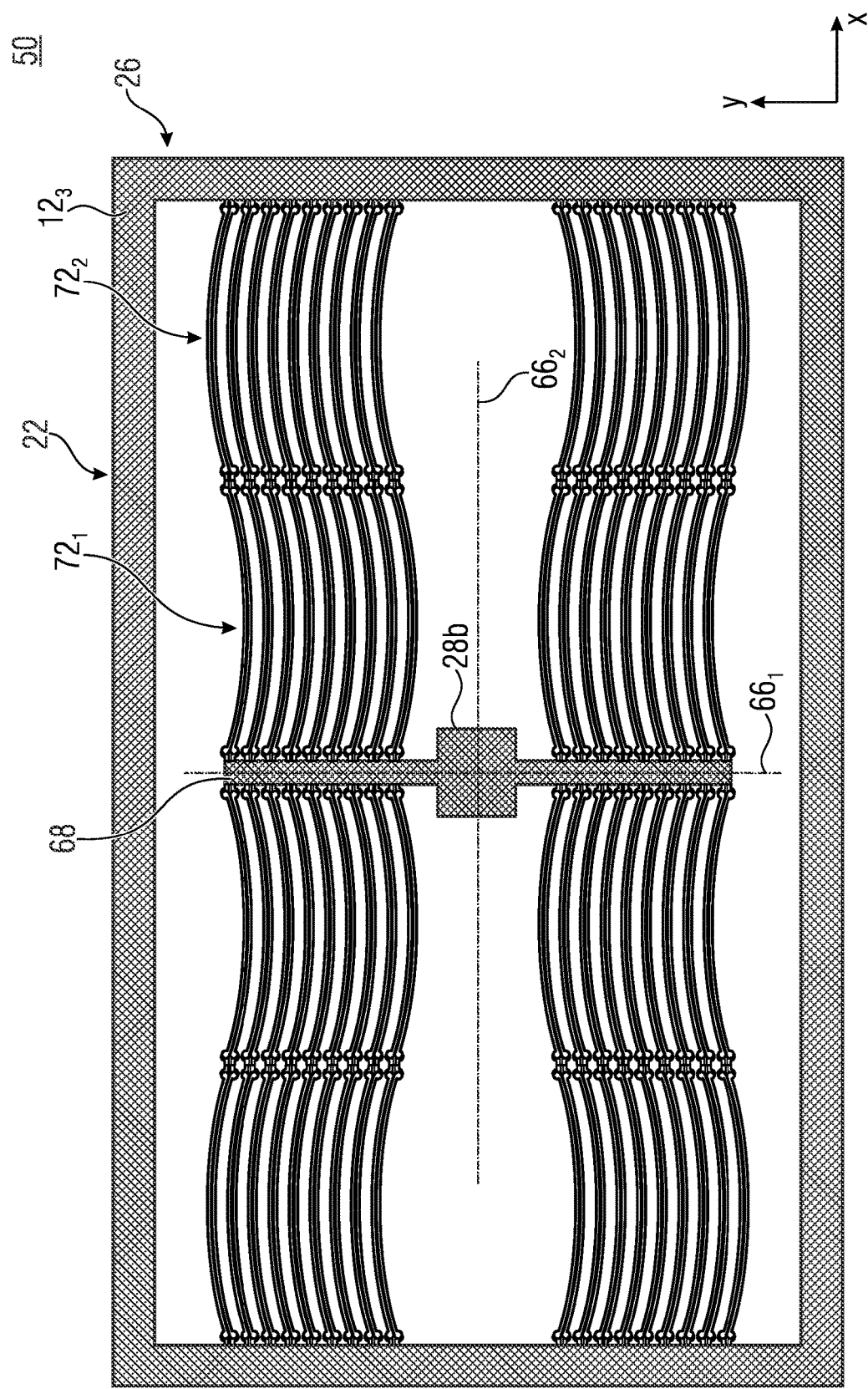
FIG. 5a shows a schematic top view of a further active structure of an MEMS according to an embodiment of the first aspect.

FIG. 5a shows a schematic top view of an active structure 26 of an MEMS 50 according to an embodiment, which can be readily combined with interaction structures from the MEMS 10 and/or 20 as well as further structural elements of embodiments described herein.

The sub-element 28b is mechanically connected to or integrally formed with a connection element 68 having arranged thereon a plurality of electrode assemblies 72. Exemplarily, the electrode assemblies are serially connected one after the other such that, for example, electrode assemblies 721 and 722 are serially connected one after the other between the substrate in the layer $12_3$ and the connection element 68. Each of the electrode assemblies 72 may form a movable layer arrangement, which is described in more detail in connection with FIG. 5b. The movable layer arrangements may be curved with a radius of curvature, wherein curvature gradients of movable layer arrangements 72 connected in series, such as the movable layer arrangements $72_1$ and $72_2$, may further optionally have alternating signs. For example, this can at least influence a path of the generated movement upon simultaneous or alternate actuation of the movable layer arrangements $72_1$ and $72_2$.

The movable layer arrangements 72 may be arranged in several groups between the coupling element 68 and the substrate. In FIG. 5a, four groups in four quadrants are exemplarily provided so as to enable a symmetrical suspension of the coupling sub-element 28b.

In this case, the multitude of movable layer arrangements is arranged, at least in groups, in the example of the MEMS 50 with respect to several symmetry axes $66_1$ and $66_2$, which are arranged, for example, parallel to the x-direction and/or the y-direction. Furthermore, there may also be another type of symmetry, for example a point symmetry, for example around a geometric center point of the coupling sub-element 28b in the depicted plane. A rotational symmetry or other types of symmetry may also be provided, which is also adjustable on the basis of the actuation directions provided.

Figure 5B:
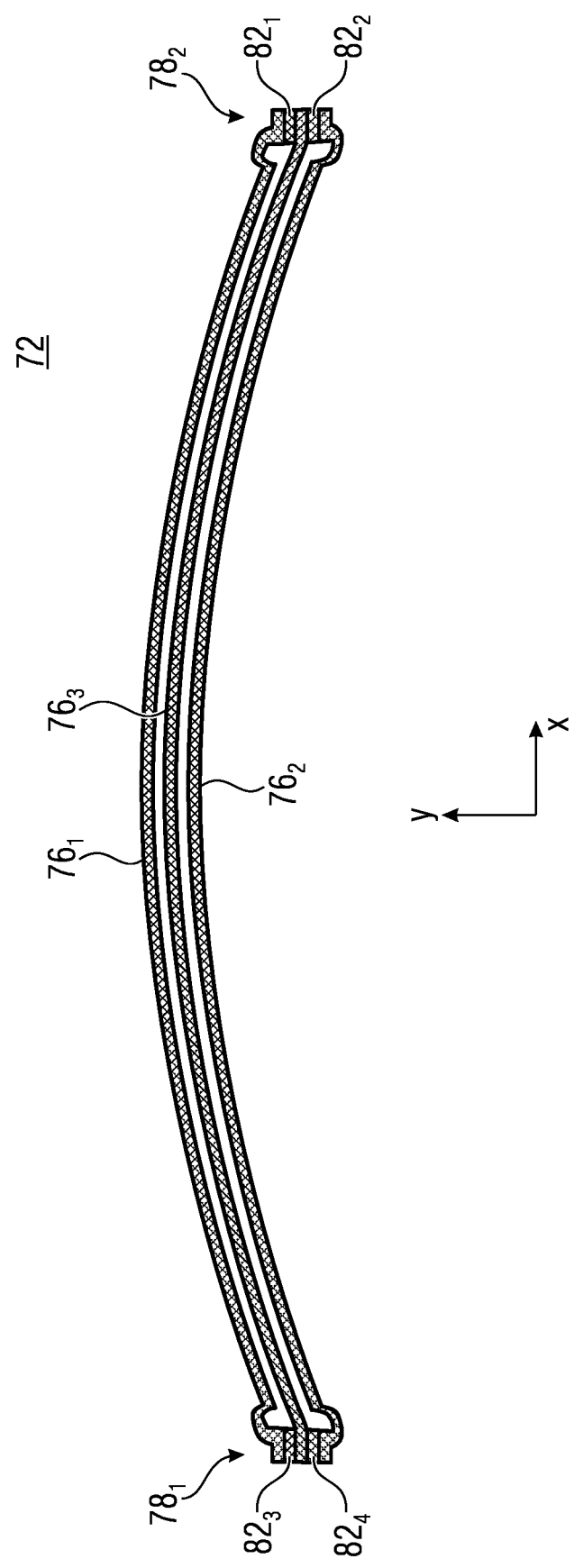
FIG. 5b shows a schematic top view of a movable layer arrangement, such as may be used in the MEMS of FIG. 5a, according to an embodiment of the first aspect.

FIG. 5b shows a schematic top view of a movable layer arrangement, such as may be used in the MEMS 50. The movable layer arrangement comprises at least three bars $76_1$, $76_2$ and $76_3$ which are configured to perform a movement or a deformation in response to an electrical potential. For example, the bars $76_1$, $76_2$ and $76_3$ may comprise electrically conductive materials, such as metal materials and/or doped semiconductor materials, in correspondence with the electrode elements 46, and may be arranged for electrostatic forces. However, it is also possible to implement thermally induced deformations, piezoelectric forces, or another type of electrically generated actuation by configuring the active structure so as to comprise electrostatic, piezoelectric, or thermomechanical electrode structures and/or combinations thereof. However, the bar $76_3$ is arranged, for example, between the bars $76_1$ and $76_3$. The bars $76_1$, $76_2$ and $76_3$ are thereby electrically insulated from each other at discrete regions $78_1$ and $78_2$, for example by means of electrically insulating spacer elements $82_1$ to $82_4$. Although the electrically insulating spacer elements 82 are depicted as being disposed in edge regions of the bars $76_1$ to $76_3$, they may alternatively or additionally be disposed in a central region or in a region therebetween. The movable layer arrangement 72 is configured to perform a movement along a direction of movement in the MEMS plane $14_2$ in response to an electrical potential between the bars $76_1$, and $76_3$ on the one hand and/or in response to an electrical potential between the bars $76_2$ and $76_3$ on the other hand, thereby moving the coupling element 28, in particular the coupling sub-element 28b. For example, based on a clamping of the movable layer arrangement 72, an wiping movement, directed in-plane, of the movable layer arrangement 72 can be obtained, which can be converted into a linear movement of the mechanical coupling sub-element 28b by means of symmetrical suspension. Other types and shapes of movement are readily adjustable.

In other words, FIGS. 5a and 5b show an alternative embodiment of a deflectable element 26 with the sub-elements of a movable layer arrangement $72_1$ and $72_2$ that are connected to each other and to the resistive element 24 (not shown) via the connection element 28b. The structure of the deflectable elements, or movable layer arrangements, may be an assembly of at least three electrodes separated from each other by insulated spacers. The two outer electrodes receive the same voltage, for example a reference potential or GND, the middle electrode may receive a signal voltage, for example in the form of signal 32. As a result, deflection of the deflectable elements may occur. Due to the symmetrical structure of the movable layer arrangements $72_1$ and $72_2$ with respect to each other, a linear deflection behavior can be realized. For example, a corresponding structure can be obtained in accordance with WO 2012/095185 A1.

FIG. 6a shows a schematic perspective view of a part of an MEMS 60 according to an embodiment, which may be substantially identical to the embodiments in FIG. 2. The layers $12_1$ and $12_4$ are exemplarily not shown, but may be arranged, as may other layers. The parts 26a and 26b may each be formed as an independent actuator arranged so as to oppose each other and mechanically coupled to each other and to the interaction structure 24 by means of the coupling sub-element 28b, the coupling sub-element being arranged between the actuators 26a and 26b. Thus, it can be achieved that the active structure 26 is configured to, on the basis of a first actuation signal for one of the actuators 26a and 26b, elongate in a first region parallel to the actuation direction and to shorten in the other part. On the basis of another actuation signal, a complementary movement can be achieved by reversing shortening and lengthening/expansion of the respective active structure.

Referring to the active structure 26 of FIGS. 2, 3a, 3b, 6a and 6b, the electrode pairs may be arranged in a row in the same way as, for example, the movable layer arrangements of FIG. 4. For example, the structure explained in more detail in FIGS. 3a and 3b may have a row of a number of electrode pairs arranged parallel to an actuation direction in the MEMS plane $14_2$ so as to effect movement of the interaction structure along that direction in the MEMS plane $14_1$. In this regard, embodiments optionally provide at least a second row of electrode pairs arranged parallel to a second direction different therefrom so as to effect movement of the interaction structure 24 along a further direction. It should be noted that the respective actuation direction of the active elements can also be deflected by means of suitable mechanical deflection elements, such as levers, or gears, or the like.

For example, it is conceivable that one or more further sub-actuators are arranged at a 90 degree angle to the sub-actuators 26a and 26b in order to effect movement parallel to the x-direction in addition to movement parallel to the y-direction.

FIG. 6b shows a schematic perspective illustration of a section of FIG. 6a, in particular in the region of the mechanical connection between the coupling sub-elements 28a and 28b. The active structure 26 is formed, for example, in accordance with the explanations regarding the MEMS 20 and FIGS. 3a and/or 3b, wherein two opposing actuation means 26a and 26b are arranged, by way of example, which, on the basis of different actuation signals, can cause a length change in the respective actuation means 26a or 26b and, by means of the mechanical coupling, can thus also cause a length change or deformation in the other actuation part.

Through this, an at least almost linear deflection behavior can be obtained by coupling two muscles, or actuation means, acting against each other, which can also be referred to as balanced behavior, which at least approximates a linear behavior. In other words, a first and a second actively deflectable element 26a and 26b are connected to each other via a connection element 28b. This connection may be rigid to advantageously allow a linear behavior of the resulting actively deflectable element, such as at the location of the coupling element.

Such a configuration can reduce or worsen the non-linear voltage-displacement behavior that results from electrostatic actuation. This principle can also be applied to any other actuator. Asymmetric actuators, such as A-NED (asymmetric nanoscopic electrostatic drive), can be used, arranged so that two muscles cause deflection in opposite directions. Symmetrical actuators, such as the balanced NED (BNED) or BA-NED (balanced-asymmetric NED) described in connection with further embodiments, can also be used. For example, for BNED, the voltage on the outer electrodes in the two muscles can be chosen inversely. The same works for a BA-NED. Alternatively, in BA-NED, the position of the insulation islands can be chosen to be different in order to specify the deflection direction of the actuator.

The gap 34, which is described in connection with FIG. 2 as being at least 1 μm, although other values can also be selected, is advantageously arranged between the active structure 26 and the interaction structure 24. For example, the respective coupling sub-element may protrude from the plane of the electrodes, or fins. Alternatively or partially, a advantageously electrically insulating mechanical connection layer 84 may fully or partially adjust the gap 34. For example, the connection layer 84 may comprise silicon oxide, silicon nitride, or aluminum oxide.

Figure 7A:
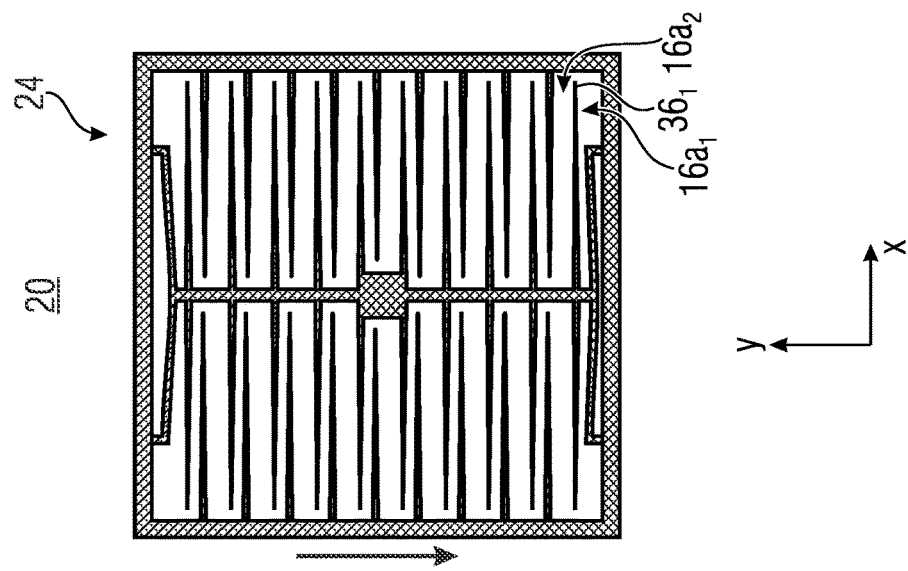
FIG. 7a shows a schematic top view of the interaction structure of the MEMS of FIG. 2 according to an embodiment of the first aspect.

FIG. 7a shows a schematic view of the interaction structure 24 of the MEMS 20, which is connected to and suspended from the substrate of the layer $12_2$ via the suspensions $44_1$ and $44_2$. The suspensions $44_1$ and $44_2$ may comprise, for example, flexural spring elements by means of which the interaction structure 24 is elastically coupled to the layered structure. A mechanical coupling of the interaction structure to the layered structure may have at most the same stiffness as the stiffness of the interaction structure 24 itself, but is advantageously softer or alternatively not implemented.

Here, the movable fins $36_1$ to $36_{20}$ can each move in sub-cavities defined by the surrounding substrate and the rigid partition walls or rigid fins 38 arranged without contact or with low friction relative to the interaction structure 24. The fin structures $36_1$ to $36_{20}$ of the interaction structure may thus be movably arranged in the sub-cavities 16a to 16t. For example, FIG. 7a shows an undeflected state of the MEMS 20.

Figure 7B:
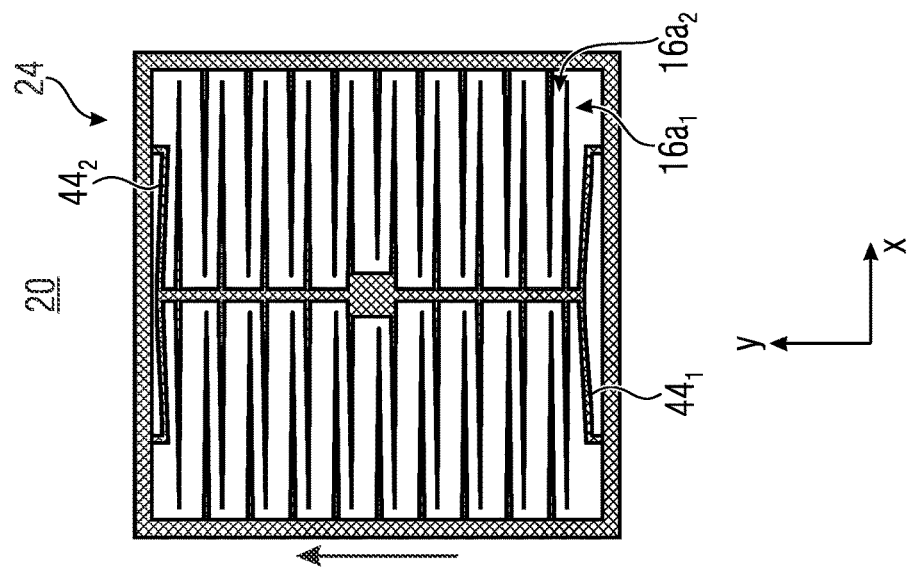
FIG. 7b shows a schematic view of the interaction structure from FIG. 7a, which is deflected along the positive y-direction.

FIG. 7b shows a schematic top view of the interaction structure 24 in a state in which the interaction structure 24 is deflected along a positive y-direction such that a first region $16a_1$ of a sub-cavity 16a is enlarged and a corresponding other portion $16a_2$ of the sub-cavity 16a is reduced, which may be causally related to fluid flow.

Figure 7C:
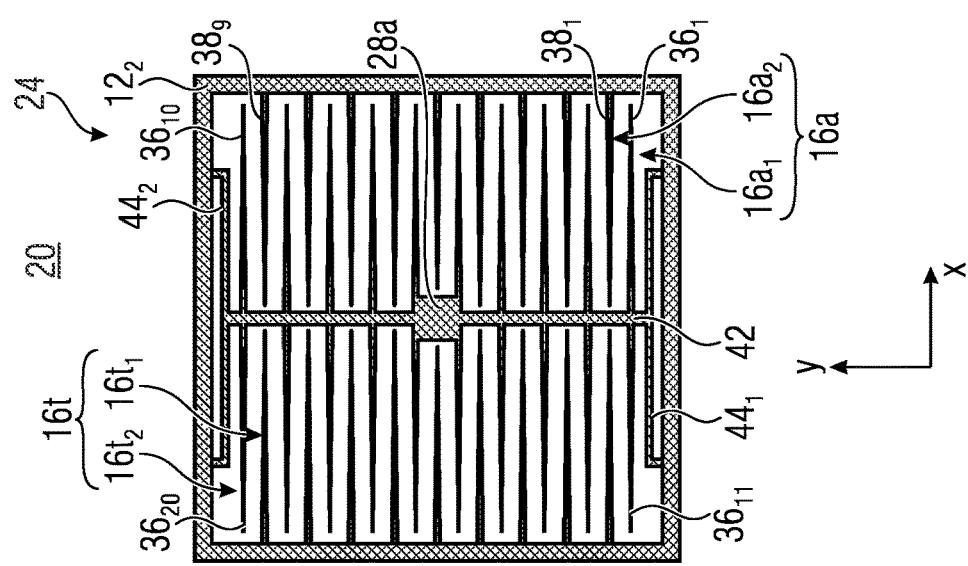
FIG. 7c shows a schematic view of the interaction structure from FIG. 7a, which, compared to FIG. 7b, is deflected along the opposite negative y-direction.

FIG. 7c shows a schematic view of the interaction structure 24 of FIG. 7a, which is deflected along the opposite negative y-direction compared to FIG. 7b, for example, wherein the movement of the element $36_1$ causes a change in the volumes $16a_1$ and $16a_2$, which may also be causally related to the volumetric flow.

By coupling the elements 36 to each other by means of the connection element 42, a uniform variation in the sub-cavities can be obtained taking into account the sizes of the sub-cavities set to be equal to or different from each other, which can be selected by positioning the elements 36 on the one hand and the elements 38 on the other hand.

In other words, FIGS. 7a to 7c show the deflection of the resistive element 24 starting from a rest position in FIG. 7a in a first direction (+y) in FIG. 7b and in a second direction (−y) in FIG. 7c. The curvature of the suspensions $44_1$ and $44_2$ is also depicted. In embodiments, the geometry of the suspension may differ from that shown. For example, the geometry may be roof-shaped, wave-shaped, or s-shaped. The implementation may be chosen on the basis of the particular application, but may have a decisive influence on the resulting resonant frequency of the moving system on the basis of stiffness properties or the like. Another embodiment relates to a resistive element 24 without the shown suspensions $44_1$ and $44_2$. FIGS. 7a and 7c further show that cavities 16a to 16t, $16a_1$ to $16t_2$ are formed by the moving fins 36 and rigid fins 38. The length of the moving fins 36 may be such that the distance between the free end of the fins 36 and the surrounding substrate $12_3$ is as small as possible. Here, the distance is chosen such that there is little or no exchange of fluid between the cavities $16a_1$ and $16a_2$ or $16t_1$ and $16t_2$, meaning that fluidic losses are low. In other words, and in the context of the embodiment of an MEMS speaker implemented by means of the MEMS shown herein, an acoustic short circuit can be avoided at this point.

FIGS. 7d to 7f show the interaction structure 24 of FIGS. 7a, 7b and 7c in corresponding states, with additional groups 18a and 18b of openings being depicted. For example, a first group 18a of openings may be provided in a lid wafer and another group 18b may be provided in a bottom wafer of the MEMS 20, or vice versa. Through this, different sub-cavities $16a_1$ to $16t_1$ or $16a_2$ to $16t_2$ can be connected to different sides of the MEMS.

In the positioning shown in FIG. 7e and corresponding to FIG. 7b, a fluid can thus be moved out of the openings of the group 18b and/or be moved in through openings of the group 18a, which can also be influenced by the arrangement of valve structures.

FIG. 7f shows an opposite configuration in which, in accordance with FIG. 7c, the sub-cavities indexed with "1" are reduced in size so that a fluid is moved out of the openings of group 18a.

As shown in FIGS. 7b to 7f, different sub-cavity parts, such as the sub-cavity part $16a_1$ or $16t_1$ compared to sub-cavity parts $16a_2$ or $16t_2$, may be fluidically coupled with different openings, wherein the openings may be coupled individually or in groups to the environment 22 or different sides thereof.

The fin structures can separate sub-cavities into different sub-cavity parts, which does not necessarily mean hermetically sealed, but which can cause a separation while avoiding a fluidic short circuit. The volumes of the sub-cavity parts can be complementary to each other on the basis of the movement of the interaction structure.

The openings of groups 18a and 18b may be arranged entirely or partially starting from the sub-cavity perpendicular to the plane direction, i.e. along the positive or negative z-direction. Alternatively or additionally, openings may be provided in the MEMS plane $12_2$ or the plane $14_2$.

Combinations are also conceivable, according to which a lateral outlet from the sub-cavity parts is provided, as shown for example in FIG. 7g, and these lateral outlets are directed in different directions along the z-axis, so that, analogously to FIGS. 7d to 7f, different sub-cavity parts are connected to an upper side or a lower side, wherein corresponding connection of the sub-cavity part, for example of the sub-cavity part $16a_1$, can take place laterally within the plane $14_1$. That is, after a lateral outlet or inlet in the layer $12_2$, a directional redirection of the fluidic flow can occur so that MEMS openings of the groups 18a and 18b arranged in the MEMS plane $14_1$ are fluidically connected to MEMS openings, lid layers, for example the layer $12_1$ or $12_4$ of the layered structure 12, along a direction perpendicular to the plane direction, i.e. along z.

In other words, cavities may be created through the geometry of the passive element 24, and in particular, sub-cavity parts may be defined in the sub-cavities defined by the rigid fin structures by the geometry or the moving fins of the element 24. The resulting sub-cavity parts are separated from each other inside the member such that either no fluid exchange or very little fluid exchange can occur between the sub-cavity parts. The sub-cavity parts can be connected to the outside through openings 18a and 18b in the bottom and lid wafers. When the passive element 24 is displaced, a fluid is conveyed into the cavity through openings on one side and is conveyed out of the same on the other side. In one embodiment, that of a loudspeaker, sound pressure is generated by this movement of the passive element. It is equally conceivable to generate a pump effect. Actuation of the resistive element 24 and other passive elements may be accomplished via the deflectable elements 26 of the device plane $14_2$. Any deflectable elements may be used, such as micromuscles or ANED muscles described herein. Since the device plane can be designed without passive elements for mechanical fluidic interaction or has a negligible share therein, it can be completely filled with active elements. Thus, a relatively large number of elements can be placed in very densely packed manner. This enables adapting the active elements to the necessary mechanical effect, which is then achieved by the resistive element 24. The transfer of the mechanical effect between the active plane and the passive plane takes place via the fixed connection between the device wafer and the handling wafer, the elements 24 and 26, which remains after production or is produced subsequently.

The alternative embodiment of openings connecting the cavities to the surrounding fluid shown in FIG. 7g may be implemented such that openings 18'a and 18'b are arranged in the structural wafer such that a connection to the openings 18a and 18b from FIGS. 7b to 7f of the bottom or handling wafer is enabled. The openings can be arranged in the structural wafer in such a way that the openings are fluidically connected to an upper or lower side. This results in a further advantage by separating the functions into two planes. The additional planes create new possibilities for fluid guidance, such as air guidance, which allow the outlet openings of the two chip sides to lie one above the other. For this purpose, short channels, the openings 18'a and 18'b, can be placed in the device plane in the structural plane in such a way that they guide the fluid flow to the outlet openings (in this case air). This results in the fact that the outlet openings can be packed more densely, as the outlet openings can be a limiting factor of the packing density of the passive sound-generating elements, so that an increase in the packing density of the sound-generating elements can be achieved by this approach.

FIGS. 8a to 8c show a schematic perspective top view of the MEMS 20 in the plane $14_2$, so that the layer $12_3$ and the active structure 26 are exemplarily depicted. The actuator parts 26a and 26b may be configured, for example, with more than one of the actuator rows $86_1$ to $86_5$ arranged side by side along the x-direction, and possibly mechanically coupled to each other or even forming continuous electrodes, as shown, for example, in FIG. 3c. Exemplarily, 5 actuator rows $86_1$ to $86_5$ are provided, although any other number of at least 1, at least 2, at least 3, at least 4, at least 6, about 10, or the like may be provided. It is possible, but not necessary, that the actuator parts 26a and 26b are formed symmetrically with respect to each other.

FIG. 8a shows a neutral, i.e. undeflected, state of the active structure 26, while FIG. 8b shows a state in which an extension of the actuator part 26b is shortened and the actuator part 26a is correspondingly elongated, for example by activating the actuator part 26b. In this way, a movement of the coupling element 28b along the positive y-direction can be obtained.

FIG. 8c shows a state complementary to FIG. 8d, in which the coupling sub-element 28b is moved in the negative y-direction with respect to FIG. 8a, which can be obtained, for example, by actuating the actuator member 26a. Regardless of this, the arrangement of fluidic channels $88_1$ to $88_n$ may be provided in the layer $12_3$ which, for example and with reference to FIG. 7g, may fluidically connect the openings 18a and/or 18b to the openings 18'a and 18'b, respectively.

In the embodiment according to FIGS. 8a to 8c, the MEMS may also comprise at least a first actuator for converting a first actuation signal and a second actuator for converting a second actuation signal.

FIGS. 8a to 8c depict that two deflectable elements 26a and 26b that are mirror symmetrical to each other can be arranged opposite a center line, which can implement a balanced muscle. Another possibility of a balanced muscle is provided by the choice of muscle cell geometry. Embodiments described herein relate to creating actively deflectable elements that exhibit high linearity.

The geometry of a deflectable active element determines its mode of action and direction of action. By combining different geometries, at least two but also more, different directions of action can be implemented within a muscle or deflectable element.

In other words, FIGS. 8a to 8c show the deflection of the deflectable element 26 consisting of a first and second deflectable elements 26a and 26b. In a first time interval, depicted in FIG. 8b, the deflection in a first direction (+y) occurs by decreasing the value for $h_{gap}$ from FIG. 3a or 3b in the deformable element 26b. In a second time interval, which may follow or precede the first time interval, deflection in a second direction (−y) occurs by decreasing the value for $h_{gap}$ in the deflectable element 26a and consequently increasing $h_{gap}$ in the deformable element 26b.

Figure 9A:
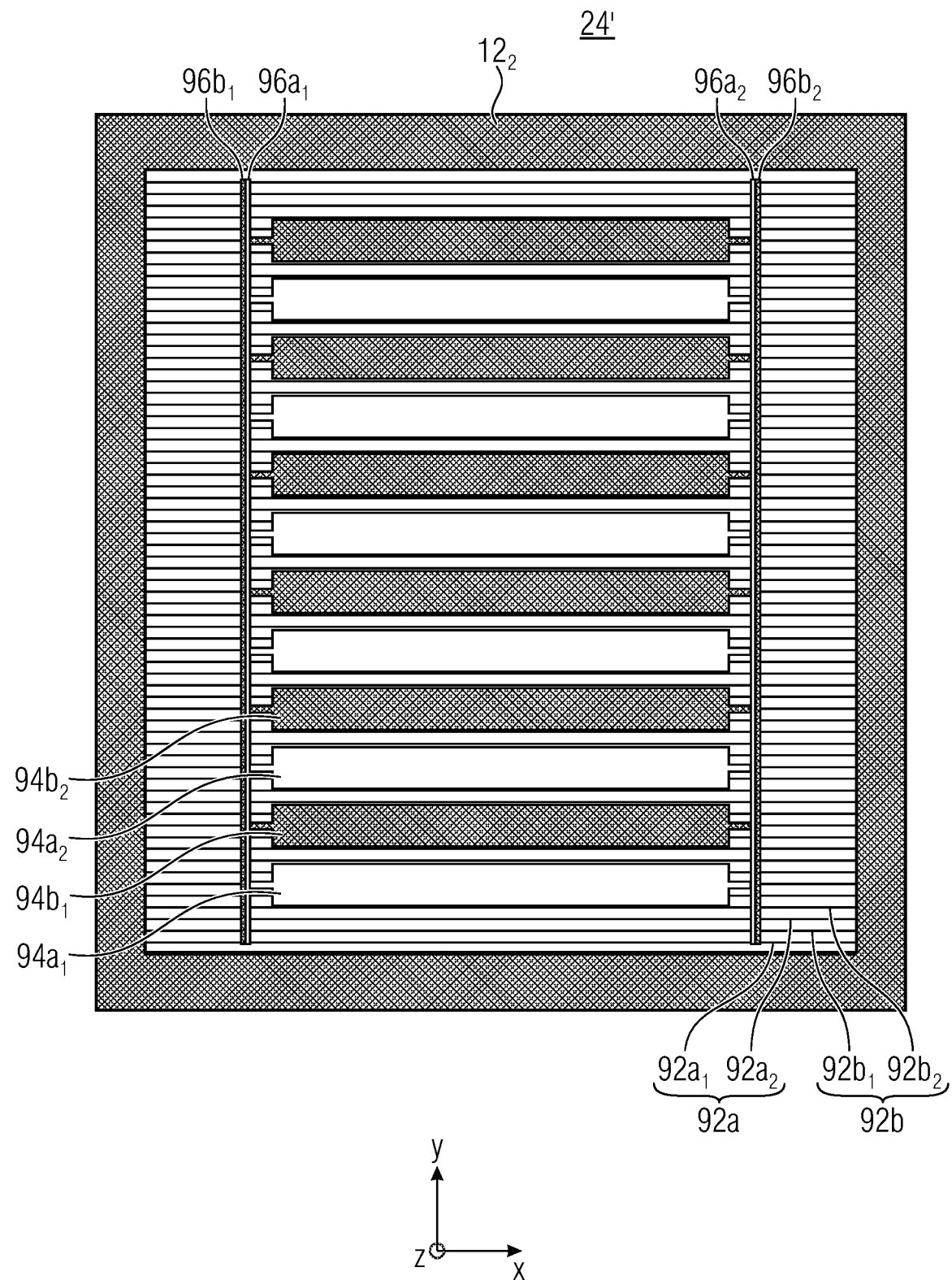
FIG. 9a shows a schematic top view of a further interaction structure according to an embodiment of the first aspect.

FIG. 9a shows a schematic top view of an interaction structure 24' according to an example embodiment. The interaction structure 24' may be provided in an MEMS described herein, such as MEMS 10, 20 and/or 40, as an alternative or in addition to the interaction structure 24.

Figure 9B:
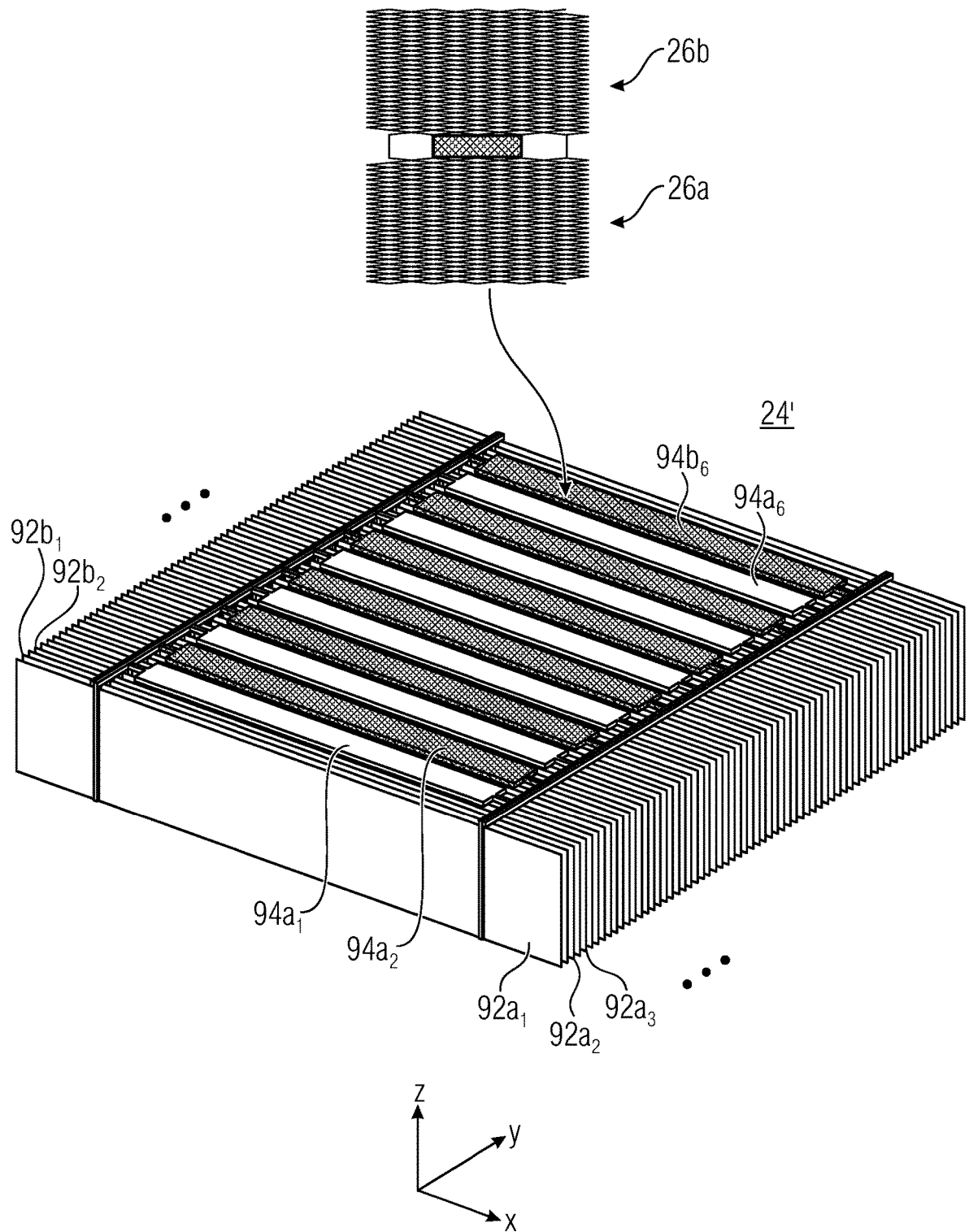

FIG. 9b shows a schematic perspective view of the interaction structure 24' from FIG. 9a.

While other interaction structures are described as having fixed fins connected to the substrate, with the interaction structure moving against said fins, the interaction structure 24' may have a multitude of plate or fin elements arranged parallel in the MEMS plane $14_1$ and oriented perpendicular thereto and connected to an MEMS substrate in opposing edge regions. Alternatively, plate elements or fin elements 92 may be connected in groups and pairs alternating with different actuator parts. For example, multiple actuators of the actuator parts may be provided. Thus, a first group 92a of plate elements 92 may be arranged alternately with plate elements 92 of a second group 92b. Plate elements 92a and 92b of a respective group may be actuated individually or jointly via actuators 94a and 94b, respectively, illustrated in a simplified manner, which in turn may comprise one or more sub-actuators 26a and 26b. In the illustrated embodiment, at least one of the actuators 94 comprises the sub-actuators 26a and 26b. Multiple actuators or muscles can in turn drive each other individually or collectively via connecting ridges $96a_1$, $96a_2$ or $96b_1$, $96b_2$ in groups or globally. This allows the arrangement of one or more actuators. In some embodiments, the coupling part elements or plate elements $94a_1$ to $94a_6$ on the one hand or $94b_1$ to $94b_6$ represent a simplified view of the actuators 26a and 26b. The described plate elements can thus provide actuators configured to actuate the fin assemblies 92a/92b via coupling rods 96.

This configuration allows the interaction structure 24' to be configured such that a multitude of fin elements 92 that may be arranged parallel to each other in the MEMS plane $14_1$, at least temporarily in a particular state, such as an unactuated state, is arranged. The fin elements may be arranged so as to be oriented perpendicular to the MEMS plane $14_1$. The fin elements 92 may be mechanically coupled to one another in groups by means of connection elements 94 and/or 96 to form fin groups.

The different fin groups 92a and 92b may be deflectable relative to each other, which may reduce the stroke needed to achieve a minimum distance between fin elements compared to the rigid fins 38.

For example, fin elements of the fin group 92a and fin elements of the fin group 92b, the elements of which may be adjacent to each other and arranged alternately, may be deflected in opposite directions.

Figure 9C:
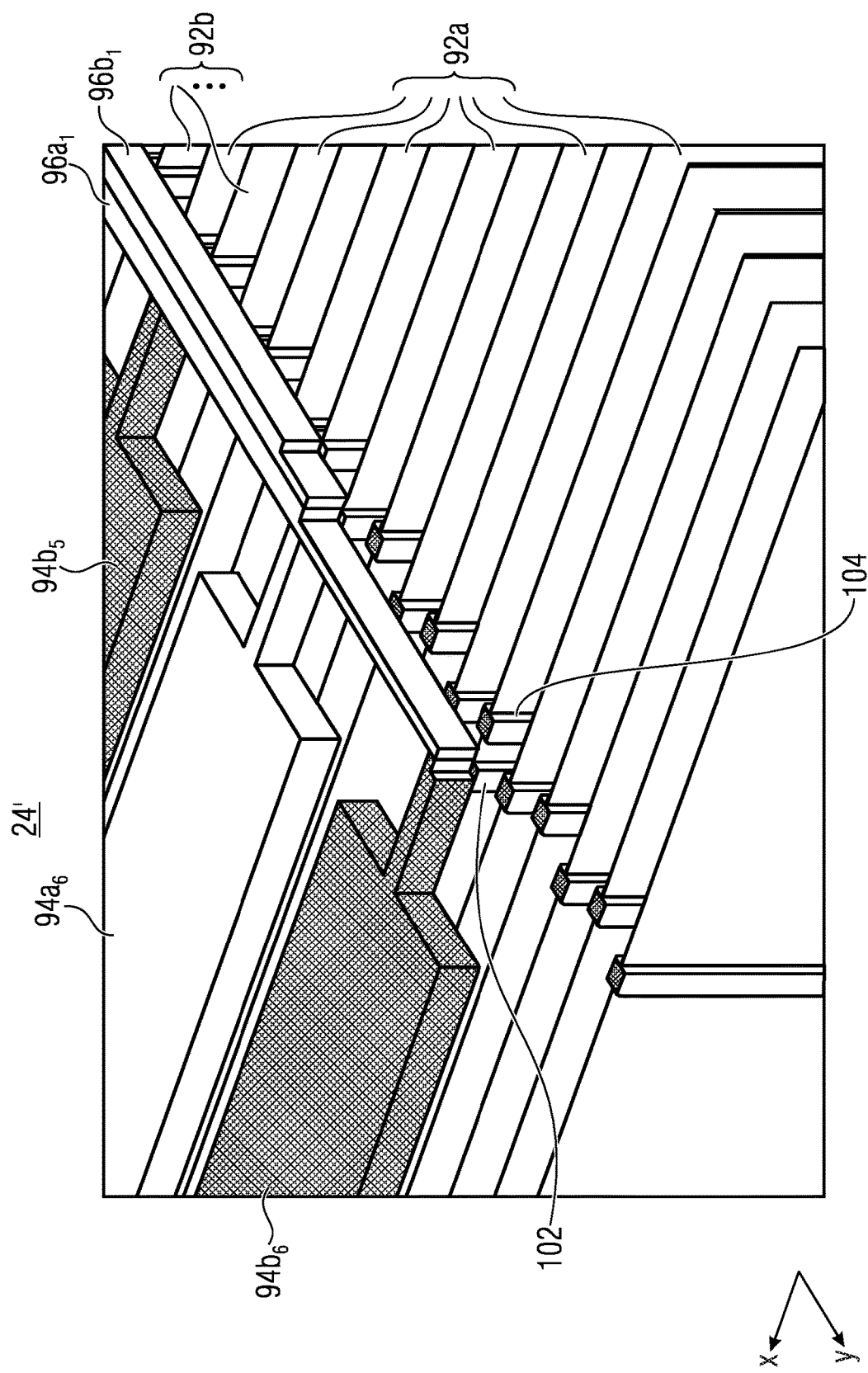
FIG. 9c shows a schematic perspective view of a section of FIGS. 9a and 9b.

FIG. 9c shows a schematic perspective view of a section of FIGS. 9a and 9b, which shows that the connecting ridges 96a are mechanically connected in a firm manner to the fin elements of the group 92a, while the connecting ridges 96b are mechanically connected to the fin elements of the group 92b. For example, the connecting ridge $96b_1$ is at least partially driven via the coupling part element $94b_5$, while connecting ridge 96a1 is at least partially driven via coupling part element $94a_6$, although multiple coupling part elements may be used for driving, as described. Different planes of the structural elements may be provided for the mechanical connection, so that the corresponding movements can pass each other. In particular, the connecting ridges $96a_1$ and $96b_1$ are arranged to be movable relative to each other. The connecting ridges $96a_1$ and $96b_1$ are partially hidden to allow a better depiction.

Figure 9D:
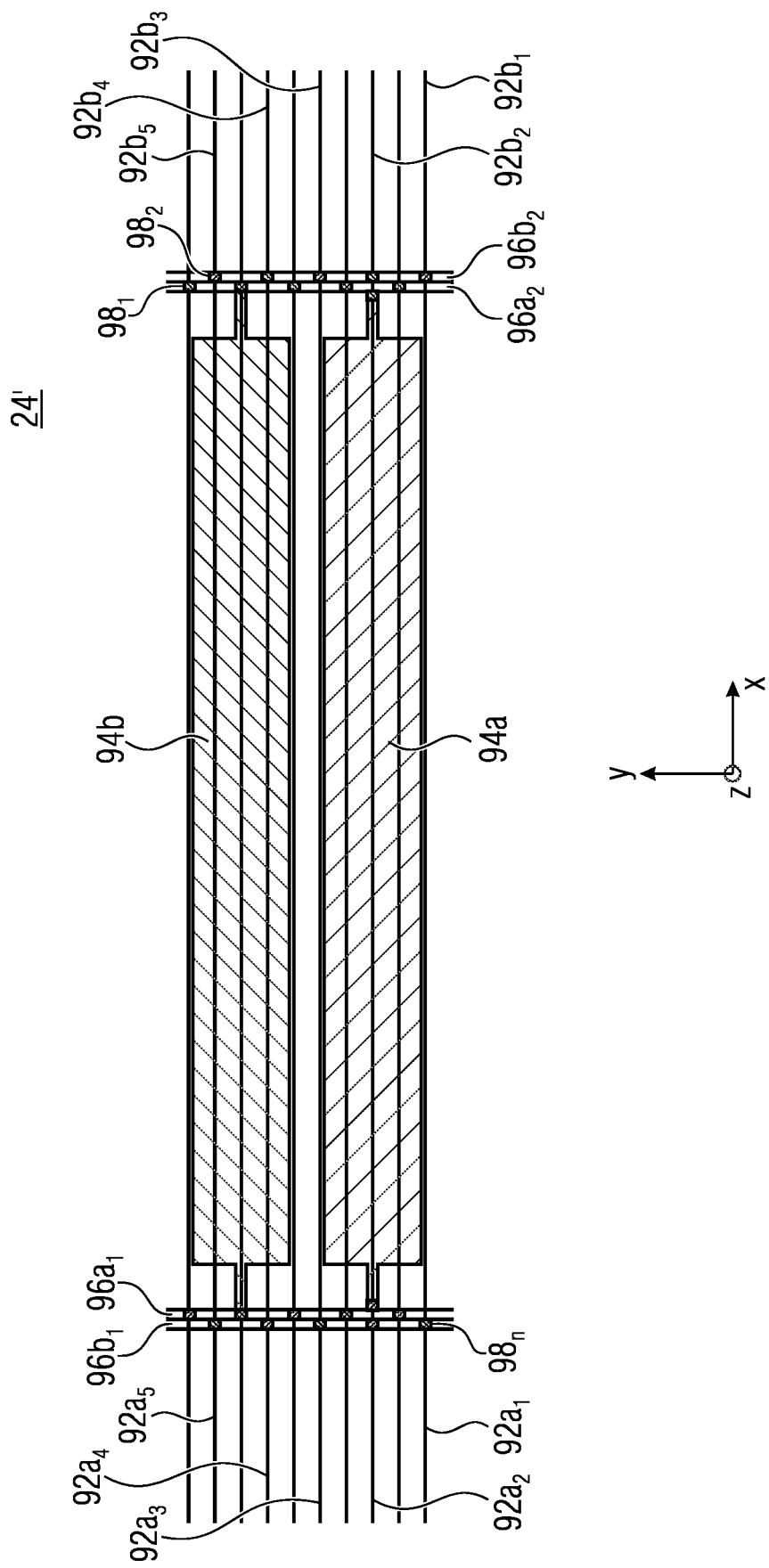

FIG. 9d shows a schematic top view of a part of the interaction structure 24'. The connecting ridges $96a_1$, $96b_1$ and $96b_2$ can be mechanically connected in a firm manner to the fin elements $92a_1$ to $92a_5$ of the group 92a or the fin elements $92b_1$ to $92b_5$ of the fin group 92b via coupling points 98. The actuators or groups thereof 94a and 94b are, for example, muscle groups. Such a group corresponds, for example, to the arrangement shown in FIG. 8a-c: two muscle groups (balanced) working against each other move a coupling element 28. In FIG. 9a-b, several of these muscle groups are depicted in simplified form and they pull together on the connecting ridges 96.

In other words, FIGS. 9a to 9d show another embodiment, wherein an alternative passive element 24' is configured as elastic fins or bars. Here, these fins or bars $92a_i$ and $92b_i$, with i 1, . . . , N with N≥2, are connected to the surrounding substrate at one or both ends. In a particularly advantageous embodiment, the passive element is further connected to the surrounding substrate. This substantially reduces the total cross-sectional area of the acoustic short circuits. The deflectable element can be divided or distributed to several assemblies 94a and 94b and deflects the elements deflectable in-plane, or the fin elements or plate elements, via arranged coupling rods or connecting ridges in the positive or negative y-direction. The deflectable elements 94a or 94b disclosed in this embodiment comprise the muscle-like deflectable elements or actuators described herein or other actuators described herein, which include the movable layer arrangements of the second aspect. Other drive types are also possible. The deflection of the coupling rods is transmitted to the passive elements, the plate elements. There are two groups of deflectable elements (actuators), of passive elements (plate elements), and of coupling rods (connecting rods) each, which are exemplarily denoted by the letter a for a group A and the letter b for a group B. Groups A and B can be deflected against each other to compress the fluid between the passive elements with high to maximum efficiency. When group A is displaced in the positive y-direction, group B deflects in the negative y-direction. The connection of the coupling rods 53a and 53b in the plane of the deflectable elements is realized by a force-fit connection to the passive elements of the matching group. At some points, an additional connection 102 (see FIG. 9c) may be provided, wherein the force-fit connection can be transferred from the interrupted coupling rod to the passive element. The passive element can transmit the force to the continuation of the respective coupling rod, which means that a force transmission can take place between the elements 102 and 104 via the plate element, so that the coupling rod can be substituted in some regions. This can enable interruptions of the coupling rod in the plane of the deflectable elements. In addition, the force-fit connection between the coupling rod and the plate element can be located off-center on the passive elements, the plate elements, which results in a translation of a small deflection at the point of force application to a substantially larger deflection of the bar center, see FIG. 9d.

In the following, reference is made to an alternative drive deflection of an interaction structure based on the so-called stator-shuttle principle.

Figure 10A:
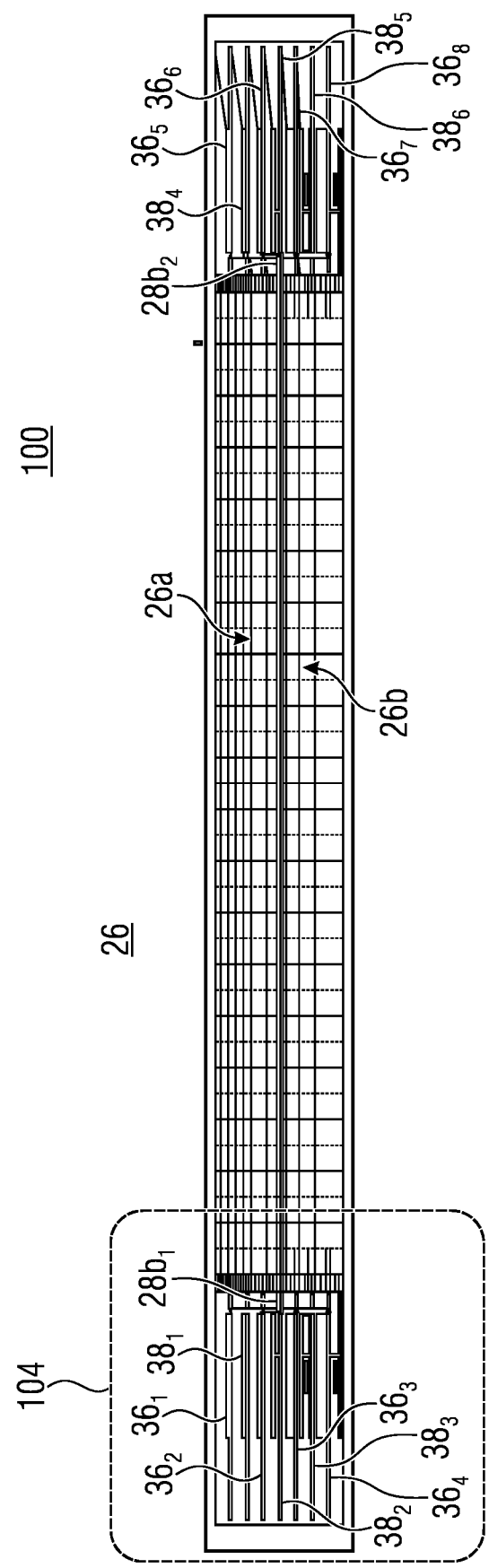
FIG. 10a shows an exemplary top view of an active structure of an MEMS according to an embodiment of the first aspect, comprising sub-actuators.

FIG. 10a shows an exemplary top view of an active structure 26 of an MEMS 100 comprising sub-actuators 26a and 26b, as explained, for example, in connection with FIG. 2.

In the plane $14_2$, this movement may be transmitted to several coupling elements $28b_1$ and $28b_2$ configured to deflect moving structures, such as the fins $36_1$ to $36_8$, disposed in the MEMS plane $14_1$, such that the fins $36_1$ to $36_8$ are movable in sub-cavities at least partially defined by optional rigid structures $38_1$ to $38_6$, as described in detail in connection with FIGS. 10b and 10c.

Figure 10B:
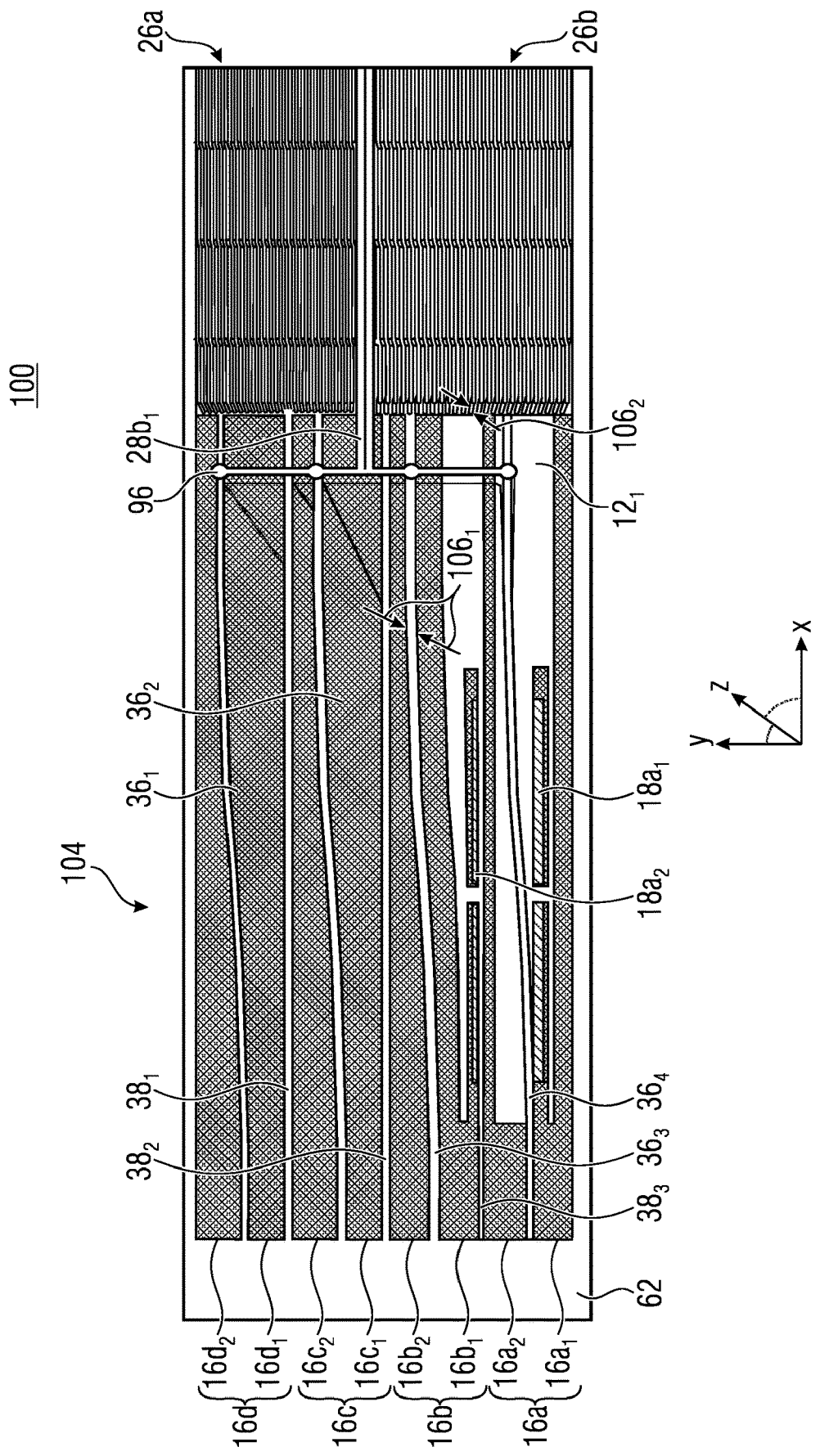

FIG. 10b shows a magnified top view of a section 104 of FIG. 10a, in which it is clear that an extension $106_1$ of the interaction structure along the z-direction and/or the y-direction may be substantially greater than an extension $106_2$ of the active structure 26.

FIG. 10b shows a deflected state of the coupling sub-element $28b_1$ along a positive y-direction, whereby the movable elements $36_1$ to $36_4$, which are fixedly suspended from the surrounding substrate, either integrally or positively or non-positively, are moved to allow fluid flow through the openings $18a_1$ to $18a_4$. That is, the interaction structure may be mechanically connected to the MEMS substrate at a region opposite from the active structure 26 and formed flexibly to deform upon deflection of the active structure. In this context, flexible is understood to have at most half, one third or one quarter of the stiffness of the surrounding rigid structures. The rigid fins $38_1$ to $38_3$ may define, as boundary structures, sub-cavities 16a to 16d in which the flexible elements $36_1$ to $36_4$ are movably arranged to deform in the sub-cavities 16a to 16d. For example, as described in connection with FIGS. 7a to 7g, the movable elements $36_1$ to $36_4$ may thereby separate or subdivide the sub-cavities 16a to 16d into sub-cavity parts $16a_1$ and $16a_2$, $16b_1$ and $16b_2$, $16c_1$ and $16c_2$, and $16d_1$ and $16d_2$. Based on the movement of the interaction structure and thus of the elements $36_1$ to $36_4$, a volume of a respective sub-cavity part can be variable in a complementary manner to the volume of the other associated sub-cavity part.

Figure 10C:
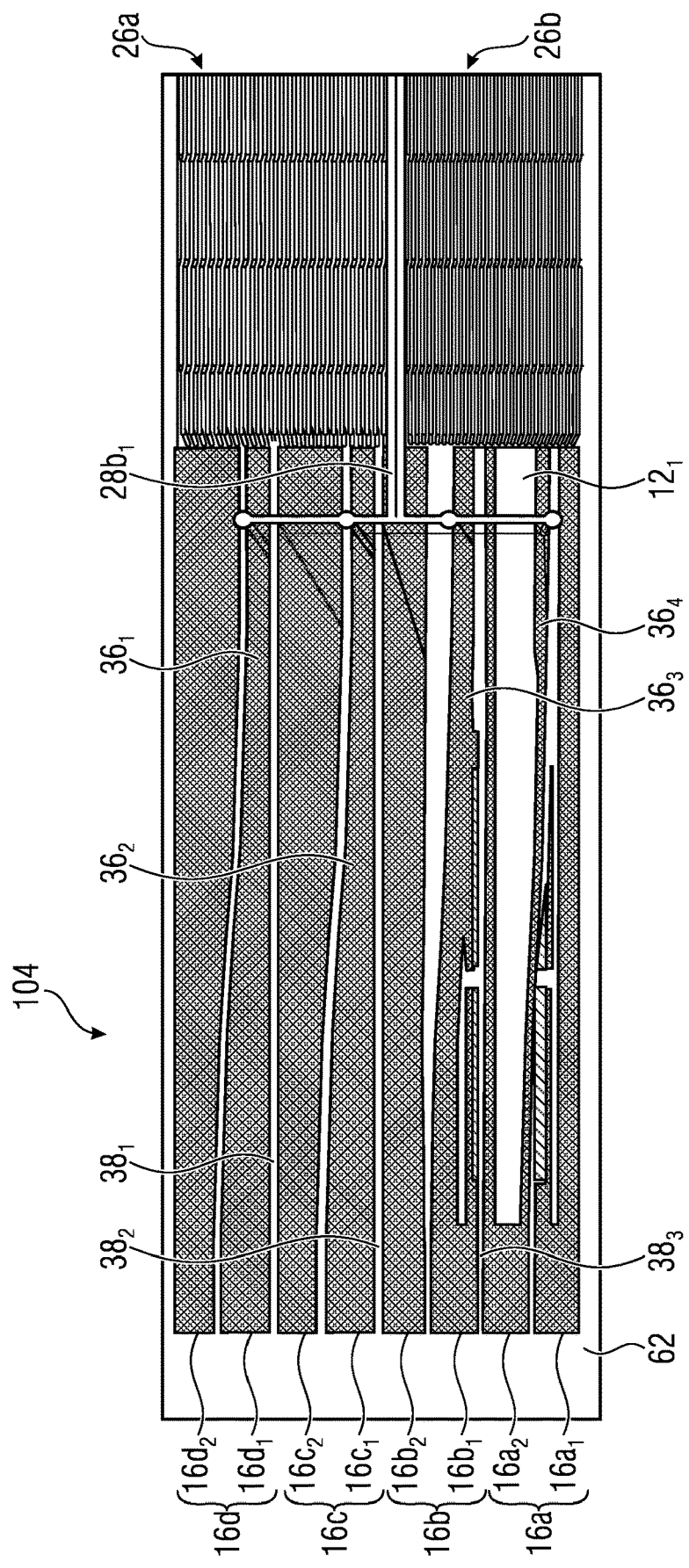
FIG. 10c shows a schematic view of the part in FIG. 10b in which the actuation of the actuator parts causes elements to deform in opposite directions.

In the implementation of FIGS. 10a to 10c, in each case the sub-cavity part $16a_1$, $16b_1$ $16c_1$ $16d_1$ is connected to the environment of the MEMS 100 by means of openings in the layer $12_1$. In the layer $12_4$ not shown, for example, the complementary sub-cavity parts $16a_2$, $16b_2$, $16c_2$ and/or $16d_2$ can be connected to the external environment, wherein this can optionally but not necessarily take place in the lid layer, but a deflection can also be provided, which is described, for example, in connection with FIG. 7g.

FIG. 10c shows a schematic top view of the part 104, in which an opposing deformation of the elements $36_1$ to $36_4$ takes place on the basis of the actuation of the actuator parts 26a and 26b.

In other words, FIGS. 10a to 10c show another embodiment of an MEMS assembly 100 for driving and deflecting passive resistive elements 36 in a plane independent of the drive plane. Here, an assembly comprising four elastic resistive elements 36 is connected to deflectable elements 26a and 26b via a coupling element 96. The deflectable elements may comprise or include actuators described in embodiments herein and have, for example, linear deflection characteristics. The group of elastic resistive elements 36 and actively deflectable elements 26a/26b is bounded, for example, by a boundary 62 formed from the surrounding substrate. This boundary increases the overall stiffness of the MEMS device 100 and includes cavities in which the resistive elements 36 are disposed. Further, the boundary 62 is electrically coupled to the actuator and serves as a stator. Thus, the boundary 62 can perform three functions synergistically: It can perform an acoustic function and serve as another wall; it can perform an electrical function and conduct voltage to the actuator; and it can perform a mechanical function by providing an attachment for the actuator. The actuator may pull or exert forces from both the shuttle and the stator, but the stator is fixed so that its movement is restricted or prevented. In this embodiment, the shuttle is the actively deflectable resistive element, and therefore an electrical potential is established between the boundary 62 and the deflectable element 26a/26b. Further boundaries 38 are provided to form cavities, which are arranged between the resistive elements 36. The boundaries 38 may be of lesser thickness than the boundary 62. The resistive elements convey fluid into and out of these cavities through openings in the lid and handling wafer. Openings (for example 18a in the handling wafer) are provided in both the lid wafer and the handling wafer for fluid to enter and exit the cavities. The openings are arranged such that they are not or will not be swept by the deflectable elements 36 in a plan view, for example shown in FIGS. 10b and 10c. Alternatively, the openings may be arranged in the surrounding substrate as described, for example, in connection with FIGS. 6a and 6b.

Figure 11:
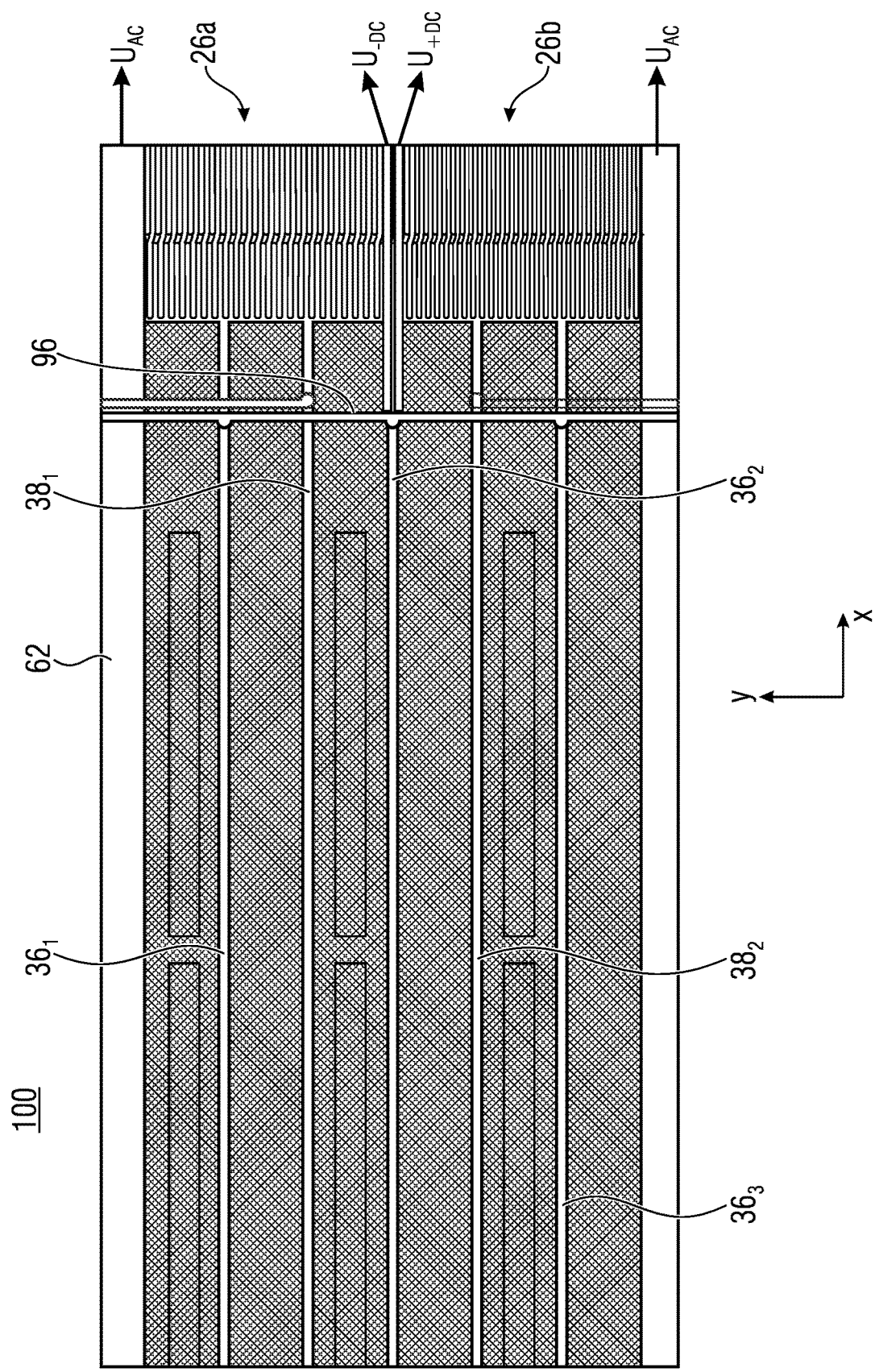
FIG. 11 shows a simplified top view of an electrical coupling of the MEMS of FIG. 10a-c according to an embodiment of the first aspect.

FIG. 11 shows a simplified top view of an electrical coupling of the MEMS 100 and thus of the active deflectable elements or active structures 26a and 26b. Here, $U_{AC}$ denotes a signal voltage, $-U_{DC}$ a first bias voltage and $+U_{DC}$ a second bias voltage. The first bias voltage and the second bias voltage can be set as desired and have the same or different absolute values. Likewise, both bias voltages can have a positive and/or negative voltage value. For example, only three movable elements $36_1$ to $36_3$ and two rigid elements $38_1$ and $38_2$ are shown.

FIG. 12a shows a schematic top view of a portion of an active structure 26 of an MEMS 120 that can be used as an active structure of other MEMS described herein, according to embodiments. Thus, stator electrodes $108_1$ and $108_2$ arranged opposite each other and one between electrodes $108_1$ and $108_2$ have comb electrode structures $114a_1$ and $114a_2$ on the one hand and 114b on the other hand, which are configured to trigger a movement of the movable electrode 112 by actuation by applying signals $U_{AC}$, $+U_{DC}$ and $-U_{DC}$ simultaneously or alternately, by engaging the comb electrode structure 114b with the comb electrode structures $114a_1$ or $114a_2$.

FIG. 12b shows a complementary state to FIG. 12a, in which the movable electrode 112 is deflected towards the stator electrode $108_2$ relative to a reference state 116.

In other words, FIGS. 12a and 12b present a further embodiment of the inventive concept in a top view. Here, actuation within the drive plane follows the stator-shuttle principle. The fixed boundaries $108_1$ and $108_2$ of the actuators are provided with comb-like deflectable elements 114b, which are interdigitated with comb-like non-deflectable counter elements $114a_1$ and $114a_2$ connected to the substrate. In a first time interval, shown in FIG. 12a, deflection of the comb-like deflectable elements occurs in a first direction of movement. In a second time interval, which is shown in FIG. 12b, the movement of the comb-like, deflectable elements takes place in a second direction of movement opposite to the first direction. The deflection occurs in-plane and perpendicular to the direction of extension of the resistive element or the interaction structure 24 arranged in another plane. The passive resistive elements of the interaction structure 24 arranged in the plane of displacement may be connected to the surrounding substrate, such as the layer $12_2$, on both sides. The resistive elements may be expanded into the active device plane where they may be driven. The movement of the actively deflectable elements, i.e., the comb electrode structures arranged in the plane $14_2$, can occur due to the resulting force due to the potential difference between the electrode structures $114a_1/114a_2$ on the one hand and 114b on the other hand. The length of the deflectable comb-like elements may be approximately 40 to 80% of the length of the resistive elements.

The electrode pairs of the actively deflectable structures can thus be formed as interdigitating electrode comb structures. For this purpose, a third electrode with an electrode comb structure may be associated with a respective electrode pair to form a group of three electrodes, exemplarily shown in FIGS. 12a and 12b. According to embodiments, an active structure provides for a plurality of such cells, which may be arranged in one or more rows according to the implementations described herein. The rows may be arranged parallel to each other, for example to generate a high force. Alternatively or additionally, it is possible to arrange rows inclined to each other to generate an at least two-dimensional movement of the interaction structure or, in other words, a 2D movement of the interaction structure can be obtained by the inclined, non-parallel arrangement of the rows of actuators. The middle of the three electrodes can be deflected in different directions based on an alternating application of the outer electrodes.

Figure 12C:
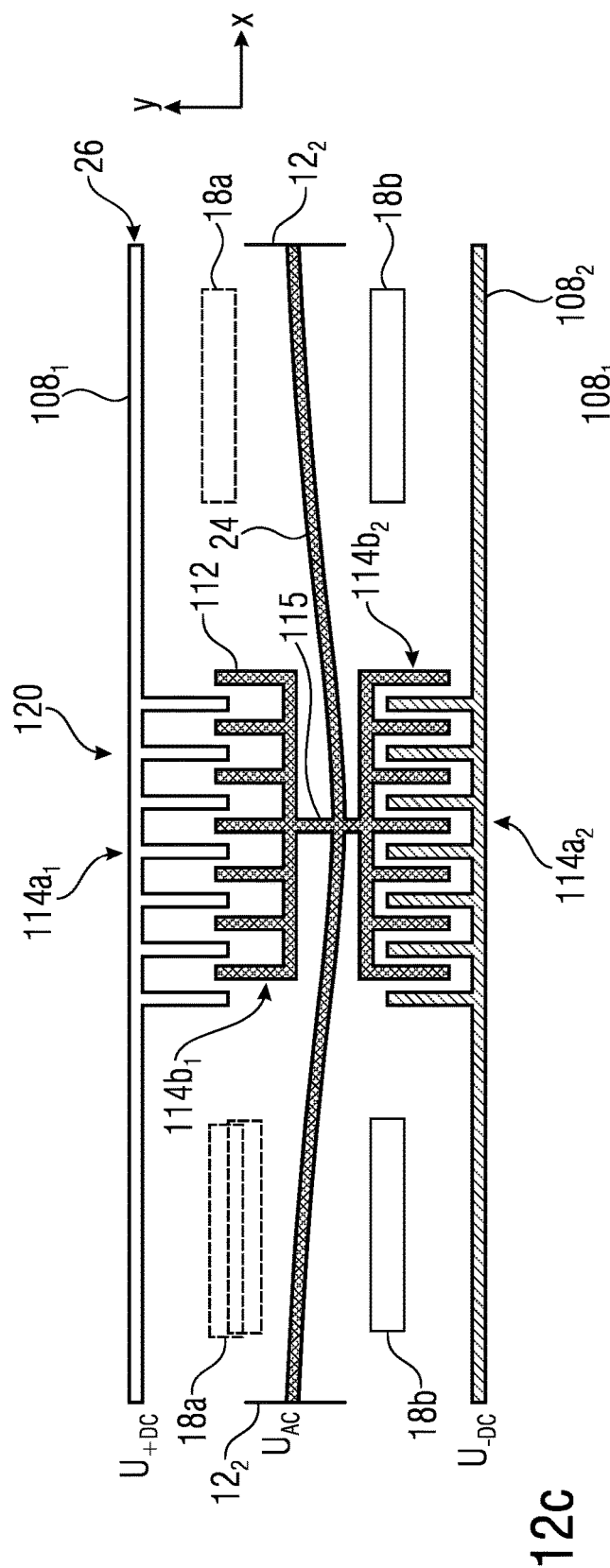
FIG. 12c-d show schematic views of embodiments of the active structure of the MEMS, wherein comb electrodes facing fixed electrodes are spatially separated from each other along the y-direction.

FIG. 12c shows a schematic top view of the active structure 26 of the MEMS 120, in which the comb electrodes facing the fixed electrodes $114a_1$ and $114a_2$, respectively, are spatially separated from each other along the y-direction to form comb electrode elements $114b_1$ and $114b_2$ that are connectable to a same potential or electrically conductively connected to each other. This can cause a spatial expansion of the comb electrode drive along the direction of movement y, which can enable large amplitudes of movement.

A bending line of the fin of the interaction structure and/or of the structure suspending the comb elements $114b_1$ and $114b_2$ can be adjusted via a number and/or a location of connecting structures 115 or $115_1$ and $115_2$, the number of which can be at least 1 (see FIG. 12c), at least 2 (see FIG. 12d) or higher.

Figure 12D:
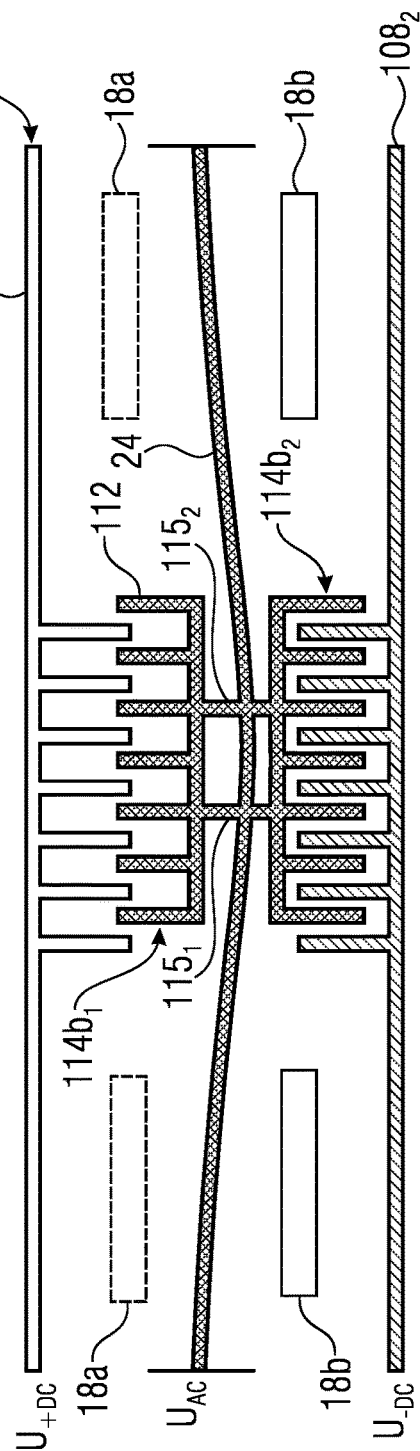
Figure 12E:
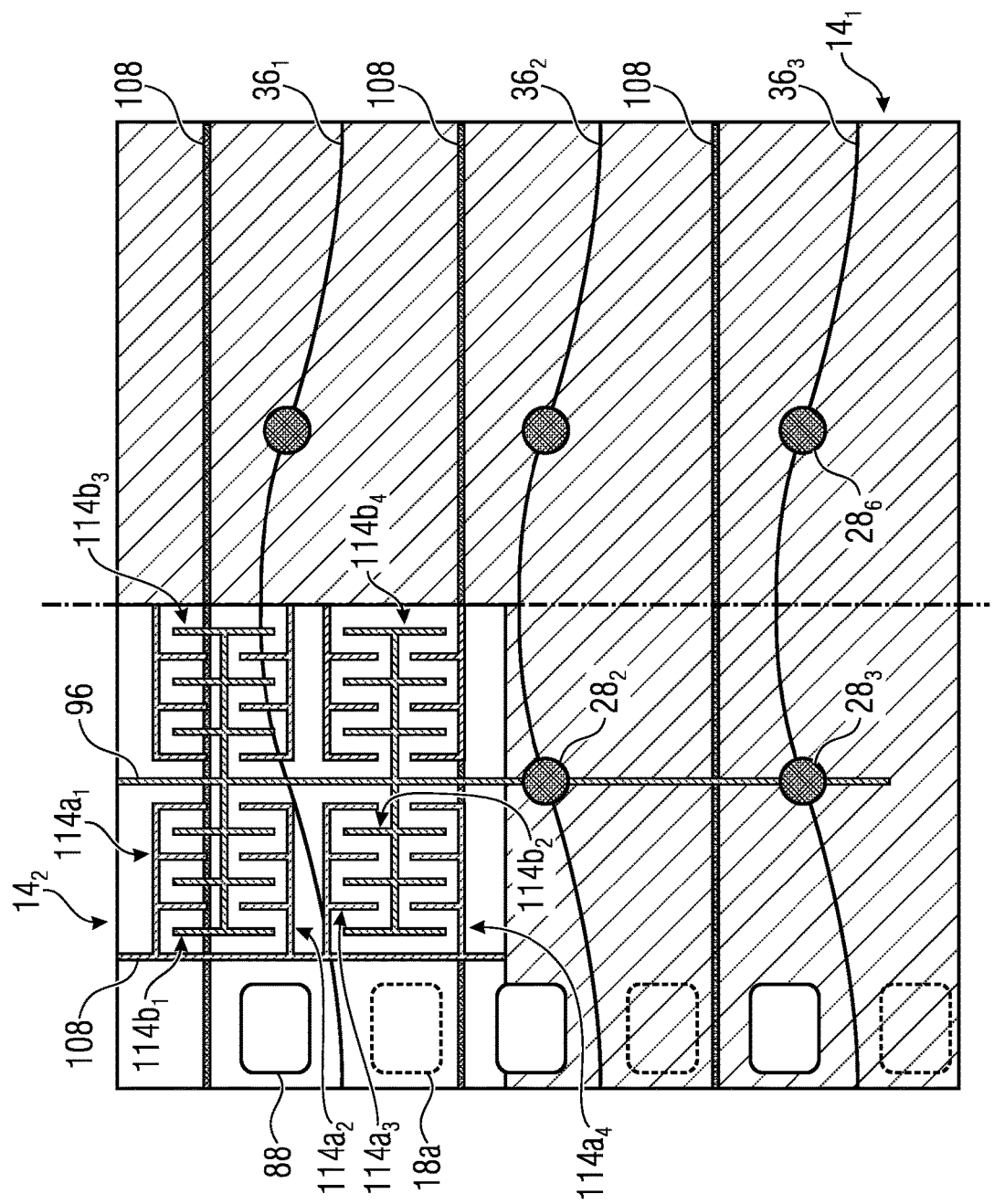
FIG. 12e shows a schematic top view of the MEMS of FIG. 12a-b, depicting a first MEMS plane in the foreground and a second MEMS plane in the background and partially obscured by the first MEMS plane.

In FIG. 12e, a schematic top view of the MEMS 120 is shown with the MEMS plane $14_1$ in the foreground and the MEMS plane $14_2$ in the background and partially obscured by the MEMS plane $14_1$, which in turn is partially not shown to expose the MEMS plane $14_2$.

A boundary 108 can be a multiple of the stationary electrodes 114a by electrode combs $114a_1, \ldots, 114a_4, \ldots$ both multiple in series one after the other as well as in multiple rows, i.e. interconnected with each other as at least one-dimensional or at least two-dimensional array. Depending on the design, the electrode combs $114a_1, \ldots, 114a_4, \ldots$ can be supplied with electrical potentials individually, in groups or globally or can be insulated from each other.

In the plane $14_2$, a mechanical connection of different movable comb electrode elements 114b may be provided by means of one or more connecting ridges 96 to enable a uniform transmission of the movement to the interaction structure 24, such as the movable fins $36_1$ to $36_3$, for which one or more coupling elements $28_2$ to $28_6$ may be provided. Other designs of the electrode combs can also be implemented, such as the enlargements shown in FIG. 12c and FIG. 12d.

In other words, FIG. 12e shows the connection between the coupling rods and the comb drive. In contrast to known comb drives, the comb drive shown moves exclusively parallel to and partly in the plane $12_2$ or in-plane.

Figure 12F:
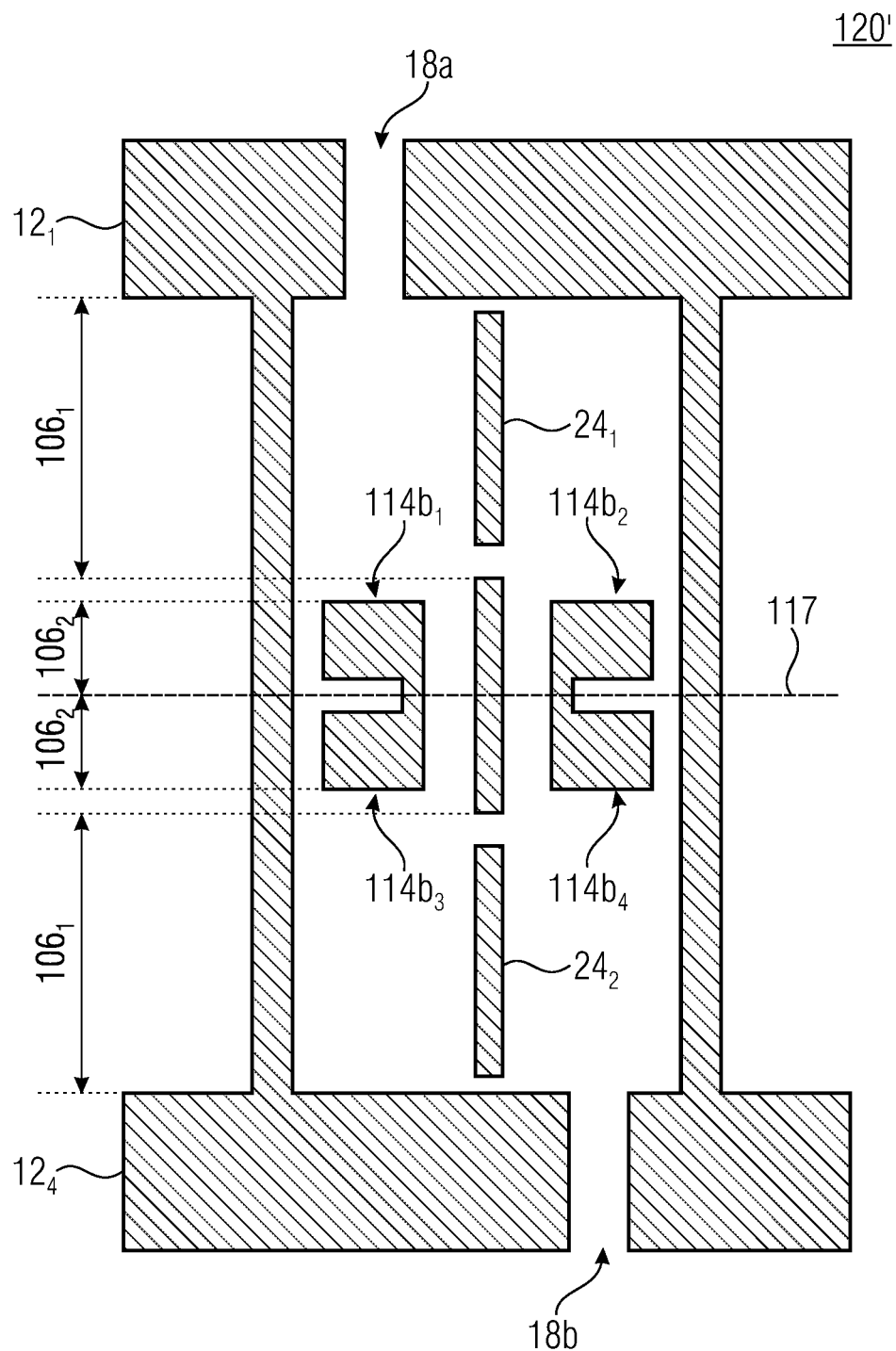
FIG. 12f shows a schematic side-sectional view of an MEMS according to an embodiment, wherein the active structure and/or the interaction structure is symmetrically mirrored.

FIG. 12f shows a schematic side sectional view of an MEMS 120', which can be constructed similarly to other MEMS described herein and can, for example, comprise the electrode comb drive of the MEMS 120, wherein the additions to the MEMS120' can be readily used for other types of drive. Thus, structurally, a mirroring or duplication of the drive can be performed on a plane 117, so that instead of the two comb electrode structures $114b_1$ and $114b_2$, four comb electrode structures $114b_1$ to $114b_4$ can be arranged, which can be coupled, for example, mechanically and/or electrically in pairs with each other directly or indirectly, for example to pairs $114b_1/114b_3$ and $114b_2/114b_4$, which enables a doubling of the actuator area while maintaining manufacturing parameters and, in particular, the aspect ratios. Alternatively or additionally, the interaction structure 24 may be mirrored on plane 117 and used as interaction structures $24_1$ and $24_2$, which allows for a further increase in the amount of fluid moved while maintaining the same or comparable area requirements of the MEMS.

Dimensions $106_1$ of interaction structures $24_1$ and $24_2$ and/or dimensions $106_2$ of active structures $114b_1/114b_3$ and $114b_2/114b_4$ may be the same or different.

Figure 12G:
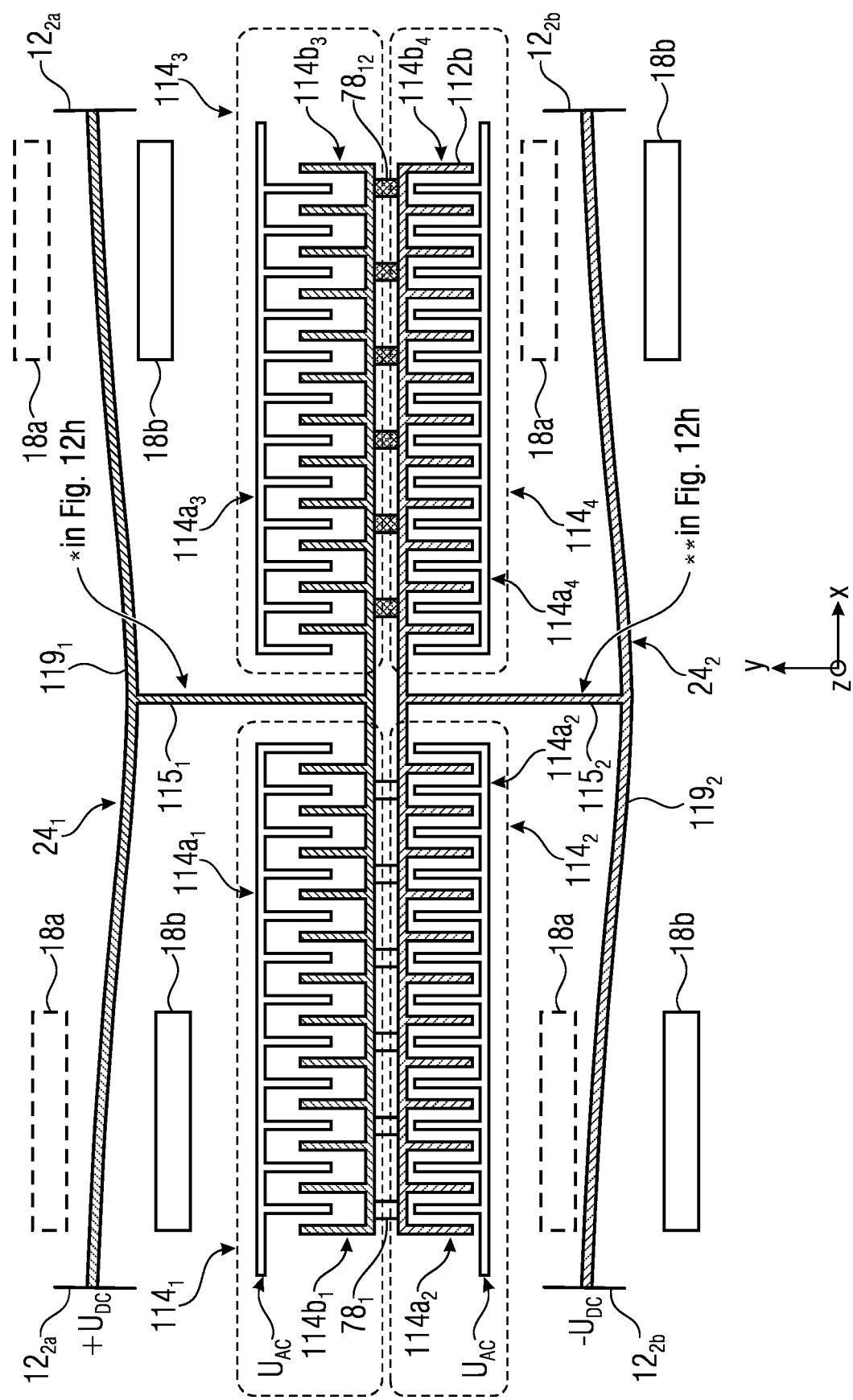
FIG. 12g shows a schematic top view of parts of an MEMS according to an embodiment, wherein, in a comb electrode structure, inner movable comb electrodes are subjected to an alternating potential and outer comb electrodes are subjected to different static potentials.

FIG. 12g shows a schematic top view of parts of an MEMS according to an embodiment, such as the MEMS 120, in which the active structure 26 is similarly extended from the configuration in FIGS. 12a and 12b as described in connection with FIG. 12c and FIG. 12d. However, as an alternative to FIGS. 12a-d, the active structure 26 is implemented in such a way that one in the shuttle 112a/112b, by means of, for example, electrostatic forces, is passed on to a respective associated interaction structure $24_1$ and $24_2$ using the stationary comb electrode $114a_1$ to $114a_4$, by means of connection elements $115_1$ and $115_2$. In the display plane, instead of the interaction structures $24_1$ and $24_2$, elements $119_1$ and $119_2$ are shown, which, for example, but not necessarily, may be arranged at least partially in the MEMS plane $14_1$, as can be seen from the schematic side-sectional view of the MEMS of FIG. 12g shown in FIG. 12h.

The elements $115_1$ and $115_2$ may be formed elastically and may support the movement of the shuttle and/or the interaction structure, at least in part, relative to the substrate.

The comb electrode structures $114b_1$ to $114b_4$ may be combined to form pairs $114b_1$ and $114b_3$ and $114b_2$ and $114b_4$, and the pairs may be electrically insulated from each other by means of electrical insulation. Although a continuous insulation layer may also be used for this purpose, discrete insulation regions $78_1$ to $78_{12}$ offer an advantage in terms of mechanical deformability of the structure.

In other words, the comb electrodes $114a_1$ to $114a_4$ on the one hand and $114b_1$ to $114b_4$ on the other hand can each be formed or grouped into pairs $114_1$ to $114_4$, of which each electrode pair has a stationary comb electrode $114a_i$ with $i=1, \ldots, 4$ and a movable comb electrode $114b_i$ arranged movably relative to the stationary comb electrode $114a_i$. The MEMS can have any number of electrode pairs, such as 1 as in FIG. 12a-d, which can be supplemented by a third electrode, for example, but also a higher number of at least two. According to FIG. 12g, 4 pairs are shown as an example, which enables symmetrical actuation around a region of minimum distance of the elements $115_1$ and $115_2$. While pairs mirrored at the elements $115_1$ and $115_2$ at an axis parallel to the y-axis can be constructed in the same way, a continuation of a respective pair or even be understood as a pair of comb electrodes, in the case of pairs which are arranged opposite each other at an axis parallel to the x-axis, for example the pairs $114_1$ and $114_2$ or $114_3$ and $114_4$ are formed in such a way that the movable comb electrodes $114b_i$ of the first pair of comb electrodes $114_1$ and $114_3$ and the second pair of comb electrodes $114_2$ and $114_4$ are mechanically coupled to each other and electrically insulated from each other, for example using the discrete regions 78. At a point in time, these comb electrodes can thereby be subjected to mutually different electrical potentials $+U_{DC}$ and $-U_{DC}$. The MEMS may be configured to apply a time-varying potential, namely the potential $U_{AC}$, to the stationary comb electrodes $114a_i$ of the first pair and the second pair.

Regardless of other details described in this context, the comb electrodes $114a_1$ to $114a_4$ can have the varying potential $U_{AC}$ applied to them differently than in FIGS. 12a-d, while the comb electrodes $114b_1$ to $114b_4$ disposed therebetween can have different potentials $+U_{DC}$ and $-U_{DC}$ applied to them in pairs $114b_1$ and $114b_3$ and $114b_2$ and $114b_4$, respectively. Voltages which can be used for this purpose can correspond to other embodiments and, for example, lie in a range of 0.1 V and 24 V or less in terms of magnitude, wherein $+U_{DC}$ and $-U_{DC}$ can be used to designate comparatively static potentials which are possibly equal in magnitude to a reference potential, for example ground or 0 V, but are provided inverted in sign. The alternating potential $U_{AC}$ can have a variable value and can be switched back and forth between the potentials $+U_{DC}$ and $-U_{DC}$, for example, in order to generate alternating forces.

Figure 12H:
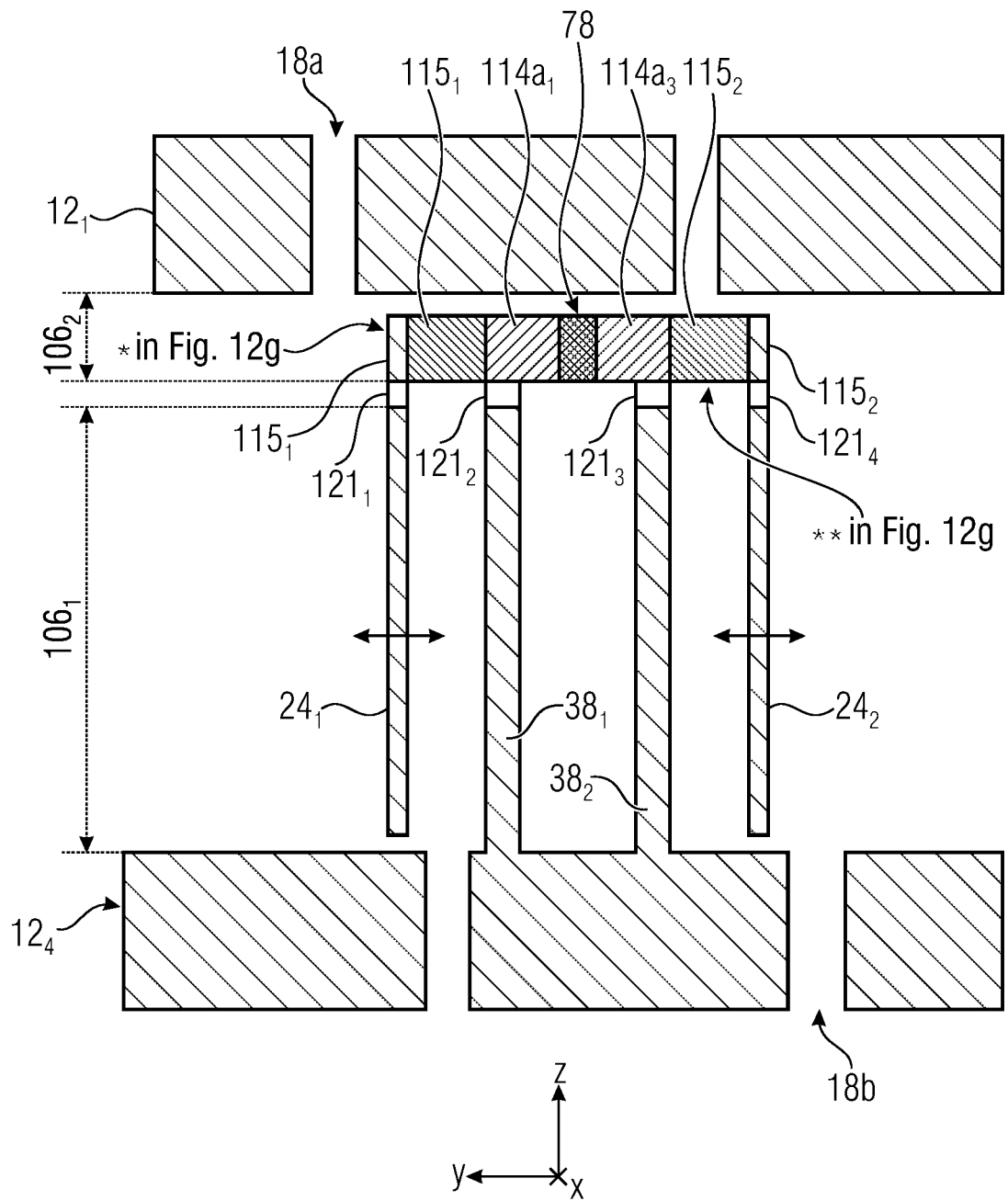
FIG. 12h shows a schematic side-sectional view of the MEMS of FIG. 12g.

The pairs $114b_1$ and $114b_3$ as well as $114b_2$ and $114b_4$ can each be supplied with the potentials electrically separately from one another, wherein the elements $115_1$ and $115_2$, respectively, can be used for this functionally synergetically, which are mechanically firmly and electrically coupled to the elements $119_1$ and $119_2$, respectively, but can be electrically insulated from the interaction structures $24_1$ and $24_2$, for example by insulation regions $121_1$ and $121_4$ shown in FIG. 12h, which can be formed, for example, comprising oxide materials and/or nitride materials. The elements $115_1$ and $115_2$ enable easy forwarding of potentials, for example from different and electrically insulated regions $12_{2a}$ and $12_{2b}$ of a surrounding substrate or other connection possibilities.

An advantage of the configuration shown in FIG. 12g and FIG. 12h is that when the MEMS planes $14_1$ and $14_2$ are projected into each other, comparatively large spaces between elements of the interaction structure can be filled with a large density of elements of the active structure. It may be envisaged, for example, to connect the interaction structure $24_1$ and $24_2$ or elements or fins thereof to further adjacent actuator cells to obtain a further increase in force. For example, the elements $115_1$ and/or $115_2$ could be expanded from the central region of the comb electrodes 114a/114b beyond the interaction structures $24_1$ and $24_2$ and connected there to electrically mirrored cells.

In FIG. 12h, a positional relationship of the elements is shown in a side-sectional view, wherein a representation of the comb electrodes $114b_1$ to $114b_4$ is omitted. Exemplarily, the dimension $106_1$ is selected in a range of 400 μm to 650 μm, although other dimensions may also be used. Alternatively or additionally, the dimension $106_2$ is, for example, at least 30 μm and at most 75 μm, although other values can also be implemented here based on the requirements of the application. The rigid fins $38_1$ and $38_2$ may be used to divide the cavity and may form two elements spaced along the y-direction to save material and/or weight, but may readily be formed as one common element. Optionally, the fins $38_1$ and/or $38_2$ may be used to mechanically support the comb electrodes $114a_1$ to $114a_4$, for which purpose electrically insulating insulation regions $121_2$ or $121_3$ may be provided, for example.

FIG. 13a shows an exemplary top view of a movable layer arrangement or active structure 130 according to one embodiment, which may be arranged singly or in multiples, for example to deflect an interaction structure of an MEMS described herein. However, this actuation concept is not limited herein, but is applicable in any MEMS comprising a layered structure and a cavity disposed in the layered structure. The active structure 130 is a movable layer arrangement comprising three bars $76_1$ to $76_3$, which may, for example, be similar or identical in structure to the bars 76 of FIGS. 5a and 5b. The bars are also electrically insulated and fixed with respect to each other at discrete portions $78a_1$, $78a_2$, $78b_1$ and $78b_2$, discrete portions or insulating elements $78a_1$ and $78a_2$ fixing bar $76_1$ with respect to bar $76_3$ and discrete portions or insulating elements $78b_1$ and $78b_2$ fixing and insulating bar $76_2$ with respect to bar $76_3$. A number of two discrete regions each between two adjacent bars $76_1$ and $76_3$ or $76_2$ and $76_3$ is exemplary and may be any number of at least 2, for example 2, 3, 4, at least 5, at least 7, at least 10 or more.

The movable layered structure is configured to perform movement along a direction of movement 122a or 122b in response to an electrical potential between the bars $76_1$ and $76_3$ or in response to an electrical potential between the bars $76_2$ and $76_3$. For example, based on a fixation of the layered structure, a potential between the bars $76_1$ and $76_3$ may cause movement along the direction 122b, while said electrical potential between the bars $76_2$ and $76_3$ may cause movement along the direction 122a.

In other words, the direction of deflection can be obtained in both directions 122a and 122b. The applied voltage can determine the direction. The gap between the bars $78a_1$ and $78a_2$ may, for example, cause a clockwise torque in the plane of presentation and thus a deflection in the direction 122b when the upper end in the direction of the image is fixed, for example by having the actuator connected to a substrate not shown (interface correspondingly in the y-direction) in a region of the discrete region of $78a_1$. A gap between the bars $78b_1$ and $78b_2$, on the other hand, can generate a counter-clockwise torque and cause a deflection along direction 122a when the upper end is fixed with respect to the upper end.

The discrete regions for fixing the bars $76_1$ and $76_3$ on the one hand and the bars $76_2$ and $76_3$ on the other hand are arranged offset from each other along an axial course along a direction 124 of the movable layer arrangement 130. This can be understood to mean that in at least one region along the axial course along the direction 124, the bar $78_3$ is fixed with respect to an adjacent bar $76_1$ or $76_2$, while in this region it has no fixation with respect to the other opposite bar.

Merely by way of example, directions 122a and 122b may be arranged parallel to the y-direction, while direction 124 may be arranged perpendicular thereto and parallel to the x-direction, such as in the MEMS 20 of FIG. 2. When the daily layer arrangement 130 is used at least as part of the active structure 26 of an MEMS described herein, the corresponding MEMS may be provided with an opening in the layered structure and may be movably arranged in the plane $14_2$ to drive an interaction structure configured to interact with a fluid in the cavity, such that a movement of the interaction structure is causally related to a movement of the fluid through the at least one opening. The active structure is then mechanically coupled to the interaction structure and configured such that an electrical signal at an electrical contact of the active structure or the layer arrangement is causally related to a deformation of the active structure and the movable layer arrangement, wherein the deformation of the active structure and the movable layer arrangement is causally related to the movement of the fluid, such as due to direct contact with the fluid or indirect contact, such as via the interaction structure.

As shown in FIG. 13a, the movable layer arrangement 130 may be formed with multiple curvatures in different directions along the axial path parallel to direction 124. For example, each of the bar elements may be bent or curved according to a zig-zag pattern and the adjacent bars may have a substantially parallel course to each other.

For example, the spacers or discrete regions $78a_1$, $78a_2$, $78b_1$ and $78b_2$ may be disposed on an outer side of a change in curvature of the axial path. For example, the movable layer arrangement 130 is curved in the region of the discrete region $78a_1$ to subsequently point in the direction 122a, while in a region of the discrete region $78b_1$ there is another change of direction in the direction 122b. Fixation can take place on the respective outer side of the movable layer arrangement in the area of the change in curvature.

FIG. 13b shows a schematic top view in which a plurality of N discrete regions are provided between bars $76_1$ and $76_3$ and a plurality of M discrete regions are provided between bars $76_2$ and $76_3$ along the axial path parallel to direction 124. Possibly, but not necessarily, N is equal to or different from M in number. A number may be selected based on a desired overall length of the structure along x.

The overall length of the actuator, i.e., the moving layered structure, when used as an active element may be limited by the clearance (distance to the lid/handle wafer) and the associated vertical pull-in (where the actuator touches the lid/handle layer). As an active drive, the overall length is limited or influenced by the lateral pull-in in individual cells. Comparatively short actuators can result with a one-sided clamped version, here there are minimally only 2 unit cells, which allows a wide range of values.

The total length of a movable layered structure can, for example, as an active sound-generating actuator, be in a range of at least 50 µm and, for example, be at most 5 mm, a range of around 2.5 mm and a configuration clamped on both sides is advantageous, although other values can also be implemented, for example by additional spacing elements that prevent the vertical pull-in. A corresponding limitation can also be less critical in a sensory application.

Figure 14A:
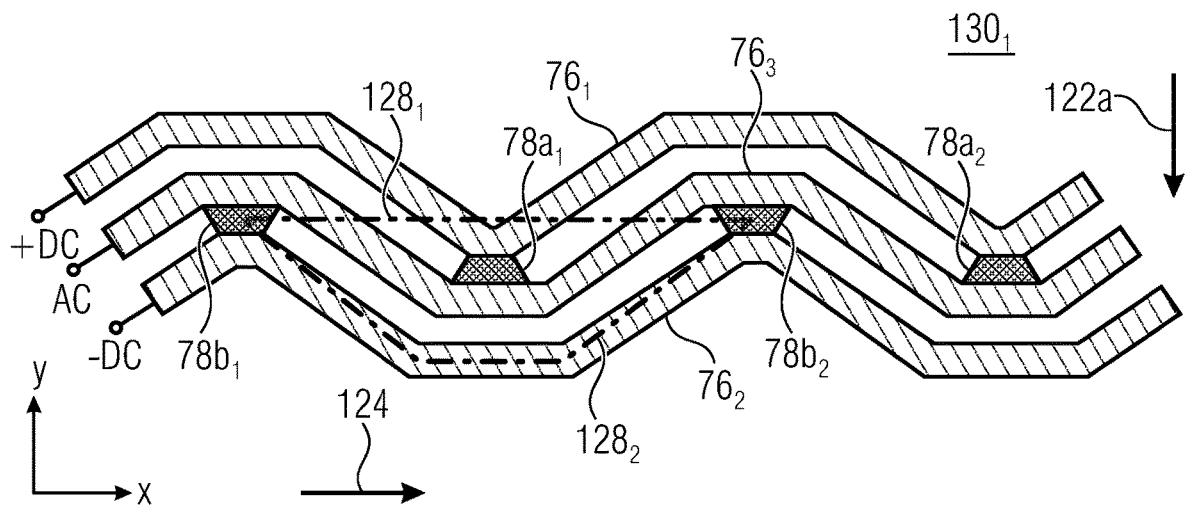
FIG. 14a-f show schematic views of different embodiments of active movable layer arrangements according to embodiments of the second aspect.
Figure 14B:
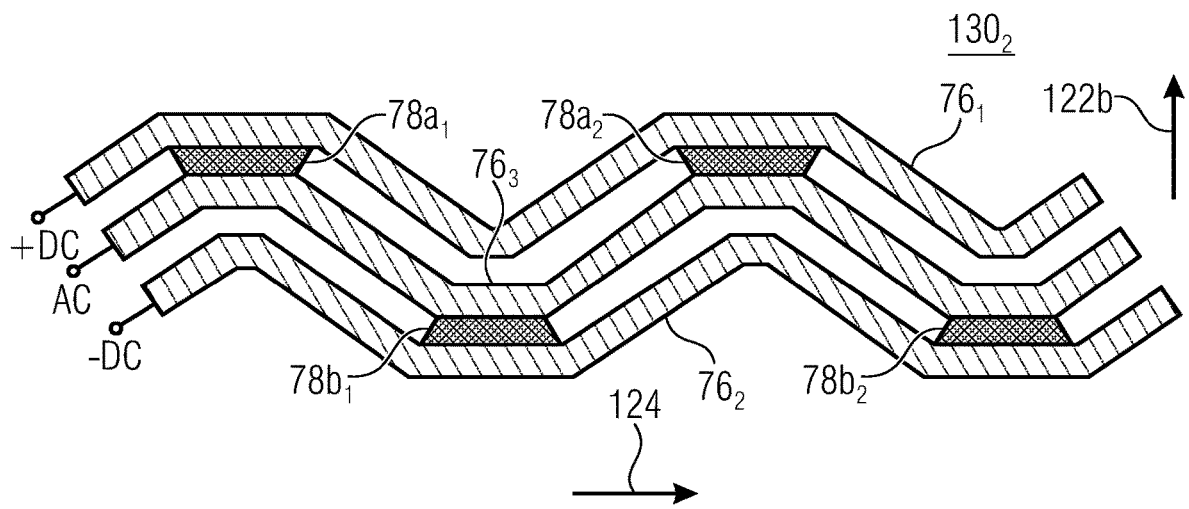
Figure 14C:
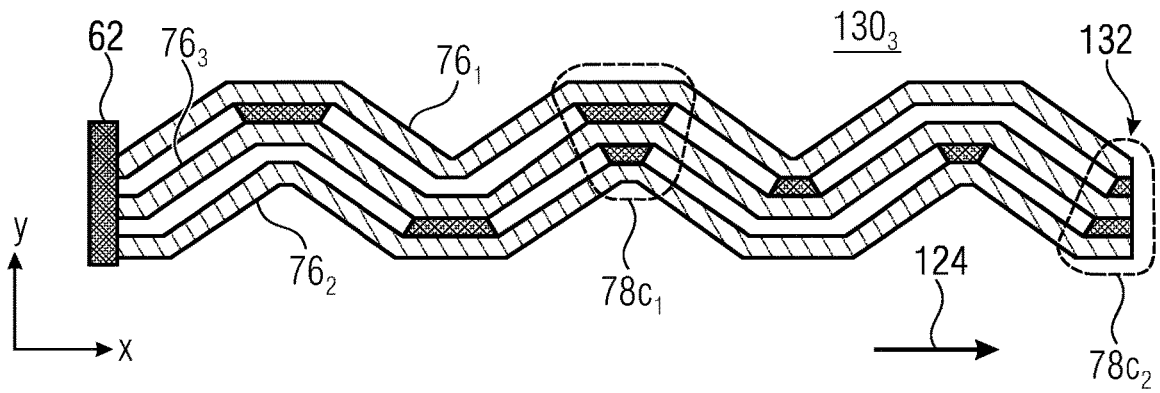

A total length as a drive plane can, for example, lie in a range of at least 200 µm and at most 10 mm, wherein a configuration of the actuator clamped on both sides is advantageously considered here and a central connection is implemented, for example in a region $78c_1$ from FIG. 14c. Advantageously, lengths in a range between 3 mm-4 mm are implemented. However, a central connection is not always necessary. Further examples of a double-sided clamped configuration are shown in FIG. 14e and FIG. 14f. The central connection may be advantageous, for example, if the actuator is used as a drive element as in FIG. 14e. If it is used as an active element for sound generation, i.e. it provides direct contact with the fluid, then it may be advantageous to choose a point-symmetrical actuator, as shown in FIG. 14f.

As an active sound-generating actuator, longer cells can lead to larger deflections. Therefore, for such an application in such a range, a smaller number of discrete ranges are advantageous. As a drive element, the total length can be greater. However, too long cells can limit the voltage. This can be optimized by the number of cells. The number of cells can be chosen depending on the selected length of the elementary cell.

When using the active layered structure as an actively sound-generating actuator, such as an actuator interacting directly with the fluid, a number N or M of at least 2 and at most 100 can be selected, advantageously a small number of at most 50, at most 10 or exactly 2.

When used as a drive element, such as for an interaction structure described herein, the number of discrete regions may be at least 2 and at most 100, advantageously at least 2 and at most 50, at least 2 and at most 10, and particularly advantageously at least 2 and at most 4, depending on the total length and cell length.

An extension or dimension of a discrete region or insulation island along x can be at least 1 µm and at most 100 µm, a dimension of 15 µm is advantageous.

The length of a unit cell along the x-direction can be viewed as the sum of 2*length of the slopes+1*length of the insulation island. The length (along the diagonal direction) of such a slope (a leg in the triangle shown in FIG. 13b) can be at least 10 µm and at most 1,000 µm and is advantageously around 250 µm. This design can also affect the offset between the discrete regions (length of a slope) and/or the offset of the unit cells, so that these can also be at least 10 µm and at most 1000 µm in such a configuration.

A length of a unit cell, that is a distance between the discrete regions along the x-direction, can be, for example, in a range of at least 20 µm and at most 2,200 µm, with values in a range of at least 450 µm and at most 550 µm being advantageous.

A height or dimension along the y-direction, that is, for example, a distance between the discrete regions $78a_2$ and $78b_1$, together with the length of a slope (offset between discrete regions), can give the angle of a unit cell (angle of a slope to the horizontal direction). This angle is greater than 0° and less than 90°, advantageously 2°. For the advantageous offset of the discrete regions of 250 µm, the height of the discrete region can advantageously be 8 µm to 9 µm. The height is advantageously selected in a range from greater than 0 to 500 µm.

A geometry of a geometric body of two discrete regions disposed between the same bars $76_1/76_3$ or $76_2/76_3$, and an intervening portion of the bar $76_3$ at the center and/or inflection point of which a discrete region may optionally be disposed to fix the respective other pair of bars, may be referred to as a unit cell 126. For example, a unit cell $126_1$ is formed from an exemplary triangle of the vertices of discrete regions $78a_1$, $78a_2$ and $78b_1$, while a unit cell $128_1$ may be formed from the vertices of another exemplary triangle of discrete regions $78b_1$ and $78b_2$ and $78a_2$. A geometry of the unit cells is adjustable by means of the positions of the discrete regions and can influence the movement behavior, such as amplitude, linearity and/or force, of the movable layer arrangement 130.

In other words, FIGS. 13a and 13b show an embodiment of an alternative deflectable element 130. The illustration of the connection to the surrounding substrate is omitted here, since in the advantageous embodiment this embodiment aims at a connection of the bars 76 to the surrounding substrate on both sides, which means that the movable layer arrangement may be fixedly clamped on both sides.

Exemplarily, the geometry is formed by bars $76_1$ to $76_3$ arranged in a zig-zag shape, although more than three bars may be arranged. Embodiments may also have other geometries of the bars 76. For example, in connection with FIGS. 18a and 18b, another possible geometry is shown that is based on circular segments. That is, the bars may be straight or curved in sections. The unit cells or elementary cells 126 and/or 128 shown denote a segment consisting of discrete regions or insulation islands and bar segments. Different elementary cells, such as elementary cells $126_1$ and $128_1$ may also have different geometries, as shown, for example, in connection with FIGS. 14a to 14f. Embodiments are not limited to an arrangement of three bars, but may include a plurality of bars. The discrete regions 78 may also be referred to as insulation islands or insulating spacers.

For an elementary cell 128 capable of causing deflection in direction 122b, segments of bars $76_2$ and $76_3$ and two insulation islands, in particular adjacent insulation islands $78b_1$ and $78b_2$ are connected to each other. Further unit cells 128 are arranged in a lateral direction, such as along the direction 124, such that adjacent elementary cells 128 have a common insulation island 78b, as shown for example for unit cells $128_1$ and $128_2$. Depending on the orientation of the actively electrostatically activated cell, different deflection directions may result.

The active elements, bars, can be provided in pairs or in a higher number as well as in different numbers to achieve the respective direction 122a or 122b. An asymmetry can be compensated by wiring.

FIG. 14a shows a schematic top view of a movable layer arrangement 130 according to an embodiment which, compared to the movable layer arrangement of FIG. 13a, has the insulation islands $78a_i$ with i=1, . . . , I and $78b_j$ with j=1, . . . , J, on respective inner sides of the radii of curvature.

FIG. 14b shows a schematic representation of a movable layer arrangement $130_2$ in which the discrete regions $78a_i$ and $78b_j$ are arranged on outer sides of the radii of curvature of the curved path of the movable layer arrangement along the direction 124, i.e. complementary to FIG. 14a and in accordance with the representation according to FIG. 13a. The shown deflections are exemplary but not restrictive. In FIGS. 14a and 14b, the deflection is chosen to show the influence of the position of the insulation islands 78 on the deflection and exemplary for a constant voltage assignment. For example, in FIG. 14a it is assumed that the bar $76_1$ is supplied with +DC and the bar $76_2$ is supplied with –DC, while the bar $76_3$ in between is supplied with a control signal AC, which is also –DC as an example. In this way, it can be achieved that only the gap between $76_1$ and $76_3$ is active. Depending on the arrangement of the insulation islands, this determines the direction of movement or the bending moment generated. Since only one half is active in such an exemplary control, the deflection is only shown in one direction 122a (FIG. 14a) or 122b (FIG. 14b), where the wiring is assumed to be complementary, i.e. the AC signal is +DC). A different form of movement can be achieved by other potentials or signals.

FIG. 14c shows a schematic top view of a movable layer arrangement $130_3$, which may be clamped to one end of the substrate 62. Optionally, an opposite end 132 can be freely movable. Alternatively, the movable layer arrangement $130_3$ can also be clamped on both sides.

The movable layer arrangement $130_3$ may include one or more combinatorial discrete regions $78c_1$ and $78c_2$ at each of which both $76_1$, $76_2$ and $76_3$ are mechanically fixed to each other.

Optionally, the connecting elements or discrete regions may have a variable extension in the MEMS plane $14_2$ and parallel to an axial path of the movable layer arrangement along a direction between the discrete regions, for example along the direction 124. For example, the discrete regions of FIG. 14c have a variable extension along the direction 124 perpendicular to the direction 124 and parallel to the plane $14_2$ or parallel to the x/y plane, respectively, which may be based on a trapezoid, for example. That is, the discrete regions may be formed in a trapezoidal shape. Optionally, a discrete region may also be provided at the end 132, which may provide an attachment of the bars $76_1$, $76_2$ and/or $76_3$ to each other.

Figure 14D:
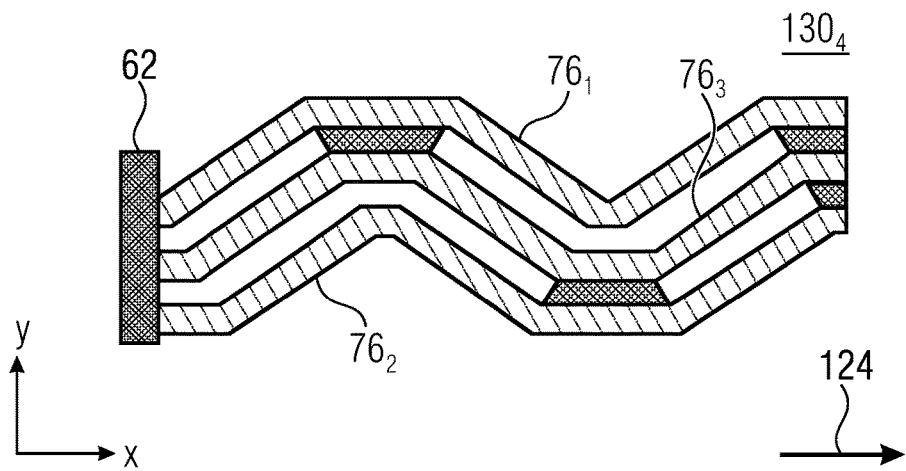
Figure 14E:
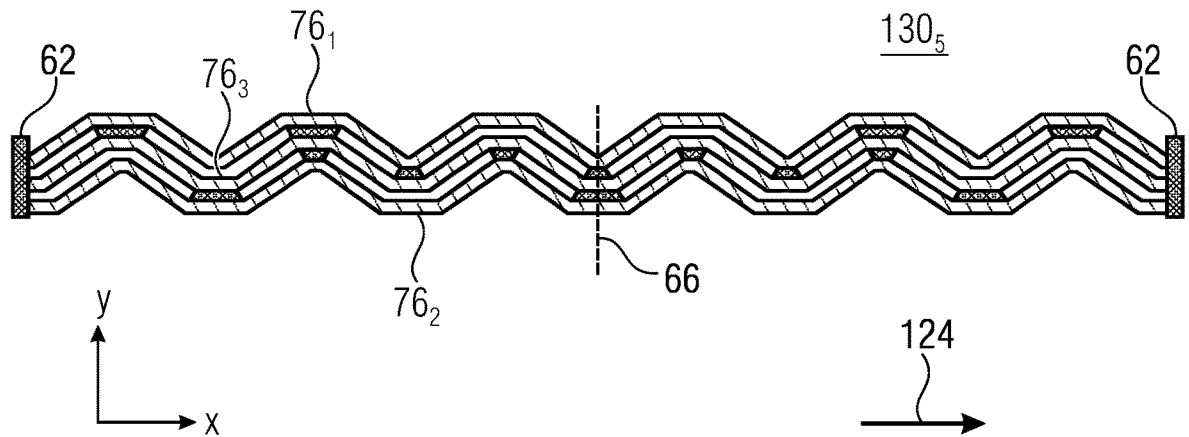
Figure 14F:
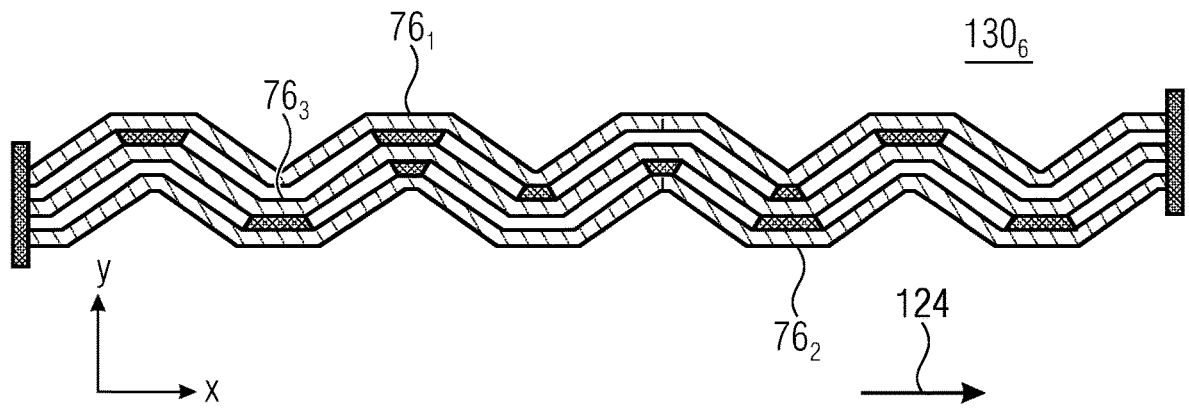

FIG. 14d shows a schematic representation of a movable layer arrangement $130_4$ that is shortened compared to the movable layer arrangement $130_3$. Alternative embodiments envisage implementing a longer movable layer arrangement along the direction 124.

FIG. 14e shows a schematic view of a movable layer arrangement 130 according to an embodiment, which is made longer along the direction 124 according to the movable layer arrangements $130_3$ and $130_4$ and, independently thereof, is fixedly clamped on both sides.

FIG. 14f shows a schematic view of a movable layer arrangement $130_6$ according to an embodiment, which is also fixedly clamped on both sides.

One or more of the layer arrangements may have symmetries. For example, while the movable layer arrangement $31_5$ may be formed axially symmetrical with respect to an axis of symmetry 66 perpendicular to the direction 124, the movable layer arrangement 130 with respect to the combinatorial discrete region $78c_1$, which may, for example, denote a geometric center of the movable layer arrangement, may, for example, be formed point-symmetrically with respect to the other discrete regions. In principle, any kind of symmetries are possible.

In other words, the direction of deflection of a muscle cell may depend mainly on the arrangement of the insulation islands, for example "valley" as implemented by discrete regions $78a_1$, $78a_2$ and $78b_1$ and $78b_2$ of FIG. 14a, or "mountain" as implemented by discrete regions of FIG. 14b. A valley can be understood to be located on the inside of a corresponding radius of curvature, while a mountain can be understood to be located on an outside of a change of curvature or direction. Thus, muscle cells with the same electrical wiring can be designed with different directions of deflection. The combination of the two possible positions via a connector with insulation islands in both strands (combinatorial discrete regions 78c, for example in FIG. 14c) or, for example, a course of valley/mountain/mountain/valley or mountain/valley/valley/mountain or mountain/valley/mountain/valley/mountain/valley within an actuator clamped along the direction 124 on both sides allows a linear deflection in the actuator center in a balanced wiring, as shown, for example, for FIG. 14f. The number as well as the geometry of the elementary cells used may differ in embodiments. A described structure generally offers the possibility to provide for a deflectable element, clamped on both sides, with a linear characteristic which is asymmetric with respect to the area centroid fibre ("balanced asymmetric" NED"-BA-NED) in contrast to the BNED. The linearity of the area swept by the deflectable element is given when the swept area of the bending line with the active strand or strands causing direction 122a coincides as much as possible with the swept area caused by the active strand or strands along direction 122b. These displaced areas result, for example, when the center electrode and one of the outer electrodes have the same electrical potential and the other electrode is at ground, as described, for example, in connection with FIGS. 14a and 14b. The electrical properties such as the operating point voltage or the slope of the associated AC characteristic of the electrical control can be adjusted via the geometry of the elementary cells 126 and/or 128. For example, longer elementary cells can be used to achieve greater deflections at comparatively lower voltages. A longer elementary cell means, for example, a greater distance between the insulation islands along direction 124. Furthermore, depending on the combination of elementary cells 126 and 128, a, around the actuator center, mirror-symmetrical (see FIG. 14e) or point-symmetrical actuator (see FIG. 14f) results. The mirror symmetry has the advantage that the moments on the right and left of the connecting piece, like $78c_1$ in FIG. 14c, are in equilibrium. As a result, the individual elementary cells 126 or 128 behave similarly. The point-symmetrical arrangement offers the advantage of using longer elementary cells for the same overall length and thus increasing the deflection. Furthermore, the displaced areas with only one active strand each are the same for this case. This ensures the linearity of the characteristic curve.

The connection of a deflectable element to the surrounding substrate 62 may consist of a fixed or resilient connection between substrate 62 and elementary cell 126 or 128 or substrate 62 and insulation island/discrete region. The connection element to the substrate may have the same or a different stiffness as the electrodes or insulation islands. The resonant frequency of the actuator can be increased by the resulting axial stress at the clamping, compared to the case without axial tension. Such an axial tension can be built up, for example, by combining different materials.

Furthermore, a passive element for the deflection can be introduced within the actuator to adjust the expansion stiffening. For example, a long connector 78c or a section with three straight, parallel electrodes.

BA-NED actuators can be used analogously to FIG. 6a and FIG. 6b for the construction of a muscle/deflectable element 26. Due to the linearity of the characteristic curve, they are also suitable as elements for direct sound generation analogous to the loudspeakers based on GEN1 A-NED (first generation asymmetric NED) described in WO 2018/193 109 A1. Technologically, these actuators offer the advantage that the electrical wiring can be done within the actuator plane. In addition, no partitions are needed for the electrical signal routing between the actuators. Thus, the packing density of the actuators can be increased. In general, a BA-NED can be clamped on one or both sides by selecting the island positions (see FIG. 14c-f). Several zig-zag strands placed end to end again result in a BA-NED muscle, as shown, for example, in FIGS. 15 and 16. If the same electrical potential difference is applied to the strands due to the choice of wiring, as shown, for example, in FIG. 17, the cells block each other in their horizontal movement, which can cause a change in length in the horizontal direction.

For balanced operation, i.e. linear operation, the same electrostatic potential difference is generated on strings with the same topology. For example, a positive and a negative DC bias voltage can be combined with an AC signal or an AC signal with an inverted signal and a DC bias voltage. As a result, one half of each muscle (strands with the same cell topology) acts in one deflection direction. This allows the muscle to be actively deflected in both directions. The resetting force is thus the electrostatic force. The balanced behavior enables a higher linearity of the movement. This means that the movable layer arrangement can be configured to move a free end of the movable layer arrangement, for example the end 132 (with or without discrete fixation) along two linearly independent directions, for example the directions $122a/122b$ on the one hand and the direction 124 on the other.

The number of voltage signals needed can still be reduced by grouping the strands. Further variants are to be selected accordingly as multiples of two strands with an equal island offset. The voltage can be selected so that the potential difference results in the signal (or the inverted signal) on all strands with the same topology.

Other muscle areas of the same geometry can also be combined to enable a two-dimensional deflection of the muscle. For example, a "brick pattern" muscle with a "brick pattern" rotated 90° allows movement in the horizontal as well as axial direction. This allows the resistive element 24 to travel along both axes in the plane below. Such implementations apply to all embodiments described herein.

FIG. 15 shows a schematic view of a movable layer arrangement 150 according to an embodiment, which has at least a fourth bar, in the example shown also a fifth bar $76_4$ and $76_5$. Instead of trapezoidal discrete regions, square cross-sections of the discrete regions can also be selected, for example, and independently of the number of bars selected. A higher number of bars is also possible, such as at least 6, at least 7, at least 8, at least 10, at least 20 or more.

The discrete regions 78 of the movable layer arrangement may each be arranged in pairs for pairs of adjacent bars $76_4$ and $76_1$, $76_3$ and $76_2$ or $76_5$ and $76_2$ differently along an axial path of the movable layer arrangement. That is, between some pairs, such as $76_4/76_1$ and $76_3/76_2$, the positions may be the same, while to other pairs they may be different.

Figure 16:
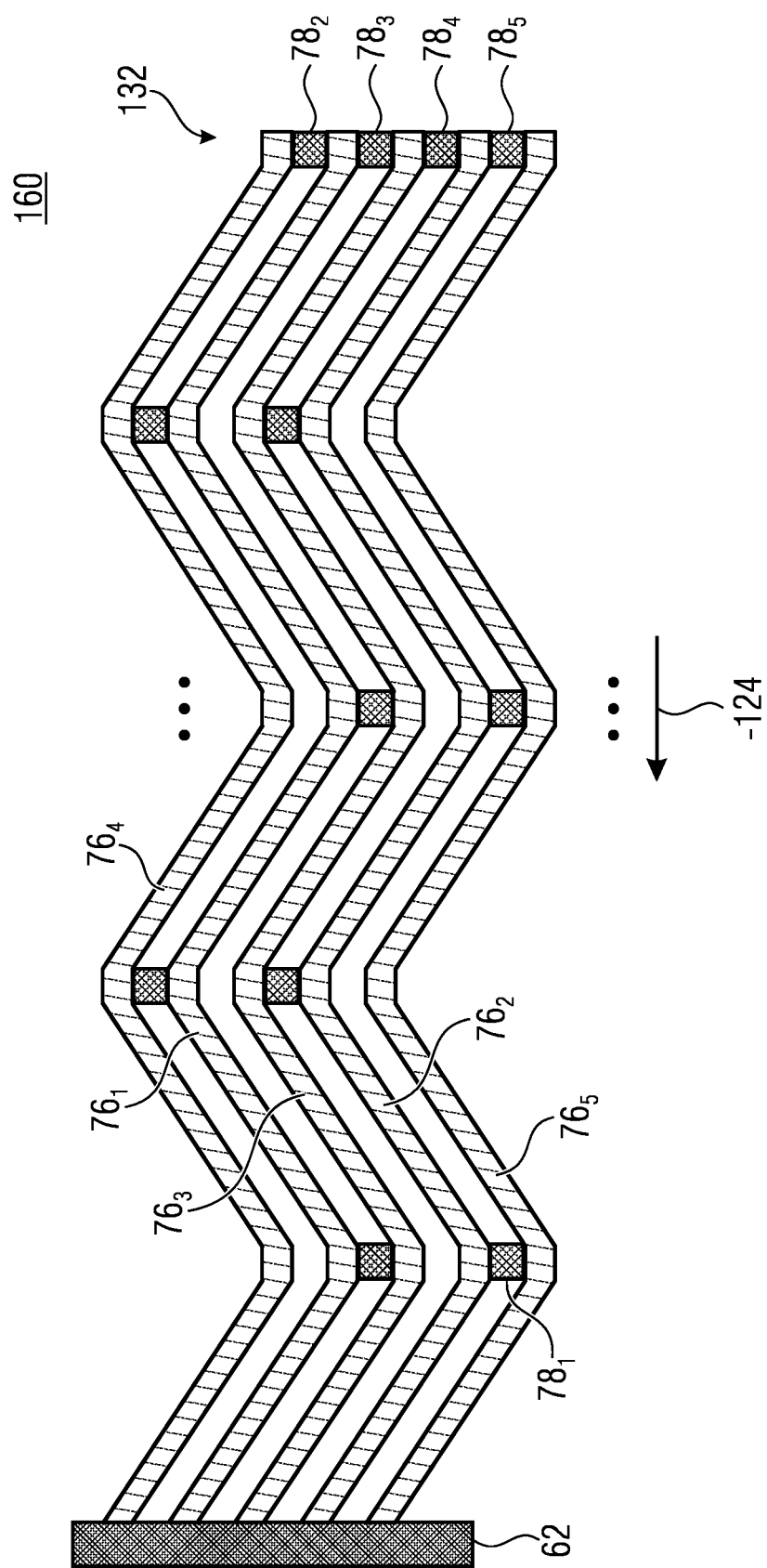
FIG. 16 shows a schematic top view of a movable layer arrangement according to one embodiment, comprising a discrete fixation at one end of the movable layer arrangement, according to one embodiment of the second aspect.

FIG. 16 shows a schematic top view of a movable layer arrangement 160 according to an embodiment, which may structurally correspond to the movable layer arrangement 150. Based on a described interconnection and/or discrete fixations $78_2$ to $78_5$ at one end 132 of the movable layer arrangement 160, a shortening or lengthening of the movable layer arrangement 160 along or in the opposite direction 124 may be performed.

FIG. 17 shows a schematic top view of a movable layer arrangement 170 according to an embodiment. A movement along the directions $122a$ and/or $122b$ can be adjusted by suitable selection of positions of the insulation regions 78.

According to the illustrated embodiment, the discrete regions 78 of the movable layer arrangement 170 may each be arranged in mirror symmetry with respect to a plane of symmetry along a neutral fiber of the movable layer arrangement. For example, the neutral fiber passes through the central bar $76_3$, approximately along its centerline. Layer arrangements described herein may form at least a portion of an actuator 26 of MEMS described herein, but may also be formed independently thereof. For example, MEMS described herein may be formed as a speaker, microphone, ultrasonic transducer, microdrive, or micropump.

Figure 18A:
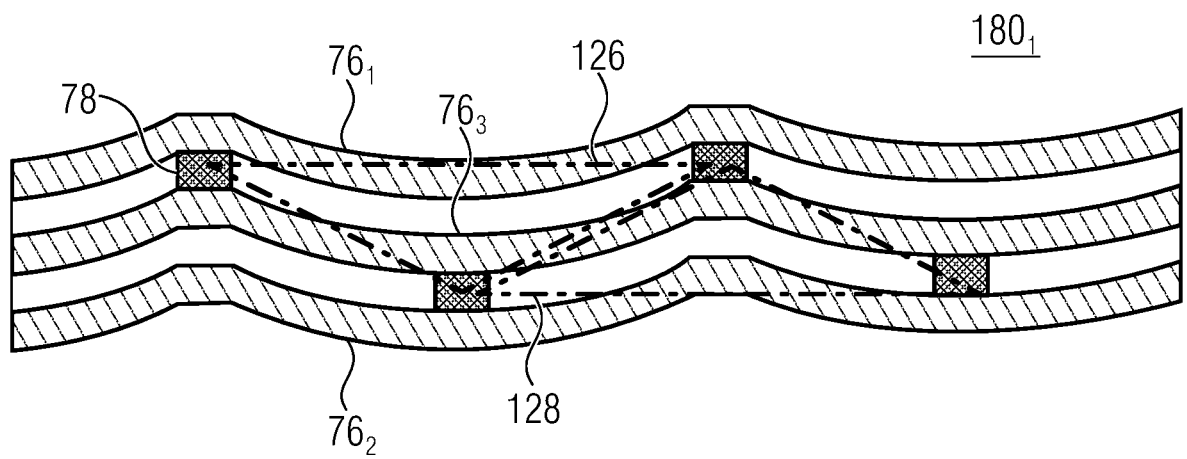
FIG. 18a-b show schematic views of movable layer arrangements according to embodiments of the second aspect, wherein the bars are arranged curved with respect to each other in sections.

FIG. 18a shows a schematic top view of a movable layer arrangement $180_1$ according to an embodiment in which the bars $76_1$ to $76_3$ are arranged to be curved in sections relative to one another.

Figure 18B:
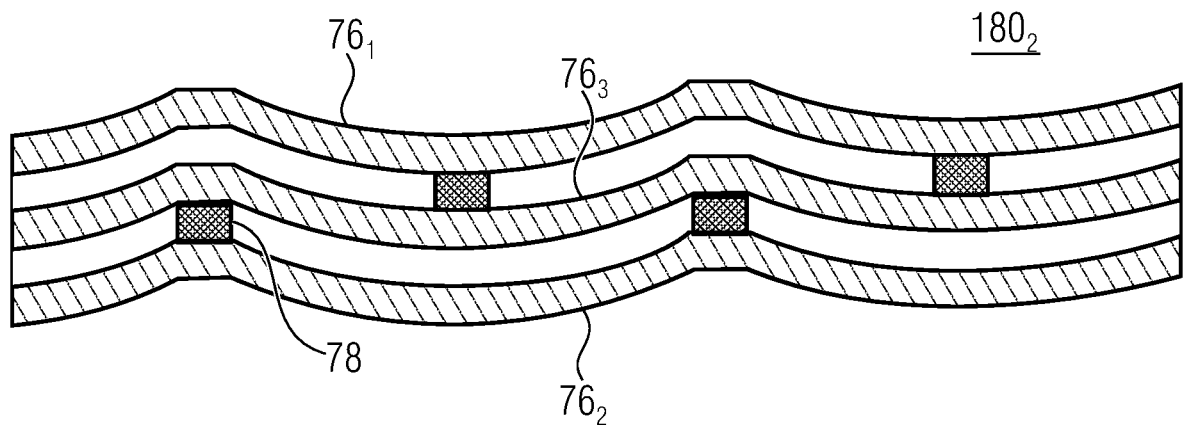

FIG. 18b shows a schematic view of another movable layer arrangement $180_2$ in which the bars $76_1$, $76_2$ and $76_3$ are also curved in sections, but a position of the discrete regions 78 is regulated differently.

Embodiments are based on the realization that for the generation of high sound pressures it makes sense not to use actively deformable elements for sound generation or only to a small extent, but to provide them with passive elements. This offers the advantage that the deformable elements can be designed in such a way that deformation is ensured and passive elements are optimized in such a way that high sound pressures can be achieved. According to a first aspect, a muscle-like actuator is created which is arranged in a drive plane and which is connected to passive elements in a further layer. This achieves an increase in the sound pressure level compared to known concepts. Further aspects relate to actuators and/or movable layer arrangements that are clamped on both sides, thus avoiding gaps to the surrounding substrate at the freely vibrating end of the bar, which can cause fluidic losses. This can ensure that the movement of the bar remains free and is not restricted. Such is described, for example, for the movable layer arrangements described herein and also shown in FIGS. 5a and 5b. Another aspect can be used to act as an actuator to drive the passive elements of the first aspect. Both aspects perform the same task. However, the features of the second aspect can stand alone without being associated with a passive element.

The described embodiments are characterized by an increase in the sound pressure level with a small or minimal chip area compared to known concepts. A cost-efficient production of components based on semiconductor materials can thus be achieved together with a high to optimal utilization of the area of the underlying wafer. The object solved with the present embodiments is thus to show solutions for how the chip volume can be utilized to generate a high sound pressure level or to be particularly sensitive. The core of embodiments is that the drive plane is separated from the sound generation plane. Thus, sound-generating elements can be optimally designed. Similarly, the drive plane is characterized by the fact that the actuators have a high packing density and can thus have a high force over the deflection range.

Micromechanical components are needed to translate electrical signals into mechanical action or vice versa. In the case of the present deformable elements, a deformation of the element results on an electrical input signal. In this case, the deformable element is an actuator. Similarly, such deformable elements can also be used as sensors by tapping an electrical signal resulting from a deformation of the deformable element.

The deformable elements are bar-shaped actuators and are based on electrostatic, piezoelectric, magnetostrictive and/or thermomechanical principles of action.

Components are layer stacks consisting of at least one device plane, one structural plane and one lid plane. The device plane is characterized by the fact that the actuators needed to drive the deformable elements are arranged there. The respective layers are connected to each other using material-bonding processes, for example bonding. This results in acoustically sealed gaps in the components. The layers have electrically conductive materials, for example doped semiconductor materials and/or metal materials. The active elements of a deformable element are formed by selective dissolution from the layers of the electrodes.

Passive elements are, for example, passively dissolved out of the layer or joined by material bonding in a manner comparable to that just mentioned.

Embodiments of aspects described herein relate to:
1. Device
  1.1. Actuator plane is separated from the fluid interaction plane/structural plane
    1.1.1. Advantage: higher packing density in the actuator plane, thus a higher force can be applied in the actuator plane than before.
    1.1.2. Higher packing density in the interaction plane because no actuator is provided, thus more fluid can be displaced per area
  1.2. Actuator plane contains deflectable elements
  1.3. In the advantageous embodiment, deflectable elements are electrodes that are connected to each other via electrically insulating spacers.
  1.4. Deflectable elements are connected to the surrounding substrate
  1.5. Different potentials are applied to adjacent electrodes so that they move towards or away from each other.
    1.5.1. Adjustable force and deflection via electrode geometry and number
  1.6. Advantageous embodiment for the arrangement of the deflectable elements enables an almost linear deflection behavior
    1.6.1. Two deflectable elements are symmetrically connected with a connection element (FIG. 1)
  1.7. Fluid interaction plane contains passive elements connected to the deflectable elements
  1.8. Elements in the fluid interaction plane interact with a fluid and generate volumetric flow
  1.9. In an advantageous embodiment, passive elements are comb-like elements.
  1.10. The comb-like resistive elements, together with mating elements firmly attached to the substrate, form cavities
  1.11. The movement of the resistive elements with respect to the counter elements generates a volumetric flow of a fluid.
  1.12. The fluid is conveyed in and out of the cavities via lower and upper outlet openings in the handling and lid wafers.
  1.13. The resistive element may, in embodiments, be connected to the substrate via connection elements.
    1.13.1. The geometry and topography of the connection elements can be designed. This makes it possible to influence the resulting frequencies of the oscillating resistive element.
  1.14. Structural plane is much larger in its vertical orientation than the actuator plane
  1.15. The structural plane may contain openings to connect the cavities to openings in the lid and handling wafer, thereby connecting the cavities to the environment.
  1.16. Another aspect is the use of coupling elements to control elastic resistive elements.
    1.16.1. Resistive elements are advantageously connected to the substrate on both sides
    1.16.2. Coupling elements transfer the movement of the actively deflectable to the elastic resistive elements
    1.16.3. There are two groups of deflectable elements, coupling elements and resistive elements, which are operated in opposite directions. In other words, they move towards each other in a first time interval and away from each other in a subsequent second time interval.
  1.17. Another aspect is the use of coupling elements which, in contrast to 1.16, are also divided into groups. The basic principle is a stator-shuttle arrangement.
    1.17.1. A group consists of e.g. four elastic resistive elements connected to a linearly operated actively deflectable element.
    1.17.2. The group of elastic resistive elements and actively deflectable elements is enclosed by a boundary formed of substrate. This boundary increases the overall stiffness of the component. Furthermore, the boundary is electrically coupled to the control and serves as a stator. In this embodiment, the shuttle is the actively deflectable resistive element.
    1.17.3. For the formation of cavities, further boundaries are provided, which are arranged between the resistive elements.
    1.17.4. The resistive elements convey fluid into and out of these cavities through openings in the lid and handling wafer
      1.17.4.1. The openings are not located in the area of the actively deflectable elements, but to the side of them.
      1.17.4.2. The openings may be arranged as in FIG. 5a.
  1.18. Another aspect is the use of comb-like deflectable elements connected to a resistive structure. The principle corresponds to the stator-shuttle principle.
    1.18.1. The surrounding substrate is comb-shaped. This region has a length corresponding to 40-80% of the length of a resistive element.
    1.18.2. Comb-shaped deflectable elements connected to a resistive element are interdigitated with the comb-shaped substrate.
2. Device as alternative deflectable element
  2.1. Deflectable element with linear deflection behavior
    2.1.1. can interact independently with a fluid,
    2.1.2. but can also be used as a drive for the resistive structure
  2.2. in embodiments connected to the surrounding substrate on both sides
    2.2.1. Improvement to application PCT/EP2018/078298 is that an actuator clamped at both sides does not exhibit acoustic short circuits, as is the case at the freely movable end of the actuator clamped at one side.
  2.3. Deflectable element is formed by the juxtaposition of mirror-symmetrical elementary cells along a direction of extension of the deflectable element.
  2.4 Elementary cells consist of a range of bar-shaped electrodes connected to insulating spacer layers. The elementary cells may include insulating layers along the entire length of the electrodes that are not in direct mechanical or electrical contact with the electrodes.

2.5. An embodiment has three electrodes that have a mountain-valley-mountain-valley orientation in a top view.
2.5.1. First elementary cell is formed by two insulating spacers "mountain" and one insulating spacer "valley".
2.5.2. Second, adjacent elementary cell correspondingly arranged as a mirror image
2.6. Embodiments have more than three electrodes (FIG. 12)
2.7. Adjacent electrodes have different potentials, thus the deflection occurs.
2.8. Deflection characteristics can be adjusted by the arrangement of the insulating spacers.
2.9. Embodiments also include deflectable elements connected to the substrate on one side. This allows a change in length to be produced
3. Process/method for displacing a fluid by means of the above devices.
3.1 Devices can be used to create a pressure change in the surrounding fluid (sound, loudspeaker) and to detect pressure changes in the surrounding fluid (sound, microphone).
4. Embodiments may also be pumps or microdrives.

Although some aspects have been described in relation to a device, it is understood that these aspects also constitute a description of the corresponding method, so that a block or component of a device is also to be understood as a corresponding method step or as a feature of a method step. Similarly, aspects described in relation to or as a method step also constitute a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A microelectromechanical systems (MEMS) with a layered structure comprising:
a cavity disposed in the layered structure and fluidically coupled to an external environment of the layered structure through at least one opening in the layered structure;
an interaction structure movably disposed in a first MEMS plane and in the cavity along a plane direction and adapted to interact with a fluid in the cavity, wherein movement of the interaction structure is causally related to the movement of the fluid through the at least one opening;
an active structure disposed in a second MEMS plane perpendicular to the plane direction and mechanically coupled to the interaction structure; and configured such that an electrical signal at an electrical contact of the active structure is causally related to a deformation of the active structure; wherein the deformation of the active structure is causally related to the movement of the fluid;
wherein along a thickness direction of the MEMS an extension of the interaction structure is larger than an extension of the active structure.

2. MEMS according to claim 1, wherein the active structure comprises two actuation directions arranged opposite to each other and is adapted to perform a movement along an actuation direction in the second MEMS plane based on a first actuation signal and to perform a complementary movement opposite to the actuation direction in the second MEMS plane based on a second actuation signal.

3. MEMS according to claim 2, wherein the active structure comprises a first actuator for converting the first actuation signal and a second actuator for converting the second actuation signal.

4. MEMS according to claim 2, wherein the active structure is adapted to elongate based on the first actuation signal in a first region parallel to the actuation direction and to shorten in a second subregion; and to shorten based on the second actuation signal in the first region parallel to the actuation direction and to elongate in the second subregion.

5. The MEMS according to claim 1, wherein the active structure comprises a plurality of electrode elements arranged side by side and grouped into electrode pairs, main sides of adjacent electrode pairs being arranged facing each other and being connected in a central region of the electrode elements at discrete locations by inner spacer elements.

6. The MEMS according to claim 1, wherein the active structure comprises a plurality of electrode pairs each comprising first and second electrode elements; and adjacent electrode pairs in a central region of the electrode elements are connected at discrete locations by inner spacer elements.

7. The MEMS according to claim 1, wherein the active structure comprises a plurality of movable layer-assemblies mechanically connected between a MEMS substrate and a coupling element mechanically fixed to the interaction structure;
wherein each movable layer-assembly comprises a first bar, a second bar, and a third bar disposed between and electrically isolated from the first bar and second bar at discrete regions thereof, and is adapted to move along a direction of movement in the second MEMS plane in response to an electrical potential between the first bar and the third bar or in response to an electrical potential between the second bar and the third bar to move the coupling element.

8. The MEMS according to claim 1, wherein the active structure comprises a movable layer assembly mechanically connected between a MEMS substrate and a coupling element mechanically fixed to the interaction structure;
wherein the movable layer assembly comprises a first bar, a second bar, and a third bar disposed between the first bar and the second bar and electrically isolated therefrom at discrete regions, and is adapted to move along a direction of movement in the second MEMS plane in response to an electric potential between the first bar and the third bar or in response to an electric potential between the second bar and the third bar, to move the coupling element, wherein the discrete regions for fixing the first bar and the third bar on the one hand and the second bar and the third bar on the other hand are arranged offset from each other along an axial path of the movable layer assembly in the second MEMS plane.

9. The MEMS according to claim 1, wherein the interaction structure is formed electrically passively.

10. The MEMS according to claim 1, wherein a mechanical coupling of the interaction structure to the layer structure comprises a stiffness at most equal to a stiffness of the interaction structure.

11. The MEMS according to claim 1, wherein the interaction structure is elastically coupled to the layered structure by flexural spring elements.

12. The MEMS according to claim 1, wherein the interaction structure is arranged without suspension apart from a mechanical coupling to the active structure.

13. The MEMS according to claim 1, wherein a bounding structure is arranged in the first MEMS plane defining sub-cavities in the cavity, wherein fin structures of the interaction structure are movably arranged in the sub-cavities.

14. The MEMS according to claim 1, wherein the interaction structure comprises a plurality of plate elements arranged parallel to each other in the first MEMS plane and oriented perpendicular to the first MEMS plane and connected to a MEMS substrate in opposite edge regions.

15. The MEMS according to claim 1, wherein the interaction structure comprises a plurality of plate elements arranged parallel to each other in the first MEMS plane and oriented perpendicular to the first MEMS plane, the plate elements being mechanically coupled to each other in groups by means of interconnection elements into plate groups.

16. The MEMS according to claim 1, wherein the interaction structure is mechanically fixed to a MEMS substrate at a region remote from the active structure and is flexibly formed to deform upon deflection of the active structure.

17. The MEMS according to claim 1, wherein the interaction structure is coupled to the active structure by a mechanical coupling comprising a mechanical stiffness along the plane direction that is greater by a factor of at least 3 than a mechanical coupling of the interaction structure to the layered structure.

18. The MEMS according to claim 1, wherein a coupling element mechanically fixed the active structure to the interaction structure and adjusts a distance between the active structure and the interaction structure.

19. The MEMS according to claim 1, formed as a loudspeaker, microphone, ultrasonic transducer, a microdrive or micropump.

* * * * *